United States Patent
Matsubara et al.

(10) Patent No.: US 9,523,966 B2
(45) Date of Patent: Dec. 20, 2016

(54) AUTOMATIC PROGRAMMING APPARATUS AND CONTROL COMMAND GENERATING METHOD

(75) Inventors: Susumu Matsubara, Chiyoda-ku (JP); Kenji Iriguchi, Chiyoda-ku (JP); Daisuke Fujino, Chiyoda-ku (JP); Tomonori Sato, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 540 days.

(21) Appl. No.: 14/110,848

(22) PCT Filed: Jun. 23, 2011

(86) PCT No.: PCT/JP2011/064386
§ 371 (c)(1),
(2), (4) Date: Oct. 9, 2013

(87) PCT Pub. No.: WO2012/176298
PCT Pub. Date: Dec. 27, 2012

(65) Prior Publication Data
US 2014/0031970 A1   Jan. 30, 2014

(51) Int. Cl.
*G05B 11/01* (2006.01)
*G05B 19/4093* (2006.01)

(52) U.S. Cl.
CPC ......... *G05B 11/01* (2013.01); *G05B 19/40931* (2013.01); *G05B 2219/36336* (2013.01); *G05B 2219/36337* (2013.01); *Y02P 90/265* (2015.11)

(58) Field of Classification Search
CPC . B23Q 32/123; B23Q 35/121; G05B 19/4207; G05B 11/01; G05B 19/40931; G05B 2219/36336; G05B 2219/36337; Y02P 90/265

(Continued)

(56) References Cited

U.S. PATENT DOCUMENTS 5,245,544 A * 9/1993 Yamamoto ....... G05B 19/40932
                                                      700/180
5,297,022 A   3/1994 Watanabe
(Continued)

FOREIGN PATENT DOCUMENTS

JP   62-295116 A   12/1987
JP   05-197412 A   8/1993
(Continued)

OTHER PUBLICATIONS

International Search Report of PCT/JP2011/064386, dated Aug. 16, 2011.

*Primary Examiner* — Robert Fennema
*Assistant Examiner* — Jigneshkumar Patel
(74) *Attorney, Agent, or Firm* — Sughrue Mion, PLLC; Richard C. Turner

(57) ABSTRACT

An automatic programming apparatus includes a machining-shape generating unit configured to generate second machining shapes for each of machining processes from each of a plurality of first machining shapes input from outside; a machining-order editing unit configured to receive an input of execution order of the machining processes; a machining-shape adjusting unit configured to extend, among a plurality of the second machining shapes having a same tool direction, which is a direction that a tool pierces, one of the second machining shapes in a direction opposite to the tool direction, delete, from the other machining shape that overlaps the one second machining shape because of the extension of the one second machining shape, a portion of the overlap, and generate a third machining shape; and a control-command generating unit configured to generate, based on the third machining shape and the input execution order, a control command.

7 Claims, 77 Drawing Sheets

(58) Field of Classification Search
USPC .......................................................... 700/161
See application file for complete search history.

(56) References Cited

U.S. PATENT DOCUMENTS

| | | |
|---|---|---|
| 5,351,196 A | 9/1994 | Sowar et al. |
| 2002/0082742 A1 | 6/2002 | Kadono |
| 2010/0185310 A1 | 7/2010 | Miyata et al. |
| 2012/0029675 A1* | 2/2012 | Matsubara ......... G05B 19/4097 |
| | | 700/98 |
| 2012/0089246 A1* | 4/2012 | Mitani ............... G05B 19/4097 |
| | | 700/159 |

FOREIGN PATENT DOCUMENTS

| | | |
|---|---|---|
| JP | 05-204432 A | 8/1993 |
| JP | 2606460 B2 | 2/1997 |
| JP | 09-216127 A | 8/1997 |
| JP | 2002-189510 A | 7/2002 |
| JP | 2003-084814 A | 3/2003 |
| WO | 2008/149431 A1 | 12/2008 |

* cited by examiner

FIG.5-3

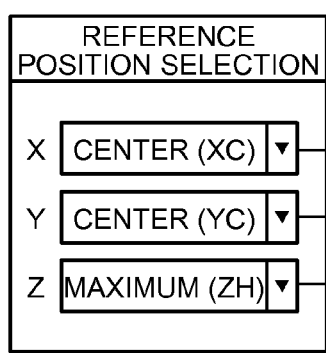

REFERENCE POSITION SELECTION

X CENTER (XC) ▼
Y CENTER (YC) ▼
Z MAXIMUM (ZH) ▼

- COORDINATE MINIMUM VALUE IN X-AXIS DIRECTION OF SHAPE RANGE (XL)
- COORDINATE CENTRAL VALUE IN X-DIRECTION OF SHAPE RANGE (XC)
- COORDINATE MAXIMUM VALUE IN X-AXIS DIRECTION OF SHAPE RANGE (XH)

- COORDINATE MINIMUM VALUE IN Y-AXIS DIRECTION OF SHAPE RANGE (YL)
- COORDINATE CENTRAL VALUE IN Y-DIRECTION OF SHAPE RANGE (YC)
- COORDINATE MAXIMUM VALUE IN Y-AXIS DIRECTION OF SHAPE RANGE (YH)

- COORDINATE MINIMUM VALUE IN Z-AXIS DIRECTION OF SHAPE RANGE (ZL)
- COORDINATE CENTRAL VALUE IN Z-DIRECTION OF SHAPE RANGE (ZC)
- COORDINATE MAXIMUM VALUE IN Z-AXIS DIRECTION OF SHAPE RANGE (ZH)

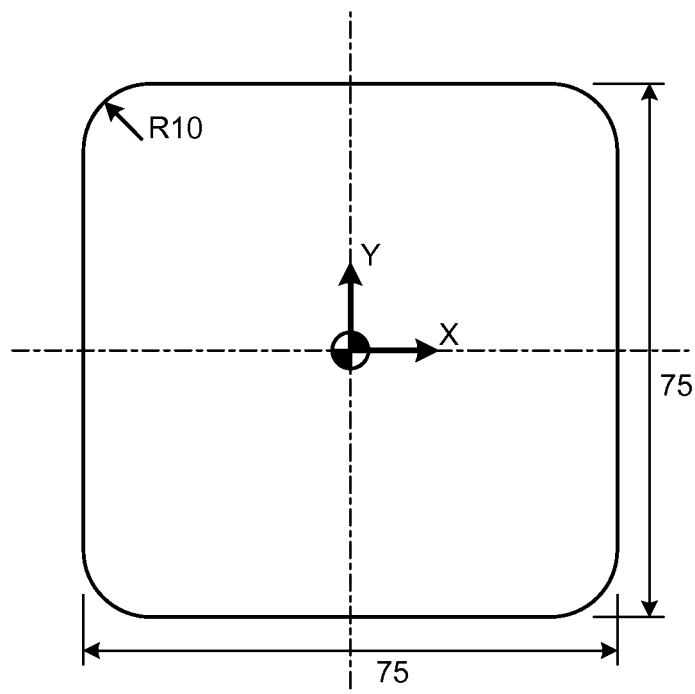

FIG.7-3

| POCKET (SQUARE) | |
|---|---|
| REFERENCE POSITION | XC-YC-ZH |
| POSITION X | 0.000 |
| POSITION Y | 0.000 |
| LENGTH X | 75.000 |
| LENGTH Y | 75.000 |
| CORNER R | 10.000 |
| UPPER SURFACE Z | 0.000 * |
| DEPTH |  |

FIG.7-4

| POCKET (SQUARE) | |
|---|---|
| REFERENCE POSITION | XC-YC-ZH |
| POSITION X | 0.000 |
| POSITION Y | 0.000 |
| LENGTH X | 75.000 |
| LENGTH Y | 75.000 |
| CORNER R | 10.000 |
| UPPER SURFACE Z | 0.000 * |
| DEPTH | 10.000 |

| POCKET (SQUARE) | |
|---|---|
| REFERENCE POSITION | XC-YC-ZH |
| POSITION X | 0.000 |
| POSITION Y | 0.000 |
| LENGTH X | 50.000 |
| LENGTH Y | 50.000 |
| CORNER R | 10.000 |
| UPPER SURFACE Z | |
| DEPTH | |

FIG.10-3

| POCKET (SQUARE) | | |
|---|---|---|
| REFERENCE POSITION | XC-YC-ZH | |
| POSITION X | 0.000 | |
| POSITION Y | 0.000 | |
| LENGTH X | 50.000 | |
| LENGTH Y | 50.000 | |
| CORNER R | 10.000 | |
| UPPER SURFACE Z | 0.000 | * |
| DEPTH | | |

FIG.10-4

| POCKET (SQUARE) | | |
|---|---|---|
| REFERENCE POSITION | XC-YC-ZH | |
| POSITION X | 0.000 | |
| POSITION Y | 0.000 | |
| LENGTH X | 50.000 | |
| LENGTH Y | 50.000 | |
| CORNER R | 10.000 | |
| UPPER SURFACE Z | 0.000 | * |
| DEPTH | 10.000 | |

FIG.14-1

| NUMBER | MACHINING PROCESS | TOOL |
|---|---|---|
| 1 | POCKET ROUGH (FIRST STAGE POCKET) | φ8 ENDMILL |
| 2 | POCKET WALL FINISH (FIRST STAGE POCKET) | φ5 ENDMILL |
| 3 | POCKET BOTTOM FINISH (FIRST STAGE POCKET) | φ6 ENDMILL |
| 4 | POCKET ROUGH (SECOND STAGE POCKET) | φ8 ENDMILL |
| 5 | POCKET WALL FINISH (SECOND STAGE POCKET) | φ5 ENDMILL |
| 6 | POCKET BOTTOM FINISH (SECOND STAGE POCKET) | φ6 ENDMILL |

FIG.14-2

| NUMBER | MACHINING PROCESS | TOOL |
|---|---|---|
| 1 | POCKET ROUGH (FIRST STAGE POCKET) | φ8 ENDMILL |
| 2 | POCKET ROUGH (SECOND STAGE POCKET) | φ8 ENDMILL |
| 3 | POCKET WALL FINISH (FIRST STAGE POCKET) | φ5 ENDMILL |
| 4 | POCKET WALL FINISH (SECOND STAGE POCKET) | φ5 ENDMILL |
| 5 | POCKET BOTTOM FINISH (FIRST STAGE POCKET) | φ6 ENDMILL |
| 6 | POCKET BOTTOM FINISH (SECOND STAGE POCKET) | φ6 ENDMILL |

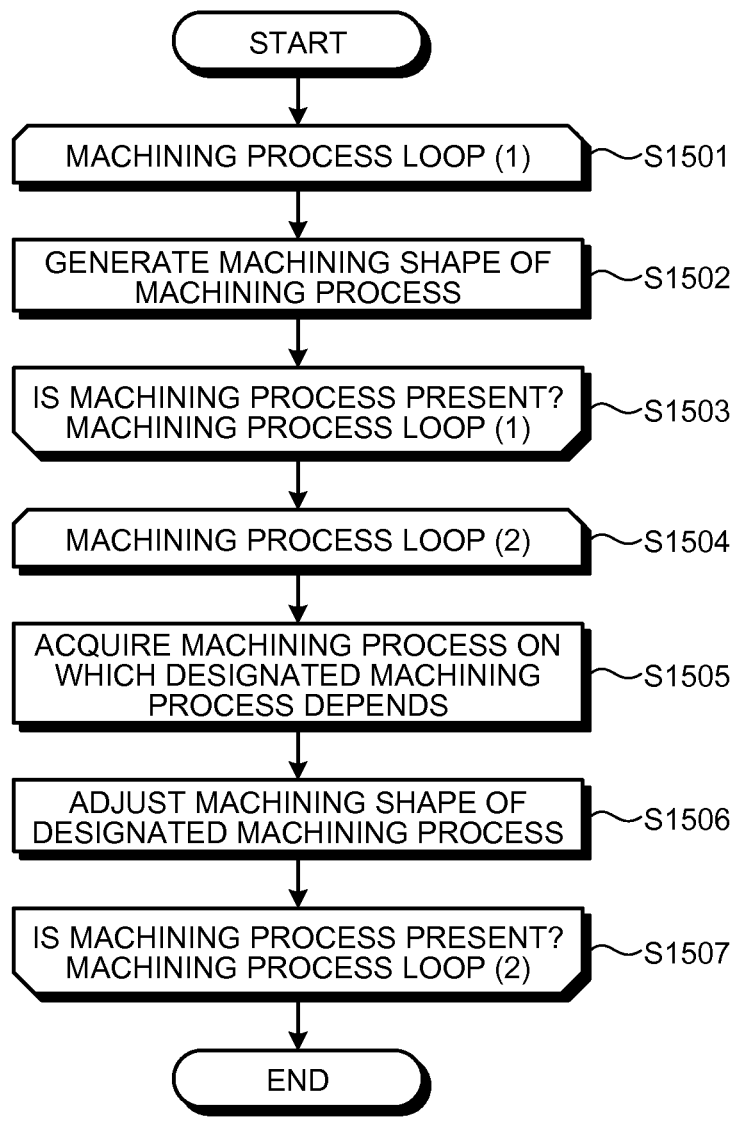

| MATERIAL SHAPE (COLUMN) | |
|---|---|
| REFERENCE POINT | XC-YC-ZH |
| POSITION X | 0.000 |
| POSITION Y | 0.000 |
| POSITION Z | 0.000 |
| DIAMETER | 60.000 |
| LENGTH Z | 20.000 |

| POCKET (SQUARE) | |
|---|---|
| REFERENCE POSITION | XC-YC-ZH |
| POSITION X | 0.000 |
| POSITION Y | 0.000 |
| LENGTH X | 60.000 |
| LENGTH Y | 30.000 |
| CORNER R | 0.000 |
| UPPER SURFACE Z | |
| DEPTH | |

FIG.28-3

| POCKET (SQUARE) | |
|---|---|
| REFERENCE POSITION | XC-YC-ZH |
| POSITION X | 0.000 |
| POSITION Y | 0.000 |
| LENGTH X | 60.000 |
| LENGTH Y | 30.000 |
| CORNER R | 0.000 |
| UPPER SURFACE Z | 0.000 * |
| DEPTH |  |

FIG.28-4

| POCKET (SQUARE) | |
|---|---|
| REFERENCE POSITION | XC-YC-ZH |
| POSITION X | 0.000 |
| POSITION Y | 0.000 |
| LENGTH X | 60.000 |
| LENGTH Y | 30.000 |
| CORNER R | 0.000 |
| UPPER SURFACE Z | 0.000 * |
| DEPTH | 50.000 |

| POCKET (SQUARE) | |
|---|---|
| REFERENCE POSITION | XC-YC-ZH |
| POSITION X | 0.000 |
| POSITION Y | 70.000 |
| LENGTH X | 40.000 |
| LENGTH Y | 20.000 |
| CORNER R | 8.000 |
| UPPER SURFACE Z | |
| DEPTH | |

FIG.31-3

| POCKET (SQUARE) | |
|---|---|
| REFERENCE POSITION | XC-YC-ZH |
| POSITION X | 0.000 |
| POSITION Y | v |
| LENGTH X | 40.000 |
| LENGTH Y | 20.000 |
| CORNER R | 8.000 |
| UPPER SURFACE Z | 0.000 * |
| DEPTH |  |

FIG.31-4

| POCKET (SQUARE) | |
|---|---|
| REFERENCE POSITION | XC-YC-ZH |
| POSITION X | 0.000 |
| POSITION Y | 70.000 |
| LENGTH X | 40.000 |
| LENGTH Y | 20.000 |
| CORNER R | 8.000 |
| UPPER SURFACE Z | 0.000 * |
| DEPTH | 30.000 |

FIG.34-2

| SIMPLE HOLE (THROUGH) | |
|---|---|
| REFERENCE POSITION | XC-YC-ZH |
| POSITION X | 0.000 |
| POSITION Y | 90.000 |
| DOT PATTERN | DOT ▼ |
| NUMBER X | |
| NUMBER Y | |
| INTERVAL X | |
| INTERVAL Y | |
| UPPER SURFACE Z | |

FIG.34-3

| SIMPLE HOLE (THROUGH) | |
|---|---|
| REFERENCE POSITION | XC-YC-ZH |
| POSITION X | 0.000 |
| POSITION Y | 90.000 |
| DOT PATTERN | DOT ▼ |
| NUMBER X | |
| NUMBER Y | |
| INTERVAL X | |
| INTERVAL Y | |
| UPPER SURFACE Z | 0.000 * |

FIG.38-1

| NUMBER | MACHINING PROCESS | TOOL |
|---|---|---|
| 1 | POCKET ROUGH (FIRST POCKET) | $\phi$10 ENDMILL |
| 2 | POCKET WALL FINISH (FIRST POCKET) | $\phi$10 ENDMILL |
| 3 | POCKET BOTTOM FINISH (FIRST POCKET) | $\phi$10 ENDMILL |
| 4 | POCKET ROUGH (SECOND POCKET) | $\phi$6 ENDMILL |
| 5 | POCKET WALL FINISH (SECOND POCKET) | $\phi$5 ENDMILL |
| 6 | POCKET BOTTOM FINISH (SECOND POCKET) | $\phi$6 ENDMILL |
| 7 | SPOT DRILL (SIMPLE HOLE) | $\Phi$16 SPOT DRILL |
| 8 | DRILL (SIMPLE HOLE) | $\Phi$6 DRILL |

FIG.38-2

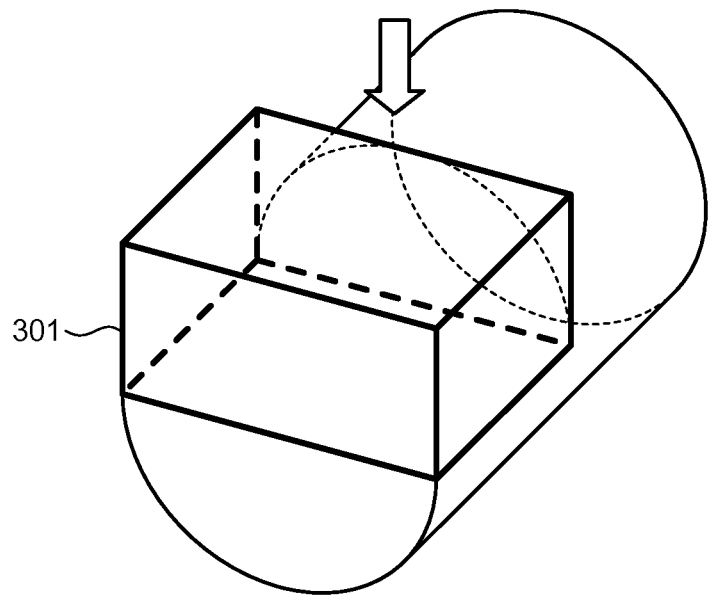

AUTOMATIC PROGRAMMING APPARATUS AND CONTROL COMMAND GENERATING METHOD

CROSS RELATED TO RELATED APPLICATIONS

This is a National Stage of International Application No. PCT/JP2011/064386 filed Jun. 23, 2011, the content of all of which is incorporated herein by reference in its entirety.

FIELD

The present invention relates to an automatic programming apparatus and a control command generating method for generating a control command for causing a machining tool to operate.

BACKGROUND

There has been an automatic programming apparatus that generates a control command based on machining process data including descriptions of a machining shape, a machining method, a tool in use, machining conditions, and the like (see, for example, Patent Literature 1, Patent Literature 2, and Patent Literature 3).

In particular, according to a technology disclosed in Patent Literature 3, machining types of the machining shape are classified into a groove, a side surface groove, a side surface, and a pocket. The groove and the side surface groove are divided into a side surface section and a bottom surface section, both of which are set as contour sections. A dividing method for a region of the side surface is different for rough machining and finish machining. That is, the side surface subjected to the rough machining is divided into an upper surface section and a bottom surface section. The side surface subjected to the finish machining is divided into a side surface section and a bottom surface section. Further, the side surface section by the side surface machining is divided into a contour section and a region section. The pocket is divided into a side surface section and a bottom surface section by processing of only the finish machining.

CITATION LIST

Patent Literature

Patent Literature 1: Japanese Patent No. 2606460
Patent Literature 2: International Publication No. WO2008/149431
Patent Literature 3: Japanese Patent Application Laid-open No. 62-295116

SUMMARY

Technical Problem

According to the technology of Patent Literature 3, the machining shape other than a hole is divided into final simple shapes matched to characteristics of the rough machining and the finish machining. According to a shape type, a finishing degree, or a surface state, for example, in pocket machining, the machining process is divided into a rough machining shape, a side surface machining shape for performing the finish machining for the side surface section, and a bottom surface finish shape of the bottom surface section. In the case of a stepped pocket shape, when pocket machining at a first stage and pocket machining at a second stage are respectively defined by an operator, the machining process is divided into a rough machining shape, a side surface finish shape, and a bottom surface finish shape at the first stage and a rough machining shape, a side surface finish shape, and a bottom surface finish shape at the second stage. However, because a part of a region of the bottom surface finish shape at the first stage is cut by rough machining at the second stage, there is a problem in that the finish machining for the region ends up with a useless machining.

The present invention has been devised in view of the above and it is an object of the present invention to obtain an automatic programming apparatus and a control command generating method for generating a control command for performing machining while reducing useless machining as much as possible.

Solution to Problem

In order to solve the aforementioned problems, an automatic programming apparatus according to one aspect of the present invention is configured to comprise: a machining-shape generating unit configured to generate second machining shapes for each of machining processes from each of an externally-input plurality of machining shapes; a machining-order editing unit configured to receive an input of execution order of the machining processes; a machining-shape adjusting unit configured to deform, concerning a plurality of machining shapes having a same tool direction among the second machining shapes, one machining shape among the plurality of machining shapes such that machining can be executed in the input execution order, delete, from another machining shape that overlaps the one machining shape because of the deformation of the one machining shape, a portion of the overlap, and generate a third machining shape; and a control-command generating unit configured to generate, based on the third machining shape and the input execution order, a control command for causing a machine tool to operate.

Advantageous Effects of Invention

The automatic programming apparatus according to the present invention deforms a machining shape such that the order of a machining process input by an operator can be executed and, according to the deformation of the machining shape, deletes, from a machining shape machined before the deformed machining shape, an overlapping portion in the deformed machining shape and the machining shape machined before the deformed machining shape. Therefore, it is possible to generate a control command for performing machining while reducing useless machining as much as possible.

BRIEF DESCRIPTION OF DRAWINGS

FIG. 4-1 is a top view of a work piece.
FIG. 4-2 is a side view of the work piece.
FIG. 5-1 is a perspective view of a material shape.

FIG. 5-2 is a diagram for explaining a display screen example for inputting material shape data.

FIG. 5-3 is a diagram for explaining a display screen example for inputting material shape data.

FIG. 6-1 is a flowchart for explaining an operation at step S305.

FIG. 6-2 is a flowchart for explaining the operation at step S305.

FIG. 7-1 is a diagram for explaining a state in which a machining shape of a first stage pocket is defined.

FIG. 7-2 is a diagram for explaining a state in which the machining shape of the first stage pocket is defined.

FIG. 7-3 is a diagram for explaining a state in which the machining shape of the first stage pocket is defined.

FIG. 7-4 is a diagram for explaining a state in which the machining shape of the first stage pocket is defined.

FIG. 8-1 is a diagram for explaining a state in which a machining shape of the first stage pocket is defined.

FIG. 8-2 is a diagram for explaining a state in which the machining shape of the first stage pocket is defined.

FIG. 9-1 is a diagram for explaining a positional relation between a machining material shape and a machining shape.

FIG. 9-2 is a diagram of a machining material shape after removal of a pocket machining shape.

FIG. 10-1 is a diagram of a state in further adding a second stage pocket.

FIG. 10-2 is a diagram of a state in further adding the second stage pocket.

FIG. 10-3 is a diagram of a state in further adding the second stage pocket.

FIG. 10-4 is a diagram of a state in further adding the second stage pocket.

FIG. 11-1 is a diagram of a state in further adding the second stage pocket.

FIG. 11-2 is a diagram of a state in further adding the second stage pocket.

FIG. 12-1 is a diagram of a state in further adding the second stage pocket.

FIG. 12-2 is a diagram of a state in further adding the second stage pocket.

FIG. 13-1 is a diagram of a state of generation of machining process data.

FIG. 13-2 is a diagram of a state of generation of the machining process data.

FIG. 14-1 is a diagram of a list of machining processes and tools in use.

FIG. 14-2 is a diagram of a list of machining processes after a change of order.

FIG. 15 is a flowchart for explaining adjustment of machining processes more in detail.

FIG. 16-1 is a diagram of a machining shape for each of machining processes.

FIG. 16-2 is a diagram of a machining shape for each of machining processes.

FIG. 16-3 is a diagram of a machining shape for each of machining processes.

FIG. 16-4 is a diagram of a machining shape for each of machining processes.

FIG. 16-5 is a diagram of a machining shape for each of machining processes.

FIG. 16-6 is a diagram of a machining shape for each of machining processes.

FIG. 17-1 is a flowchart for explaining an operation at step S1505 more in detail.

FIG. 17-2 is a flowchart for explaining an operation at step S1506 more in detail.

FIG. 18-1 is a diagram for explaining a state of deformation of a machining shape of pocket rough (second stage pocket).

FIG. 18-2 is a diagram for explaining a state of the deformation of the machining shape of the pocket rough (second stage pocket).

FIG. 18-3 is a diagram for explaining a state of the deformation of the machining shape of the pocket rough (second stage pocket).

FIG. 19-1 is a diagram for explaining a state in which a machining shape of pocket wall finish (second stage pocket) is deformed.

FIG. 19-2 is a diagram for explaining a state in which the machining shape of the pocket wall finish (second stage pocket) is deformed.

FIG. 19-3 is a diagram for explaining a state in which the machining shape of the pocket wall finish (second stage pocket) is deformed.

FIG. 20-1 is a diagram for explaining a state of deformation of pocket bottom finish (first stage pocket).

FIG. 20-2 is a diagram for explaining a state of the deformation of the pocket bottom finish (first stage pocket).

FIG. 20-3 is a diagram for explaining a state of the deformation of the pocket bottom finish (first stage pocket).

FIG. 20-4 is a diagram for explaining a state of the deformation of the pocket bottom finish (first stage pocket).

FIG. 20-5 is a diagram for explaining a state of the deformation of the pocket bottom finish (first stage pocket).

FIG. 20-6 is a diagram for explaining a state of the deformation of the pocket bottom finish (first stage pocket).

FIG. 20-7 is a diagram for explaining a state of the deformation of the pocket bottom finish (first stage pocket).

FIG. 21-1 is a diagram of a display screen example displayed on an output device of the automatic programming apparatus in the first embodiment.

FIG. 21-2 is a diagram of a display screen example displayed on the output device of the automatic programming apparatus in the first embodiment.

FIG. 22-1 is a diagram of a display screen example displayed on the output device of the automatic programming apparatus in the first embodiment.

FIG. 22-2 is a diagram of a display screen example displayed on the output device of the automatic programming apparatus in the first embodiment.

FIG. 23-1 is a diagram of a display screen example displayed on the output device of the automatic programming apparatus in the first embodiment.

FIG. 23-2 is a diagram of a display screen example displayed on the output device of the automatic programming apparatus in the first embodiment.

FIG. 23-3 is a diagram of a display screen example displayed on the output device of the automatic programming apparatus in the first embodiment.

FIG. 24-1 is a diagram of a display screen example displayed on the output device of the automatic programming apparatus in the first embodiment.

FIG. 24-2 is a diagram of a display screen example displayed on the output device of the automatic programming apparatus in the first embodiment.

FIG. 24-3 is a diagram of a display screen example displayed on the output device of the automatic programming apparatus in the first embodiment.

FIG. 24-4 is a diagram of a display screen example displayed on the output device of the automatic programming apparatus in the first embodiment.

FIG. 24-5 is a diagram of a display screen example displayed on the output device of the automatic programming apparatus in the first embodiment.

FIG. 24-6 is a diagram of a display screen example displayed on the output device of the automatic programming apparatus in the first embodiment.

FIG. 25-1 is a diagram of a display screen example displayed on the output device of the automatic programming apparatus in the first embodiment.

FIG. 25-2 is a diagram of a display screen example displayed on the output device of the automatic programming apparatus in the first embodiment.

FIG. 25-3 is a diagram of a display screen example displayed on the output device of the automatic programming apparatus in the first embodiment.

FIG. 25-4 is a diagram of a display screen example displayed on the output device of the automatic programming apparatus in the first embodiment.

FIG. 25-5 is a diagram of a display screen example displayed on the output device of the automatic programming apparatus in the first embodiment.

FIG. 25-6 is a diagram of a display screen example displayed on the output device of the automatic programming apparatus in the first embodiment.

FIG. 26-1 is a diagram for explaining a work piece.

FIG. 26-2 is a diagram for explaining the work piece.

FIG. 26-3 is a diagram for explaining the work piece.

FIG. 27-1 is a perspective view of a material shape.

FIG. 27-2 is a diagram for explaining a display screen example for inputting material shape data.

FIG. 27-3 is a diagram for explaining a display screen example for inputting material shape data.

FIG. 28-1 is a diagram for explaining a state in which a machining shape of a first pocket is defined.

FIG. 28-2 is a diagram for explaining a state in which the machining shape of the first pocket is defined.

FIG. 28-3 is a diagram for explaining a state in which the machining shape of the first pocket is defined.

FIG. 28-4 is a diagram for explaining a state in which the machining shape of the first pocket is defined.

FIG. 29-1 is a diagram for explaining a state in which the machining shape of the first pocket is defined.

FIG. 29-2 is a diagram for explaining a state in which the machining shape of the first pocket is defined.

FIG. 30-1 is a diagram for explaining a state in which the machining shape of the first pocket is defined.

FIG. 30-2 is a diagram for explaining a state in which the machining shape of the first pocket is defined.

FIG. 31-1 is a diagram of a state in which a second pocket is further added.

FIG. 31-2 is a diagram of a state in which the second pocket is further added.

FIG. 31-3 is a diagram of a state in which the second pocket is further added.

FIG. 31-4 is a diagram of a state in which the second pocket is further added.

FIG. 32-1 is a diagram of a state in which the second pocket is further added.

FIG. 32-2 is a diagram of a state in which the second pocket is further added.

FIG. 33-1 is a diagram of a state in which the second pocket is further added.

FIG. 33-2 is a diagram of a state in which the second pocket is further added.

FIG. 34-1 is a diagram of a state in which a machining shape of a simple hole is added to a wall surface of the first pocket.

FIG. 34-2 is a diagram of a state in which the machining shape of the simple hole is added to the wall surface of the first pocket.

FIG. 34-3 is a diagram of a state in which the machining shape of the simple hole is added to the wall surface of the first pocket.

FIG. 35-1 is a diagram of a state in which the machining shape of the simple hole is added to the wall surface of the first pocket.

FIG. 35-2 is a diagram of a state in which the machining shape of the simple hole is added to the wall surface of the first pocket.

FIG. 36-1 is a diagram of a state in which the machining shape of the simple hole is added to the wall surface of the first pocket.

FIG. 36-2 is a diagram of a state in which the machining shape of the simple hole is added to the wall surface of the first pocket.

FIG. 37-1 is a diagram of a state of generation of machining process data.

FIG. 37-2 is a diagram of a state of the generation of the machining process data.

FIG. 38-1 is a diagram of a list of machining processes and machining tools.

FIG. 38-2 is a diagram of a setting example of a tool direction of the first pocket.

FIG. 38-3 is a diagram of a setting example of a tool direction of the second pocket.

FIG. 38-4 is a diagram of a setting example of a tool direction of a simple hole.

FIG. 39-1 is a diagram of a machining shape for each of machining processes.

FIG. 39-2 is a diagram of a machining shape for each of machining processes.

FIG. 39-3 is a diagram of a machining shape for each of machining processes.

FIG. 39-4 is a diagram of a machining shape for each of machining processes.

FIG. 39-5 is a diagram of a machining shape for each of machining processes.

FIG. 40-1 is a flowchart for explaining an operation at step S1505 more in detail.

FIG. 40-2 is a flowchart for explaining an operation at step S1506 more in detail.

FIG. 41-1 is a diagram for explaining a state in which a machining shape of pocket rough (second pocket) is deformed.

FIG. 41-2 is a diagram for explaining a state in which the machining shape of the pocket rough (second pocket) is deformed.

FIG. 41-3 is a diagram for explaining a state in which the machining shape of the pocket rough (second pocket) is deformed.

FIG. 42-1 is a diagram for explaining a state in which a machining shape of a simple hole drill is deformed.

FIG. 42-2 is a diagram for explaining a state in which the machining shape of the simple hole drill is deformed.

FIG. 42-3 is a diagram for explaining a state in which the machining shape of the simple hole drill is deformed.

FIG. 44-1 is a diagram of a sectional shape of the pocket bottom finish (first pocket).

FIG. 44-2 is a diagram of a sectional shape of the pocket rough (second pocket) after deformation, the wall finish (second pocket) after deformation, and the simple hole drill after deformation that overlap the pocket bottom finish (first pocket).

FIG. 44-3 is a diagram of a machining shape after deformation of the pocket bottom finish (first pocket).

FIG. 45-1 is a diagram of a display screen example displayed on an output device of an automatic programming apparatus in a second embodiment.

FIG. 45-2 is a diagram of a display screen example displayed on the output device of the automatic programming apparatus in the second embodiment.

FIG. 46-1 is a diagram of a display screen example displayed on the output device of the automatic programming apparatus in the second embodiment.

FIG. 46-2 is a diagram of a display screen example displayed on the output device of the automatic programming apparatus in the second embodiment.

FIG. 47-1 is a diagram of a display screen example displayed on the output device of the automatic programming apparatus in the second embodiment.

FIG. 47-2 is a diagram of a display screen example displayed on the output device of the automatic programming apparatus in the second embodiment.

FIG. 47-3 is a diagram of a display screen example displayed on the output device of the automatic programming apparatus in the second embodiment.

FIG. 48-1 is a diagram of a display screen example displayed on the output device of the automatic programming apparatus in the second embodiment.

FIG. 48-2 is a diagram of a display screen example displayed on the output device of the automatic programming apparatus in the second embodiment.

FIG. 48-3 is a diagram of a display screen example displayed on the output device of the automatic programming apparatus in the second embodiment.

FIG. 48-4 is a diagram of a display screen example displayed on the output device of the automatic programming apparatus in the second embodiment.

FIG. 48-5 is a diagram of a display screen example displayed on the output device of the automatic programming apparatus in the second embodiment.

FIG. 48-6 is a diagram of a display screen example displayed on the output device of the automatic programming apparatus in the second embodiment.

Figures 1, 20:
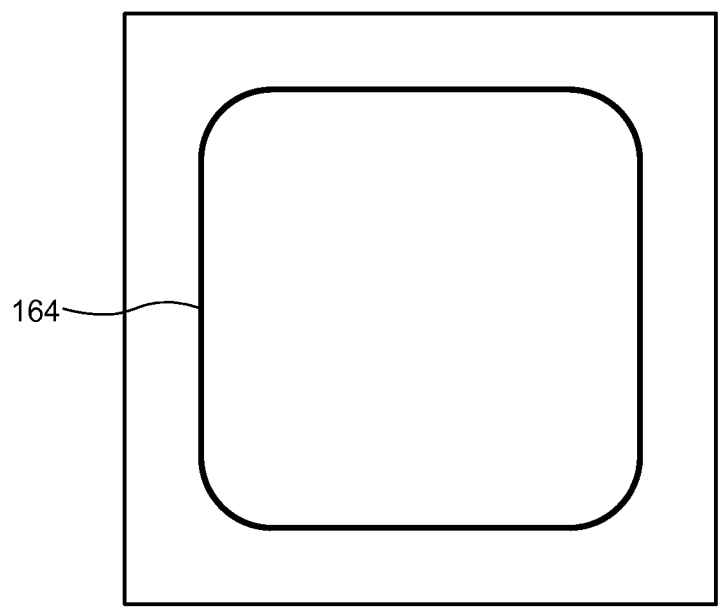
Figures 2, 20:
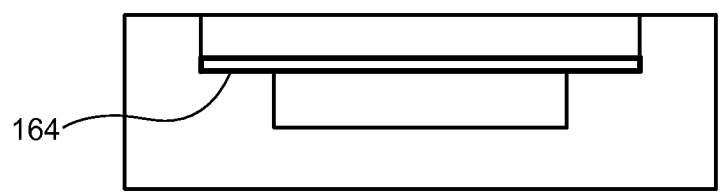
Figures 3, 20:
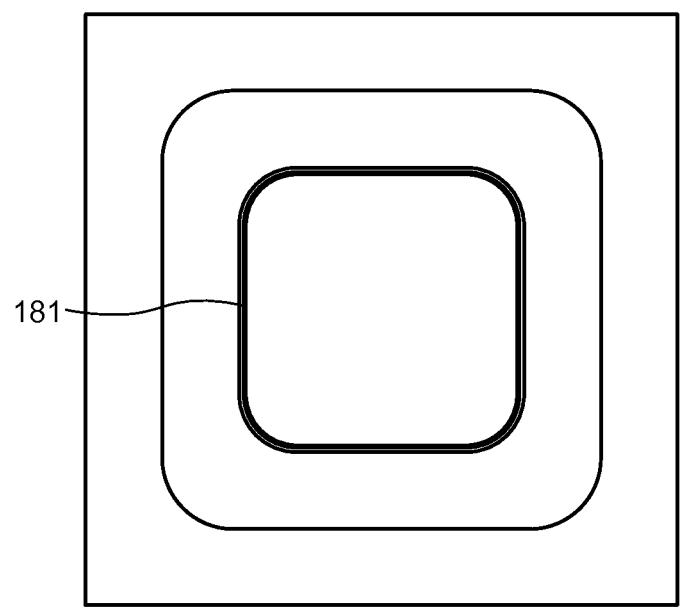
Figures 4, 20:
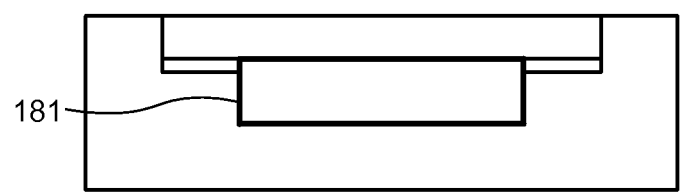
Figures 5, 20:
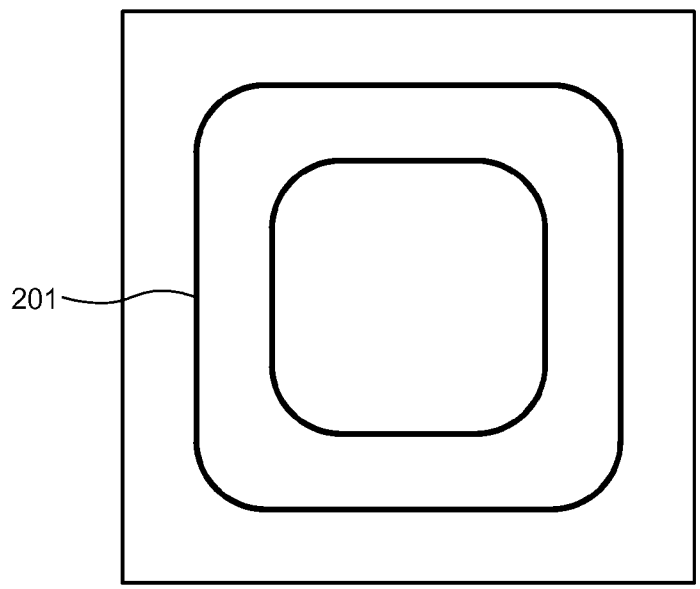
Figures 6, 20:
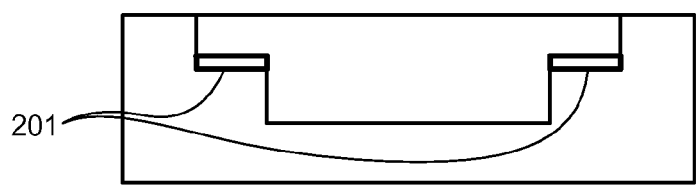
Figures 7, 20:
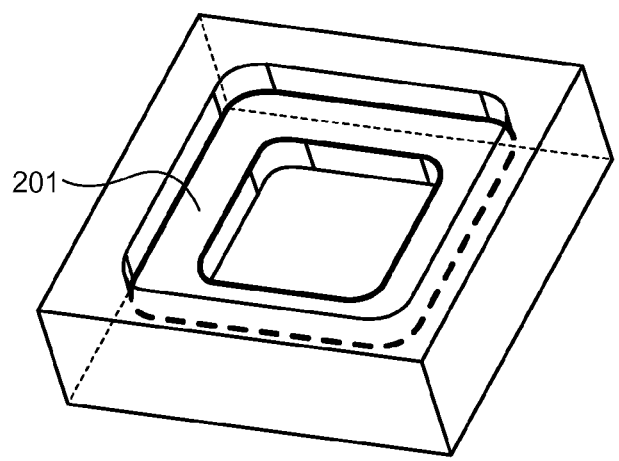
Figures 1, 48:
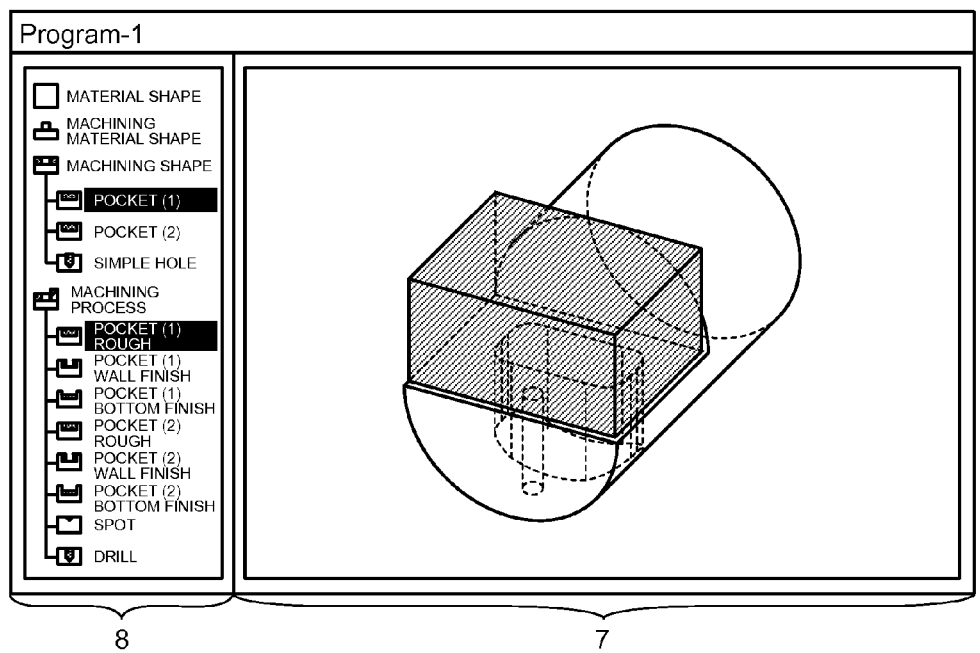
Figures 2, 48:
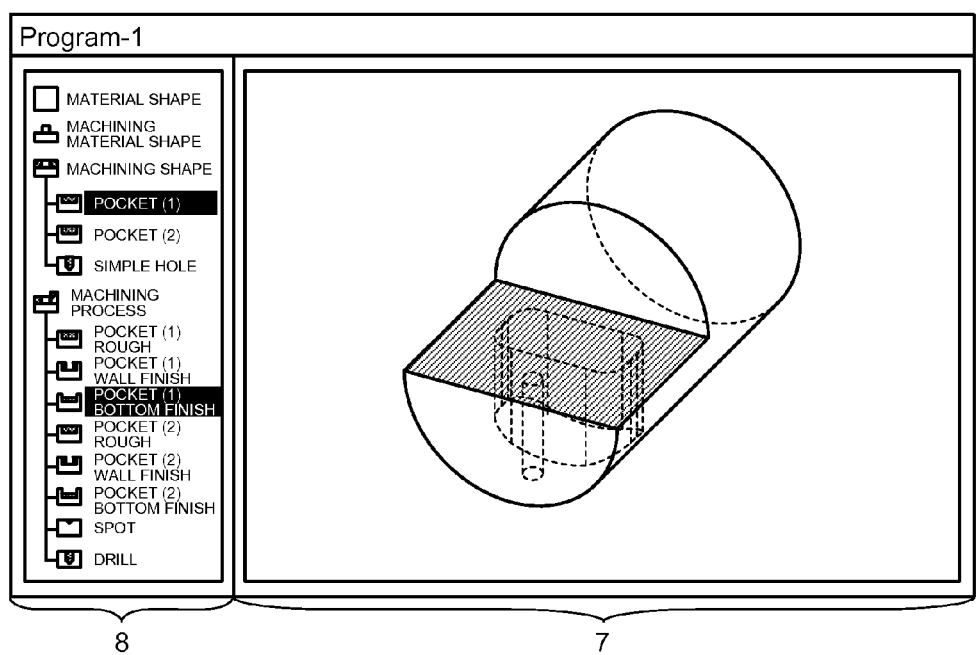
Figures 3, 48:
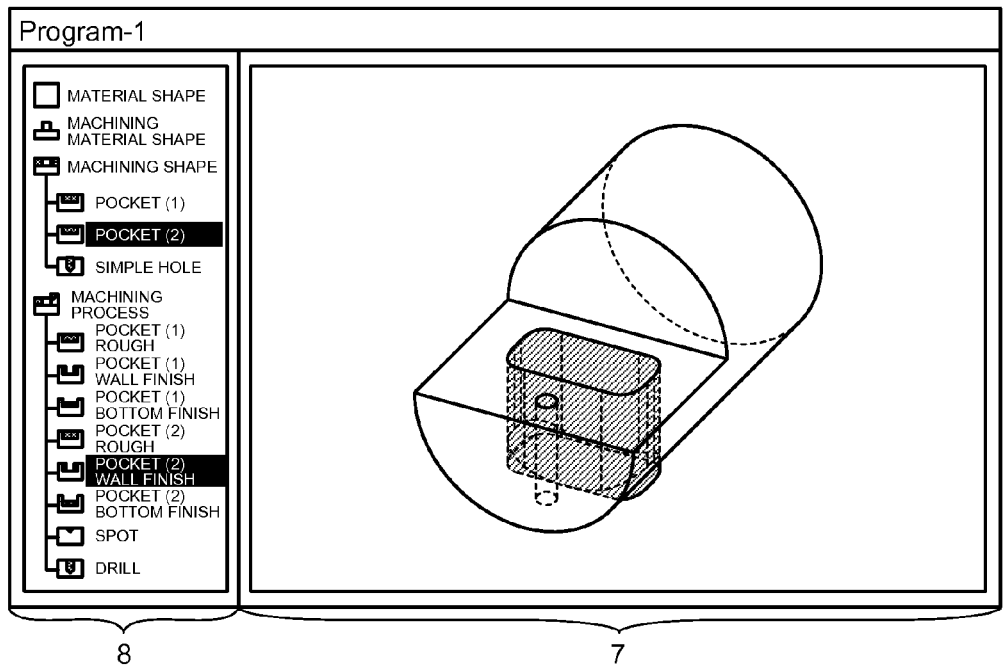
Figures 4, 48:
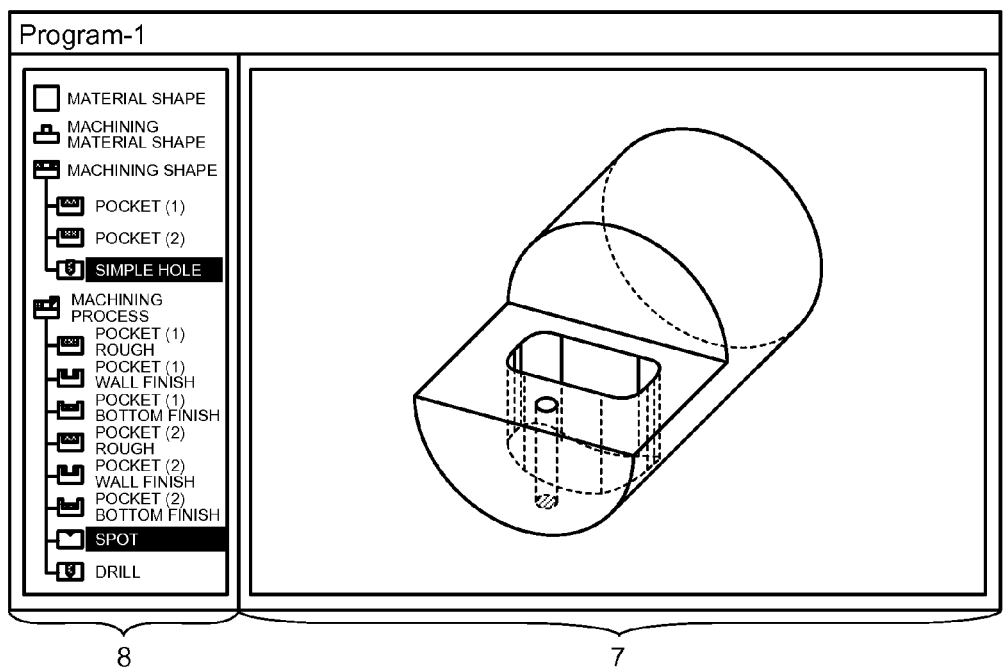
Figures 5, 48:
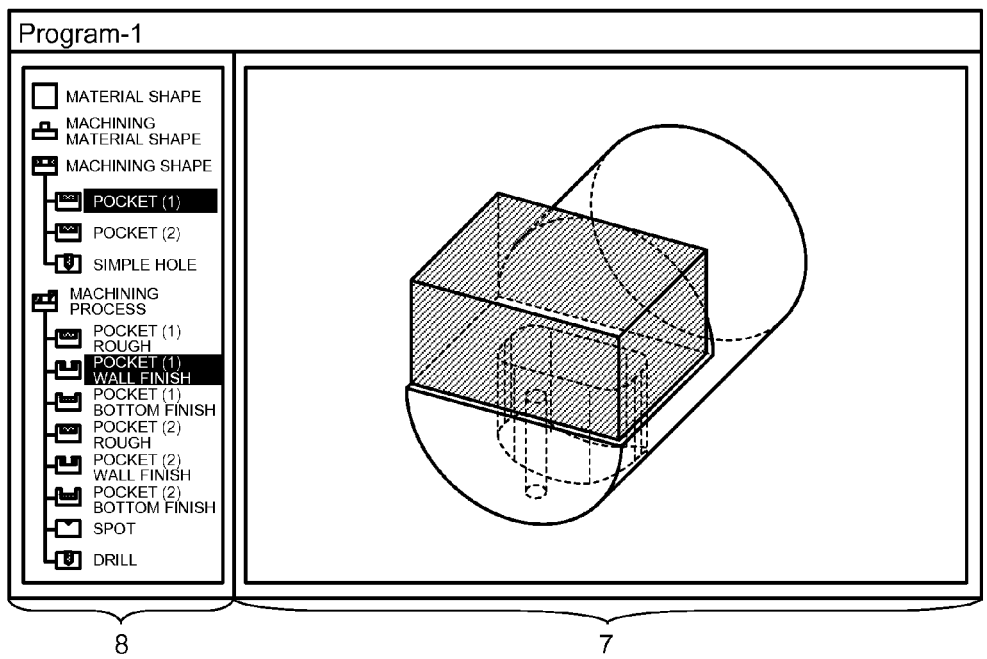
Figures 6, 48:
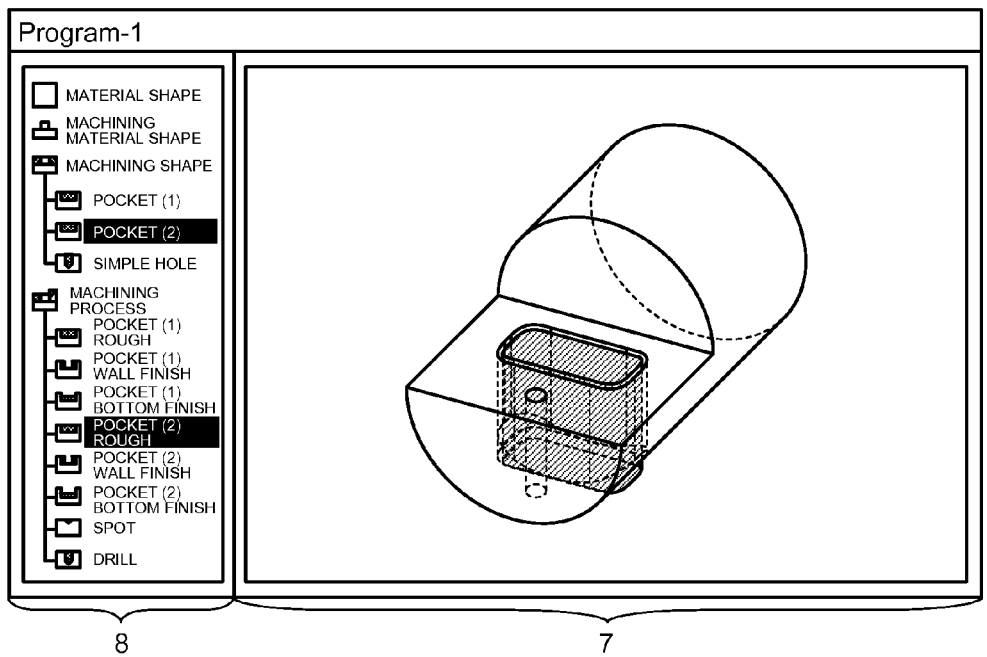
Figures 7, 48:
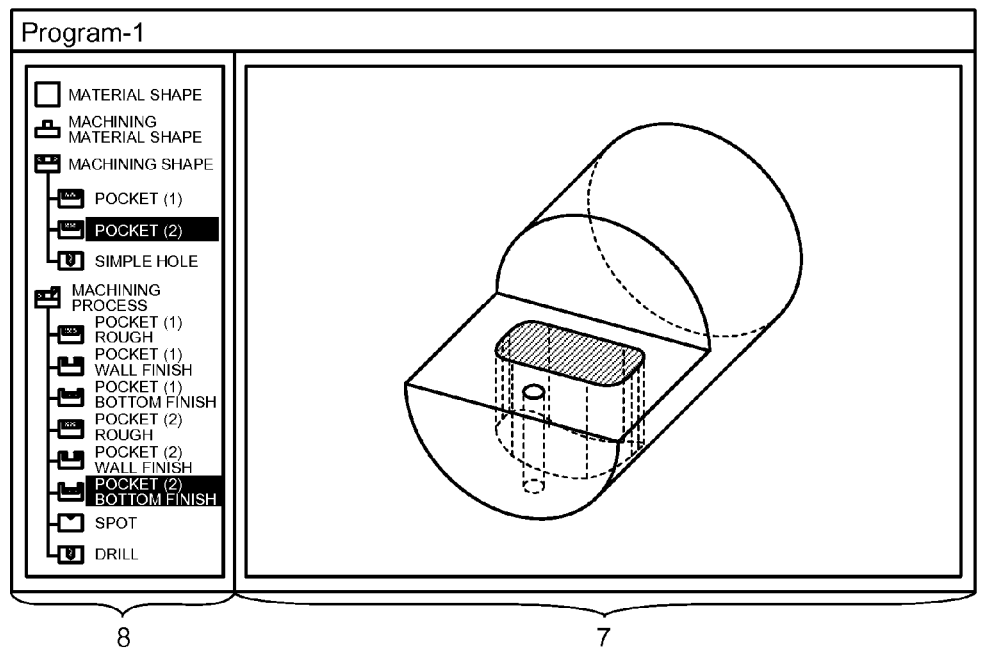
Figures 8, 48:
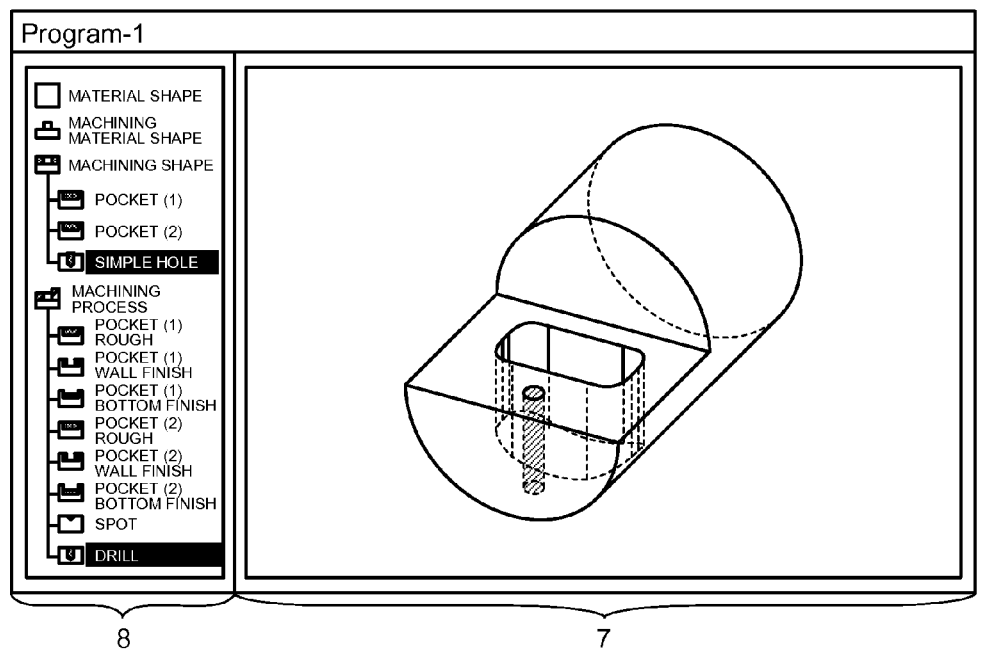

FIG. 48-7 is a diagram of a display screen example displayed on the output device of the automatic programming apparatus in the second embodiment.

Figures 1, 8:
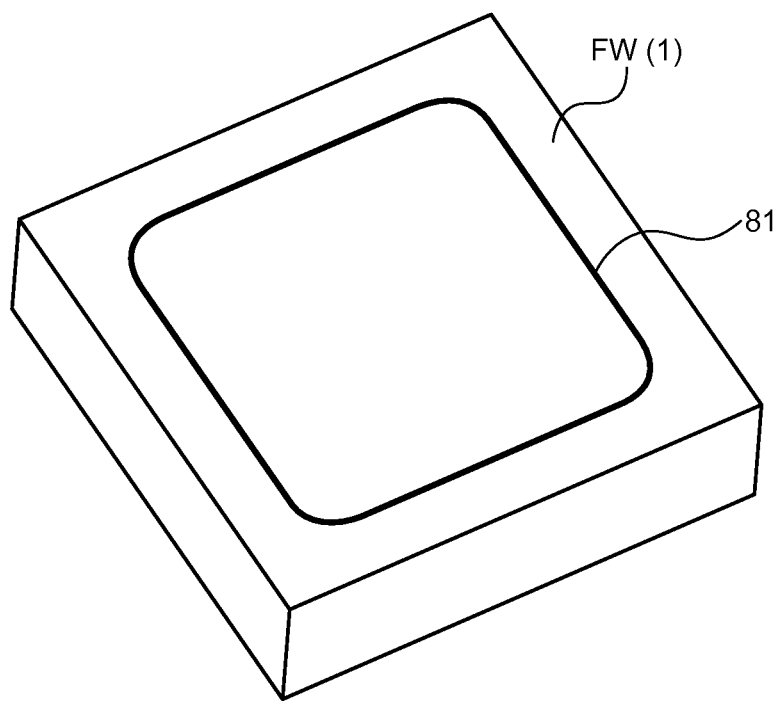
Figures 2, 8:
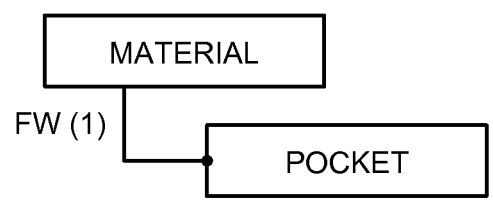

FIG. 48-8 is a diagram of a display screen example displayed on the output device of the automatic programming apparatus in the second embodiment.

Figure 1:
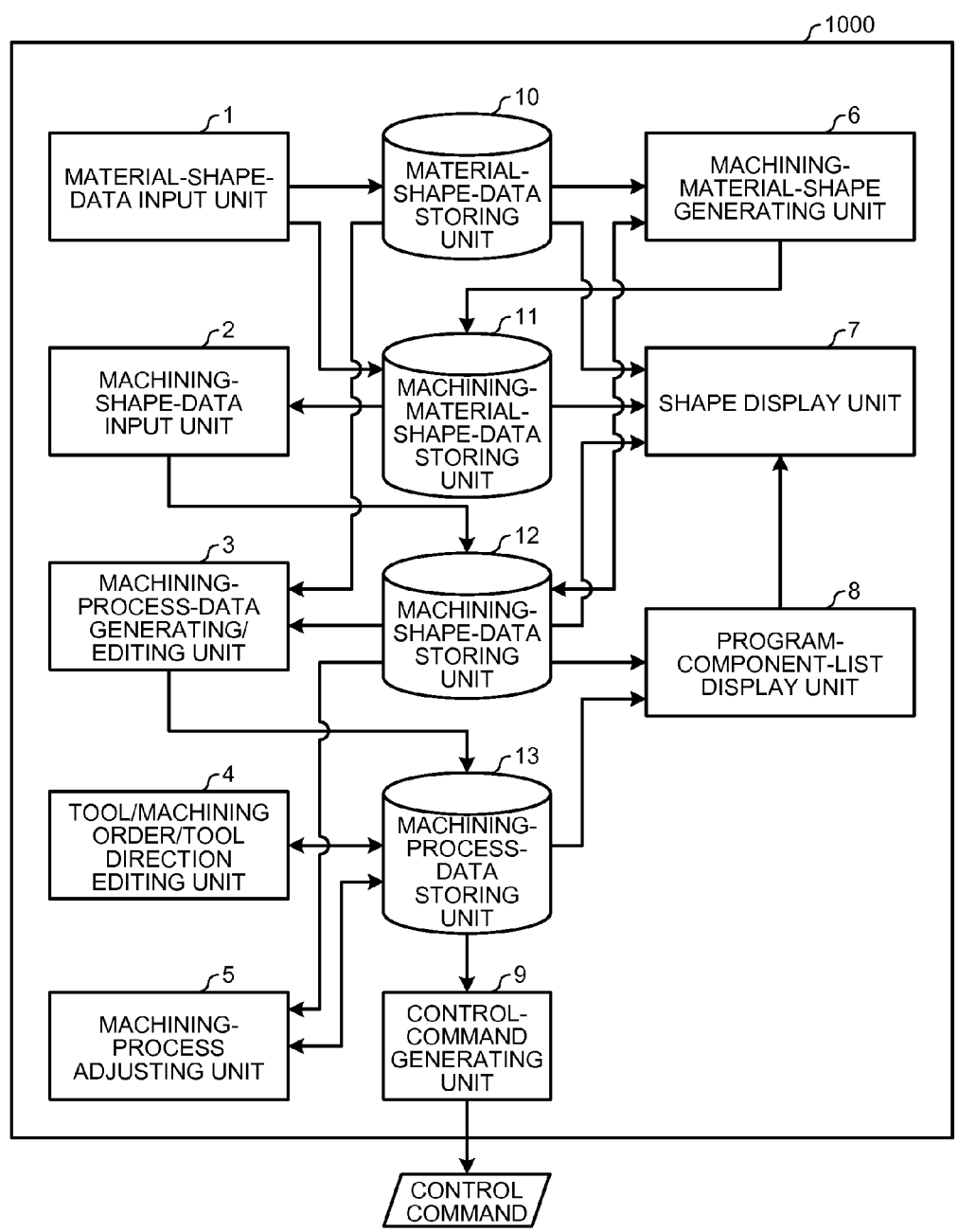
FIG. 1 is a diagram for explaining the configuration of a first embodiment of an automatic programming apparatus.
Figures 1, 49:
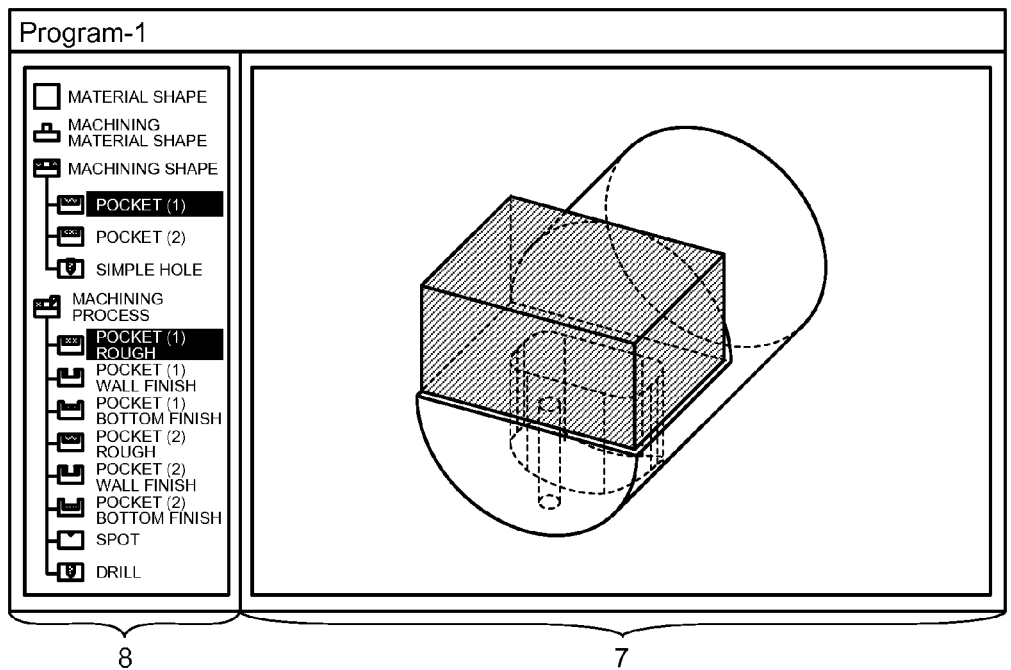
Figures 2, 49:
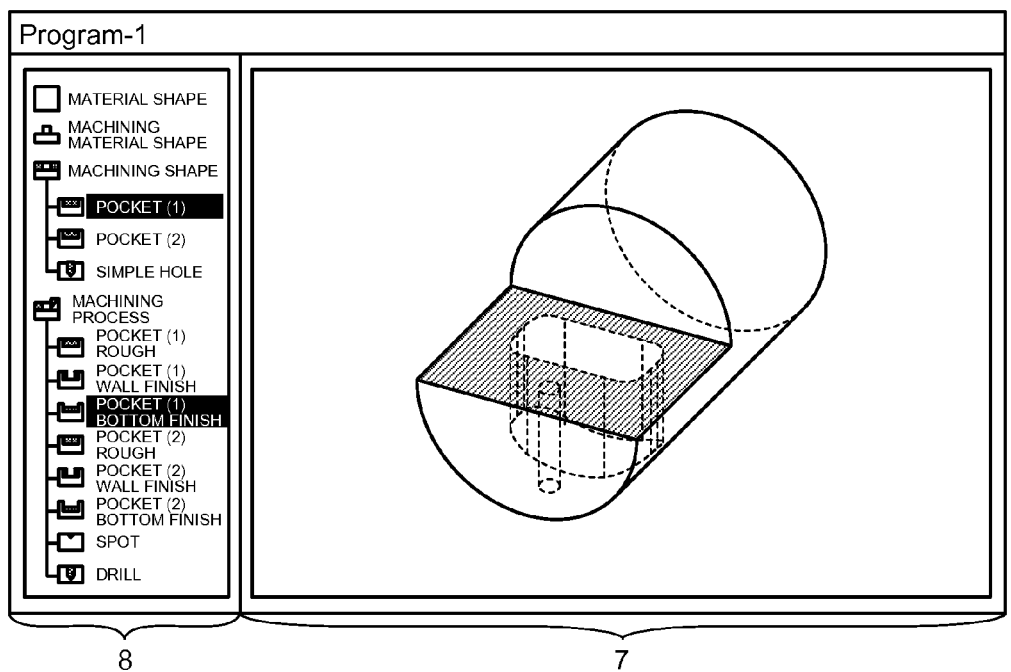
Figures 3, 49:
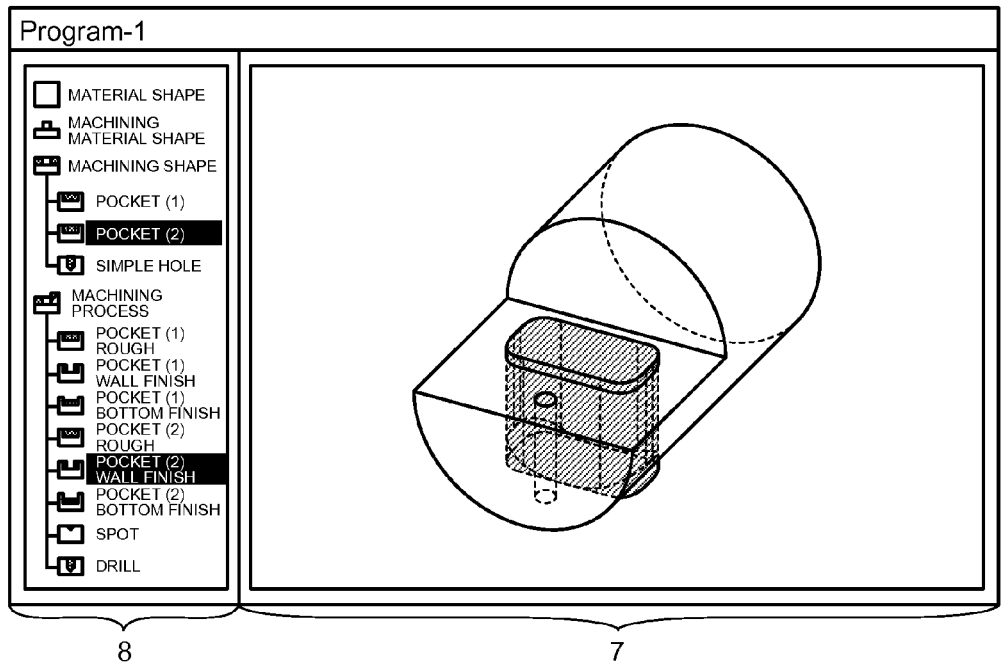
Figures 4, 49:
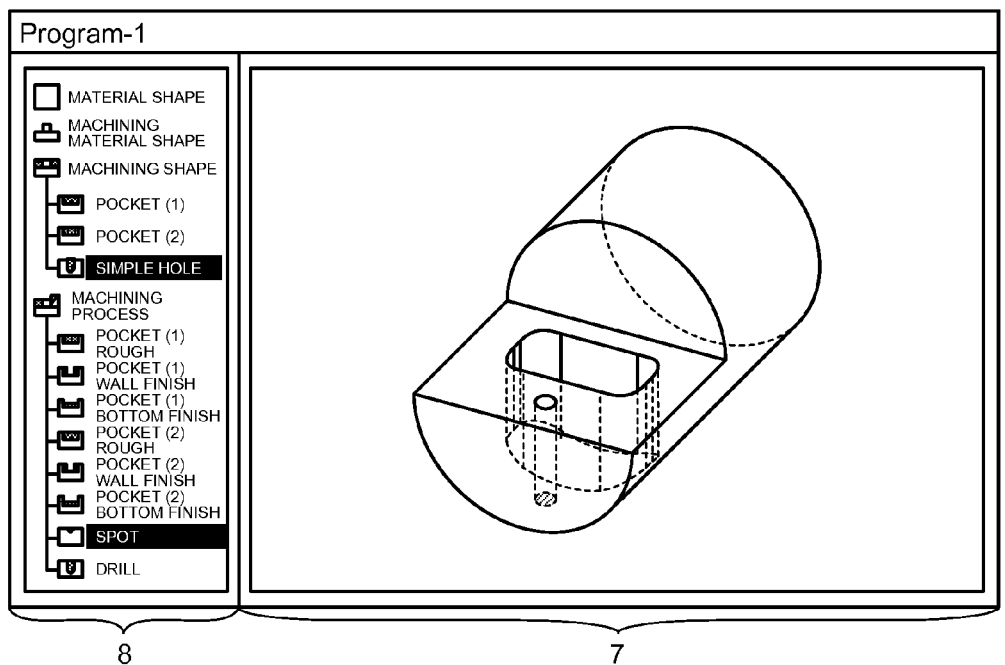
Figures 5, 49:
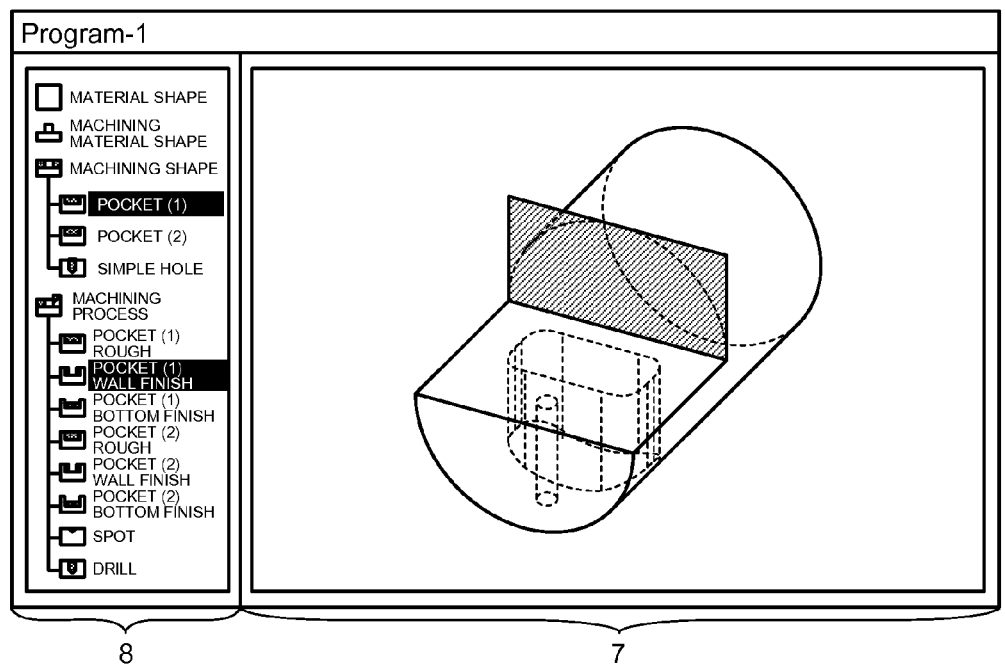
Figures 6, 49:
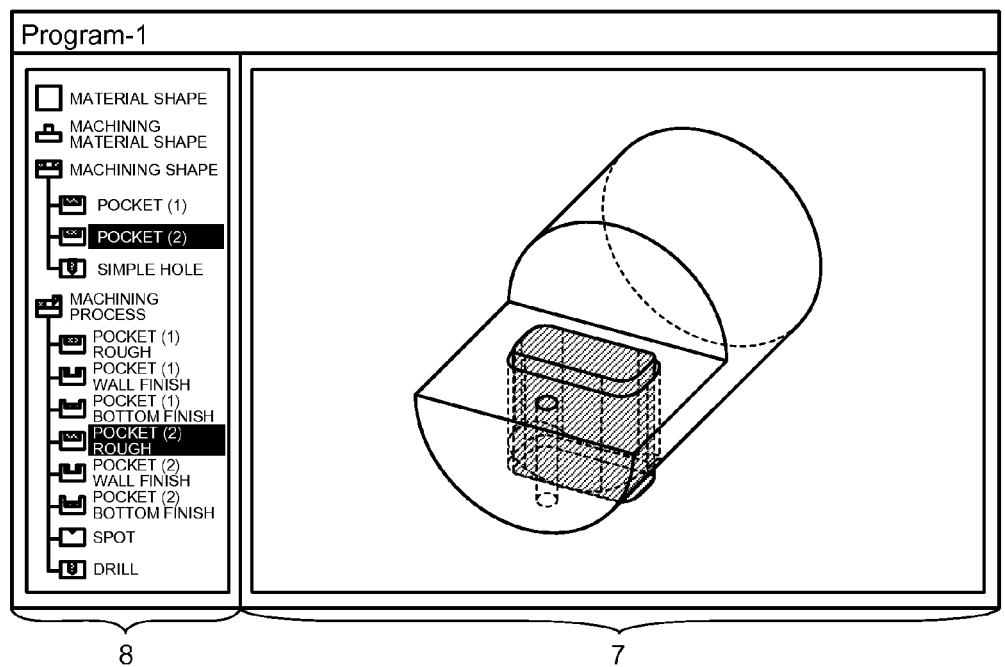
Figures 7, 49:
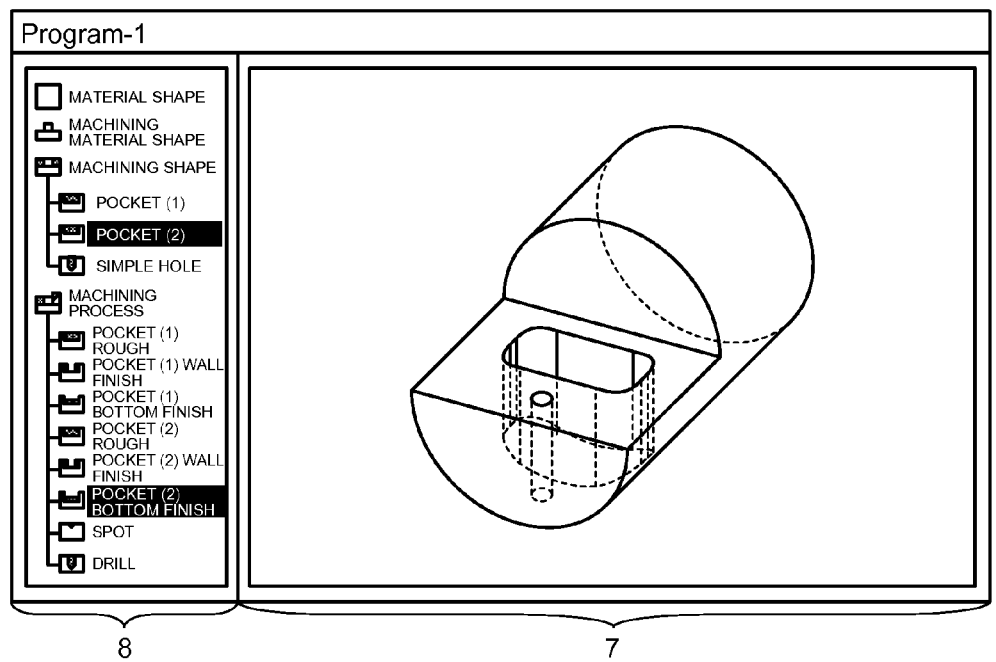
Figures 8, 49:
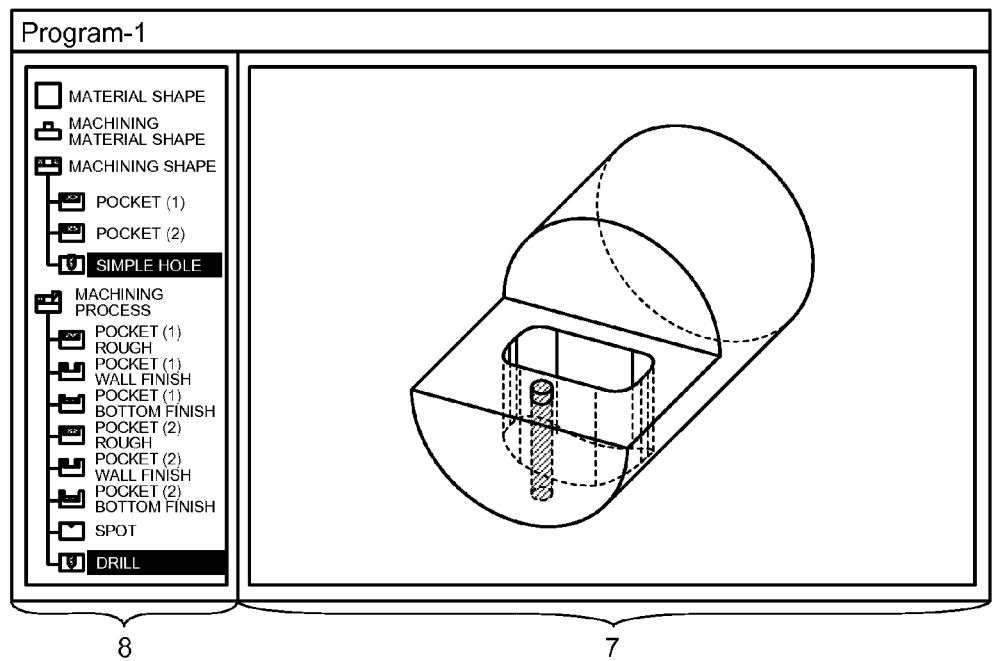

FIG. 49-1 is a diagram of a display screen example displayed on the output device of the automatic programming apparatus in the second embodiment.

Figure 2:
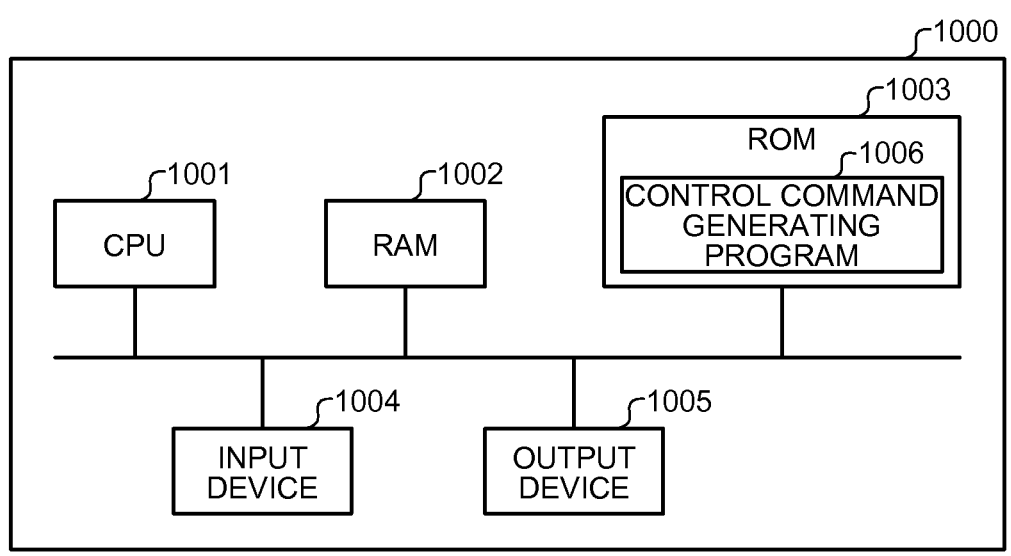
FIG. 2 is a diagram for explaining a hardware configuration example of the automatic programming apparatus in the first embodiment.

FIG. 49-2 is a diagram of a display screen example displayed on the output device of the automatic programming apparatus in the second embodiment.

Figure 3:
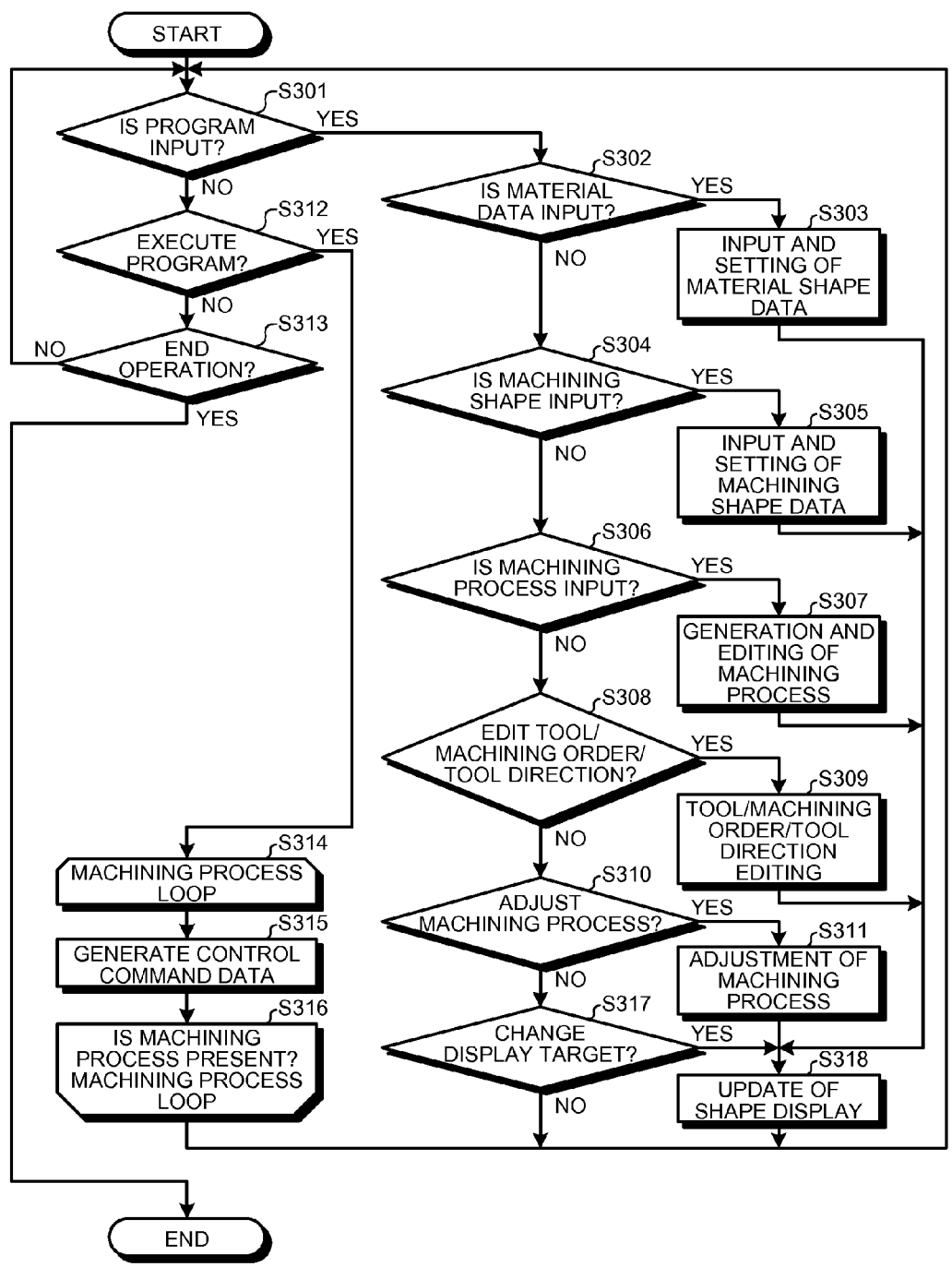
FIG. 3 is a flowchart for explaining a control command generating method in the first embodiment.

FIG. 49-3 is a diagram of a display screen example displayed on the output device of the automatic programming apparatus in the second embodiment.

Figures 1, 4:
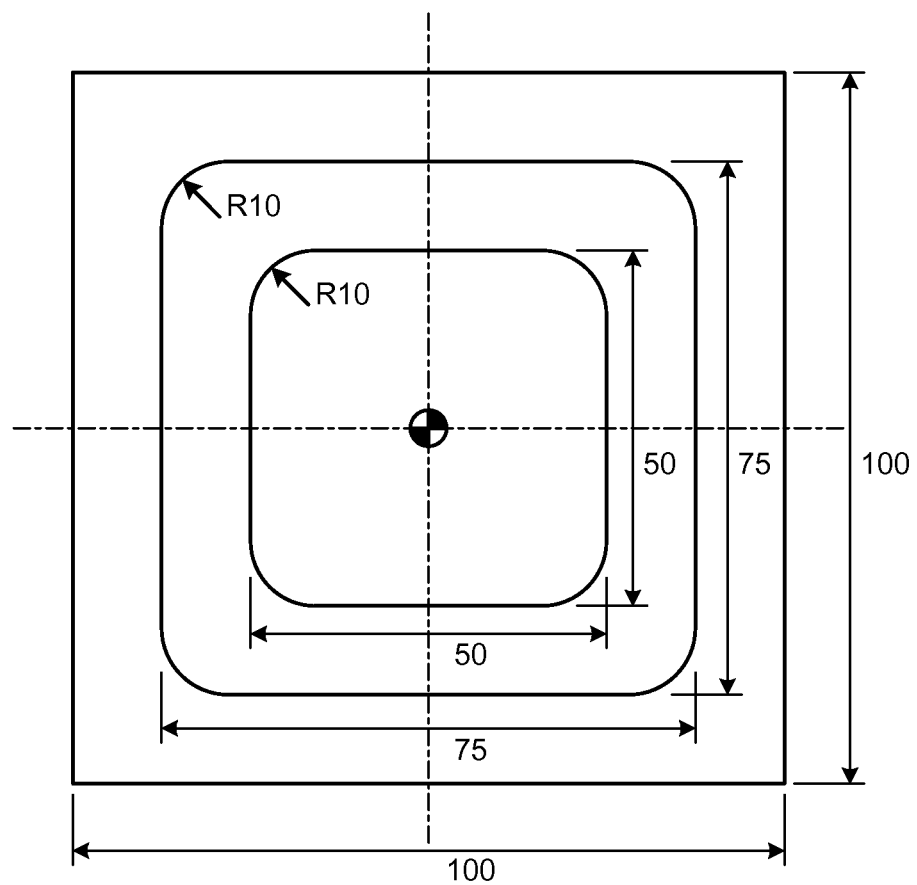
Figures 2, 4:
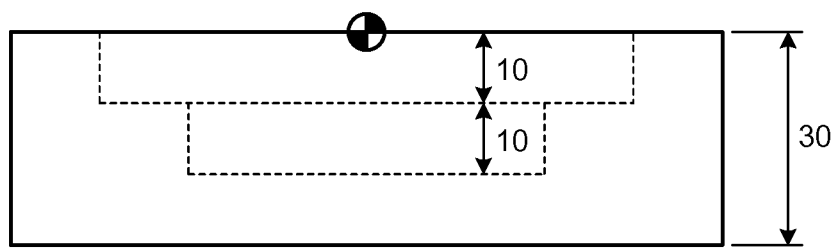

FIG. 49-4 is a diagram of a display screen example displayed on the output device of the automatic programming apparatus in the second embodiment.

Figures 1, 2, 5:
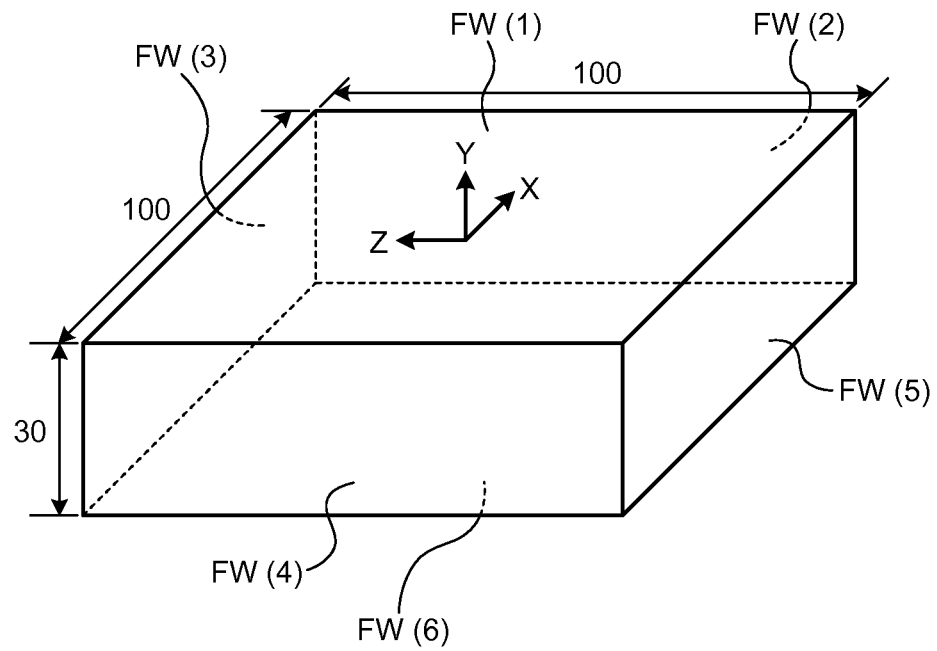

FIG. 49-5 is a diagram of a display screen example displayed on the output device of the automatic programming apparatus in the second embodiment.

Figures 1, 6:
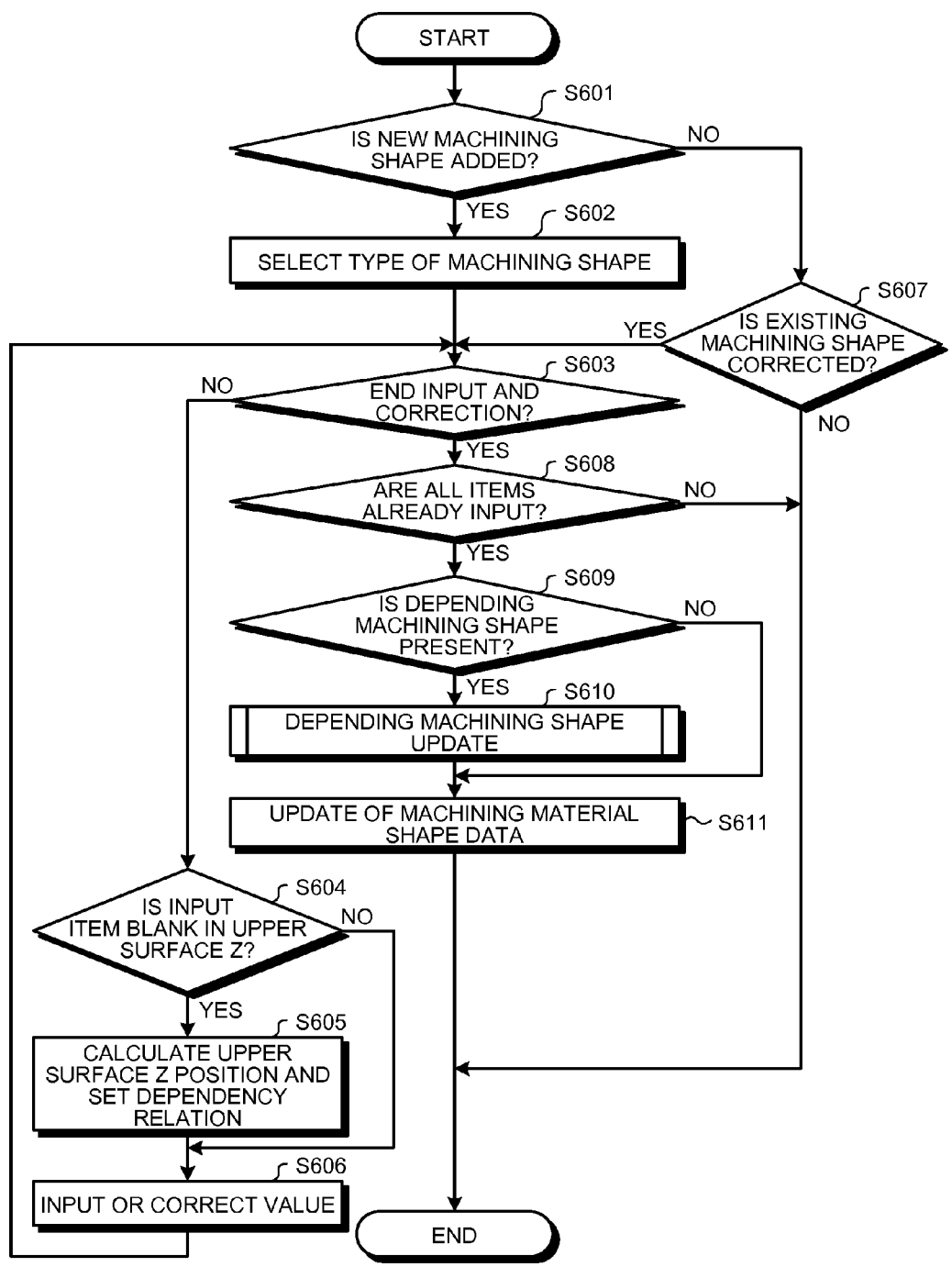
Figures 2, 6:
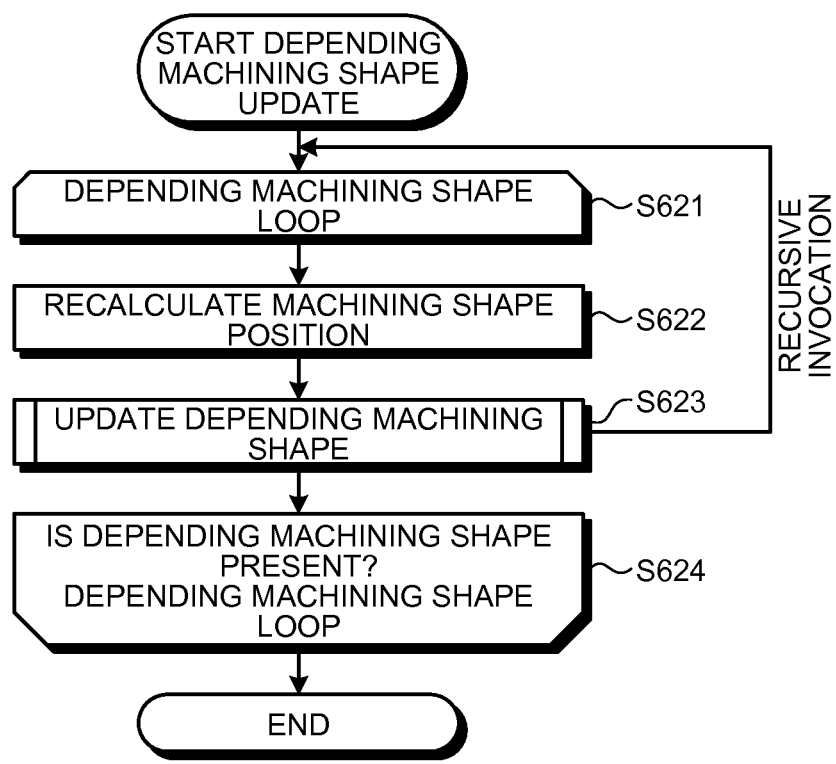

FIG. 49-6 is a diagram of a display screen example displayed on the output device of the automatic programming apparatus in the second embodiment.

FIG. 49-7 is a diagram of a display screen example displayed on the output device of the automatic programming apparatus in the second embodiment.

FIG. 49-8 is a diagram of a display screen example displayed on the output device of the automatic programming apparatus in the second embodiment.

DESCRIPTION OF EMBODIMENTS

Embodiments of an automatic programming apparatus and a control command generating method according to the present invention are explained in detail below based on the drawings. The present invention is not limited by the embodiments.

First Embodiment.

FIG. 1 is a diagram for explaining a first embodiment of an automatic programming apparatus.

As shown in the figure, an automatic programming apparatus 1000 includes a material-shape-data input unit 1, a machining-shape-data input unit 2, a machining-process-data generating/editing unit 3, a tool/machining order/tool direction editing unit 4, a machining-process adjusting unit 5, a machining-material-shape generating unit 6, a shape display unit 7, a program-component-list display unit 8, a control-command generating unit 9, a material-shape-data storing unit 10, a machining-material-shape-data storing unit 11, a machining-shape-data storing unit 12, and a machining-process-data storing unit 13.

The material-shape-data input unit 1 receives externally-input material shape data defining the shape of a material (a material shape). The material-shape-data input unit 1 stores the input material shape data respectively in the material-shape-data storing unit 10 and the machining-material-shape-data storing unit 11. The material shape is defined by the type of a shape, a coordinate position, a dimension of the shape, and the like.

The machining-shape-data input unit 2 determines, referring to externally-input machining material shape data or machining material shape data stored in the machining-material-shape-data storing unit 11, machining shape data defining the shape of a portion to be removed by machining (a machining shape) and stores the machining shape data in the machining-shape-data storing unit 12. The machining shape is defined by the type of a shape, a coordinate position, a dimension of the shape, and the like.

The machining-process-data generating/editing unit 3 generates, referring to the material shape data stored in the material-shape-data storing unit 10, the machining shape data stored in the machining-shape-data storing unit 12, and the like, machining process data defining a machining process such as a machining shape, a machining method, a tool in use, and machining conditions and stores the generated machining process data in the machining-process-data storing unit 13. The machining-process-data generating/editing unit 3 corrects, based on an external instruction, the machining process data stored in the machining-process-data storing unit 13 and updates the machining process data stored in the machining-process-data storing unit 13 with the corrected machining process data.

The tool/machining order/tool direction editing unit 4 displays a list of tools in use for machining processes from the machining process data stored in the machining-process-data storing unit 13, performs, based on an external instruction, a change of the tools in use for the machining processes and a change of the execution order of the machining processes and tool directions, and updates the machining process data stored in the machining-process-data storing unit 13 with the corrected machining process data. The tool direction refers to a direction in which a tool is fed during machining in an axis direction of the tool.

The machining-process adjusting unit 5 performs, based on the machining shape data stored in the machining-shape-data storing unit 12 and the machining process data stored in the machining-process-data storing unit 13, deformation of a machining shape to reduce useless machining as much as possible. The deformation of the machining shape is executed taking into account the machining order of machining processes, tool directions of the machining processes, and a positional relation of machining shapes. The deformation result is reflected on the machining process data stored in the machining-process-data storing unit 13.

The machining-material-shape generating unit 6 generates, from the material shape data stored in the material-shape-data storing unit 10 and the machining shape data stored in the machining-shape-data storing unit 12, machining material shape data obtained by removing a machining shape from a material shape and stores the generated machining material shape data in the machining-material-shape-data storing unit 11. The machining-material-shape generating unit 6 determines the dimension of a region concerning a machining shape, for which a dimension of a region is determined according to a machining material shape, corrects the machining shape data, and updates the machining shape data stored in the machining-shape-data storing unit 12 with the corrected machining shape data.

The shape display unit 7 combines, based on display target data obtained from the program-component-list display unit 8, the material shape data stored in the material-shape-data storing unit 10, the machining material shape data stored in the machining-material-shape-data storing unit 11, and the machining shape data stored in the machining-shape-data storing unit 12 and displays combined data.

The program-component-list display unit 8 displays a list of the machining shape data stored in the machining-shape-data storing unit 12 and the machining process data stored in the machining-process-data storing unit 13 and items for selecting a material shape and a machining material shape, determines a display target from an external instruction, and sends display target information to the shape display unit 7.

The control-command generating unit 9 reads out, in the order of execution, the machining process data stored in the machining-process-data storing unit 13 and sequentially generates, from the read-out machining process data, control commands for controlling a machine tool.

A driving power source (a motor, etc.) for the machining tool is driven by a current command generated under numerical control by a numerical control apparatus. The control-command generating unit 9 can output the current command as a control command or can output a code of a machining program, which is a program for causing the numerical control apparatus to generate the current command, as a control command.

The material-shape-data storing unit 10 stores the material shape data. The machining-material-shape-data storing unit 11 stores the machining material shape data. The machining-shape-data storing unit 12 stores the machining shape data in the order of removal from a material shape in generating a machining material shape. The machining-process-data storing unit 13 stores the machining process data in the order of execution in generating a control command.

FIG. 2 is a diagram for explaining a hardware configuration example of the automatic programming apparatus 1000 in the first embodiment. As shown in the figure, the automatic programming apparatus 1000 includes a configuration same as the configuration of a normal computer. Specifically, the automatic programming apparatus 1000 includes a CPU (Central Processing Unit) 1001, a RAM (Random Access Memory) 1002, a ROM (Read Only Memory) 1003, an input device 1004, and an output device 1005. The CPU 1001, the RAM 1002, the ROM 1003, the input device 1004, and the output device 1005 are connected to one another by a bus.

The input device 1004 is configured by a mouse, a keyboard, and the like and receives an input of operation content from an operator and an external input. The input content is sent to the CPU 1001. The output device 1005 is configured by a liquid crystal display, a CRT (Cathode Ray tube) display, or the like and outputs a display screen used by the operator for an operation input and an external input. The display screen is created by the CPU 1001.

The ROM 1003 has stored therein a control command generating program 1006, which is a computer program for generating a control command for performing machining while reducing useless machining as much as possible. The control command generating program 1006 is formed in a module configuration including the respective functional components explained above (the material-shape-data input unit 1, the machining-shape-data input unit 2, the machining-process-data generating/editing unit 3, the tool/machining order/tool direction editing unit 4, the machining-process adjusting unit 5, the machining-material-shape generating unit 6, the shape display unit 7, the program-component-list display unit 8, the control-command generating unit 9, the material-shape-data storing unit 10, the machining-material-shape-data storing unit 11, the machining-shape-data storing unit 12, and the machining-process-data storing unit 13). The control command generating program 1006 is read out to the CPU 1001 and expanded in the RAM 1002. The CPU 1001 realizes the respective functional components by executing the module expanded in the RAM 1002. The CPU 1001 generates a control command based on an external input from the input device 1004 and temporarily stores the generated control command in the RAM 1002. The control command stored in the RAM 1002 is output to a machine tool or a numerical control apparatus not shown in the figure.

The material-shape-data storing unit 10, the machining-material-shape-data storing unit 11, the machining-shape-data storing unit 12, or the machining-process-data storing unit 13 can be generated in an external storage device (not shown in the figure). The CPU 1001 can output the generated control command to the external storage device. The automatic programming apparatus 1000 can be realized using a computer that realizes the function of the numerical control apparatus.

The control command generating program 1006 can be configured to be stored on a computer connected to a network such as the Internet and provided or distributed by being downloaded through the network. A storage medium for storing the control command generating program 1006 is not limited to the ROM 1003 and can be configured by a disk such as a CD-ROM, a detachable flash memory, or an external storage device.

A control command generating method realized using the automatic programming apparatus 1000 is explained. FIG. 3 is a flowchart for explaining the control command generating method in the first embodiment.

As shown in the figure, the automatic programming apparatus 1000 checks an operator instruction to perform a program input (step S301). When the instruction to carry out a program input is received (Yes at step S301), the automatic programming apparatus 1000 proceeds to processing at step S302. When the instruction to carry out a program input is not received (No at step S301), the automatic programming apparatus 1000 proceeds to processing at step S312.

At step S302, the automatic programming apparatus 1000 checks an operator instruction to perform an input of material shape data. When the instruction to carry out a material shape data input is received (Yes at step S302), the automatic programming apparatus 1000 proceeds to step S303. When the instruction to carry out a material shape input is not received (No at step S302), the automatic programming apparatus 1000 proceeds to processing at step S304.

At step S303, the material-shape-data input unit 1 receives material shape data externally input by the operator and stores the received material shape data in the material-shape-data storing unit 10 and the machining-material-shape-data storing unit 11. After the processing at step S303, the automatic programming apparatus 1000 proceeds to processing at step S318.

The shape display unit 7 displays a material shape, a machining shape, and a machining material shape on the output device 1005. When any one of the shapes is updated or input anew, the shape display unit 7 updates the display of the currently displayed shape (step S318). That is, after step S303, description content of the material shape data is displayed on the output device 1005 by the shape display unit 7.

A setting example of the material shape data is explained with reference to an example of a work piece. FIG. 4-1 is a top view of the work piece referred to as the example. FIG. 4-2 is a side view of the work piece. FIG. 5-1 is a perspective view of a material shape for creating the work piece shown in FIGS. 4-1 and 4-2. FIGS. 5-2 and 5-3 are diagrams for explaining a display screen example for inputting material shape data of the material shape. As shown in FIG. 5-1, the material shape of the work piece is a rectangular parallelepiped shape. As shown in FIG. 5-2, input items for setting of the material shape data include definition of a reference point on a material shape used for specifying a position of the material shape, positions (a position X, a position Y, and a position Z) on a work coordinate system of the reference point on the material shape, and dimensions (length X, length Y, and length Z) in X, Y, and Z-axis directions of the material shape. The reference point on the material shape is designated by selecting positions of any one of minimums, centers, and maximums in ranges of the material shape in the respective X, Y, and Z-axis directions on a display screen shown in FIG. 5-3. In the example shown in FIG. 5-2, XC-YC-ZH (the centers of the ranges in the X and Y-axis directions and a point of the maximum in the range in the Z-axis direction) is selected as a definition of the reference point. A center point of a surface of the rectangular parallelepiped shape perpendicular to the Z-axis and on the Z-axis direction side is the reference point, which is matched with a reference point on the diagram of the work piece shown in FIG. 4-1. This is for facilitating position designation of a machining shape with respect to a material shape by selecting a reference point on the machining shape in the same manner in the input of the machining shape data in the processing at step S305. The material shape is set according to the setting of the display screen example shown in FIG. 5-2 such that a reference point coincides with a work origin as shown in FIG. 5-1. Attribute information (FW(1) to FW(6)) indicating surfaces of the material shape is added to the respective surfaces of the material shape.

At step S304, the automatic programming apparatus 1000 checks an operator instruction to perform an input of machining shape data. When the instruction to carry out an input of machining shape data is received (Yes at step S304), the automatic programming apparatus 1000 proceeds to processing at step S305. When the instruction to carry out an input of machining shape data is not received (No at step S304), the automatic programming apparatus 1000 proceeds to processing at step S306.

At step S305, the machining-shape-data input unit 2 receives machining shape data input from the operator and stores the received machining shape data in the machining-shape-data storing unit 12. FIGS. 6-1 and 6-2 are flowcharts for explaining an operation at step S305.

As shown in FIG. 6-1, the machining-shape-data input unit 2 checks an operator instruction to perform addition of a new machining shape (step S601). When the instruction to perform addition of a new machining shape is received (Yes at step S601), the machining-shape-data input unit 2 proceeds to processing at step S602. When the instruction to perform addition of a new machining shape is not received (No at step S601), the machining-shape-data input unit 2 proceeds to processing at step S607.

At step S602, the machining-shape-data input unit 2 receives selection of a type of the machining shape to be added from the operator. When the type of the machining shape is selected, an input window for definition data corresponding to the type is displayed and input work is started.

After the processing at step S602, the machining-shape-data input unit 2 checks an operator instruction to end data input or correction work (step S603). When the operator instruction is received (Yes at step S603), the machining-shape-data input unit 2 proceeds to processing at step S608. When the operator instruction is not received, the machining-shape-data input unit 2 proceeds to processing at step S604.

At step S604, the machining-shape-data input unit 2 checks whether a present input item is a field of a Z position of a machining shape upper surface (a surface of the machining shape perpendicular to the Z axis and on the Z-axis direction side) and is blank (a state in which a value is not input). When the present input item is the machining shape upper surface Z position and the value is blank (Yes at step S604), the machining-shape-data input unit 2 proceeds to processing at step S605. When the present input item is not the machining shape upper surface Z position or the value is not blank (No at step S604), the machining-shape-data input unit 2 proceeds to processing at step S606.

The machining-shape-data input unit 2 can set, as the machining shape, a solid obtained by sweeping a plane of an externally-input desired shape (a region for defining the machining shape) in a direction perpendicular to the plane. The sweep is as used in sweeping a surface in a fixed direction and deforming the surface into a solid. In this explanation, a sweeping direction of the region for defining the machining shape is limited to the Z-axis direction. However, the machining-shape-data input unit 2 can be configured to be capable of sweeping the machining shape in an arbitrary direction desired by the operator. The region for defining the machining shape is not limited to the plane and can be, for example, a curved surface. In the following explanation, the region for defining the machining shape is sometimes described as machining region.

At step S605, the machining-shape-data input unit 2 carries out the calculation of a Z-axis position on the machining shape upper surface and setting of a dependency relation between a material shape and a machining shape or between machining shapes.

FIGS. 7-1, 7-2, 7-3, 8-1, and 8-2 are diagrams for explaining states of definition of a machining shape of a pocket section (a first stage pocket) in the center in the work piece shown in FIGS. 4-1 and 4-2. FIG. 7-1 is a diagram of a machining region for defining the pocket section. FIGS. 7-2 to 7-4 are diagrams of examples of a display screen for an input for defining the machining shape of the pocket section. As shown in FIGS. 7-2 to 7-4, as input items for defining the machining shape, reference point selection on the machining shape for designating a position of the machining shape, XY direction positions (a position X and a position Y) on a work coordinate system of the reference point, dimensions (length X and length Y) in the X and Y-axis directions of the machining shape, the radius of a corner R, an upper surface Z position (an upper surface Z) of the machining shape, and a distance (depth) from the upper surface to the lower surface (a surface of the machining shape perpendicular to the Z axis and on a Z-axis-direction side) of the machining shape are displayed.

A setting method same as the setting method in inputting the material shape data is used as a setting method for the reference point. As an initial value, the value in the material shape data input is input. Consequently, in most cases where an input of a position can be easily performed because the reference point is set by the same method for the material shape and the machining shape, labor and time for designating the reference point can be saved.

On a display screen shown in FIG. 7-2, values are input concerning items for determining a position and a dimension in a region on a plane of the machining shape perpendicular to the Z axis (the shape shown in FIG. 7-1). When an input item to be input is shifted to the upper surface Z position (the upper surface Z) of the machining shape, because the value is blank, the calculation of the upper surface Z position is executed according to the processing at step S605.

In this calculation, when a region shape on the plane of the machining shape perpendicular to the Z axis is moved in a Z-axis-direction from a position apart from the machining material shape in the Z-axis direction, a Z position at the time when the region shape comes into contact with the machining material shape first is extracted and set as a value of the upper surface Z position (FIG. 7-3). FIG. 8-1 shows a state at the time when the machining region shown in FIG. 7-1 has come into contact with the machining material shape first. The machining region 81 shown in FIG. 8-1 is a start point for defining the machining shape.

At this point, a surface of the machining material shape with which the machining region on the plane of the machining shape perpendicular to the Z axis comes into contact first is extracted. From the attribute attached to the surface, it is recognized whether the surface is a surface of a material shape or it is recognized a surface of which machining shape the surface is. The relation that the machining shape being set depends on the recognized material shape or machining shape is set. FIG. 8-2 shows a state in which the relation that the pocket depends on a surface FW(1) of a material is set.

Figures 1, 9:
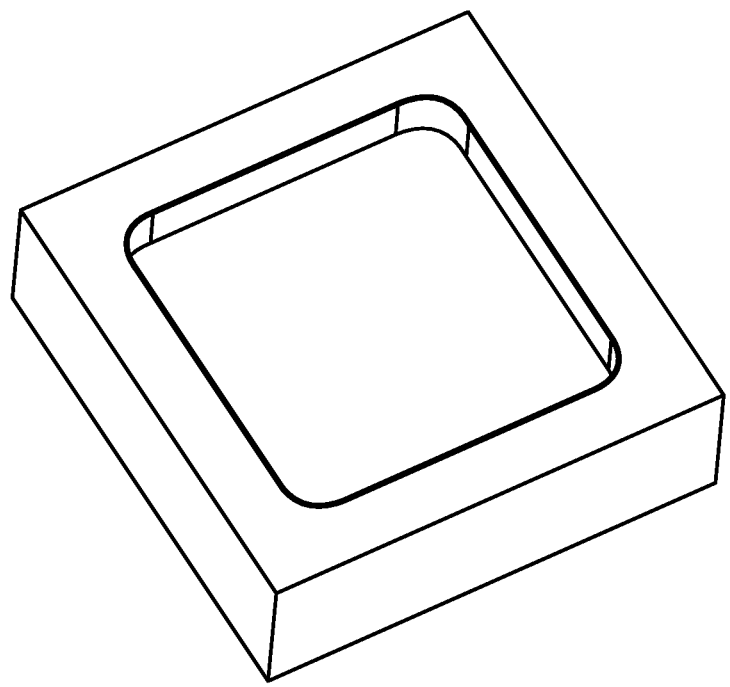
Figures 2, 9:
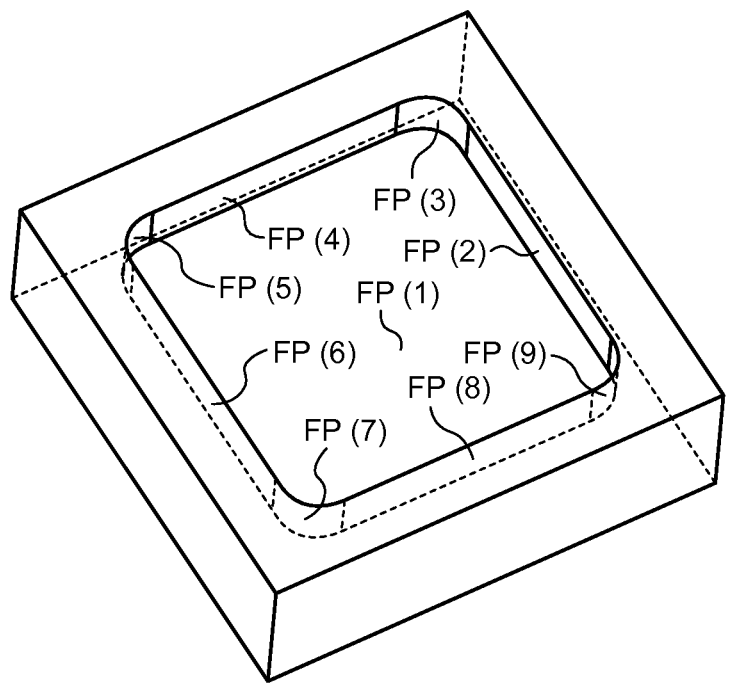

FIG. 7-4 shows a display screen to which a distance (depth) from the upper surface to the lower surface of the machining shape is input. At this point, a positional relation between the machining material shape and the machining shape is as shown in FIG. 9-1. A portion indicated by a thin line is the machining material shape and a portion indicated by a thick line is the machining shape of the pocket section.

Referring back to FIG. 6, at step S606, concerning the present input item shown on the display screen for input, a value is input or corrected according to an instruction from the operator. After the processing at step S606, the machining-shape-data input unit 2 returns to the processing at step S603.

At step S607, the machining-shape-data input unit 2 checks an operator instruction to perform correction of existing machining shape data. When the instruction to perform the correction is received (Yes at step S607), the machining-shape-data input unit 2 proceeds to step S603. When the instruction to perform the correction is not received (No at step S607), the input of the machining shape data ends.

At step S608, the machining-shape-data input unit 2 checks whether all items related to the display screen for input has been already input. When all the input items are already input (Yes at step S608), the machining-shape-data input unit 2 proceeds to processing at step S609. When there is an item not input yet (No at step S608), the machining-shape-data input unit 2 ends the input of the machining shape data.

At step S609, the machining-shape-data input unit 2 checks whether a machining shape that depends on the machining shape to be input is present. When a machining shape that depends on the machining shape to be input is present (Yes at step S609), the machining-shape-data input unit 2 proceeds to processing at step S610. When a machining shape that depends on the machining shape to be input is absent (No at step S609), the machining-shape-data input unit 2 proceeds to processing at step S611.

At step S610, the machining-shape-data input unit 2 executes processing for updating the machining shape that depends on the machining shape to be input. Specifically, the machining-shape-data input unit 2 invokes, using the machining shape to be input as an argument, a function for recursively carrying out update of a position concerning a machining shape that depends on a machining shape designated by the argument.

FIG. 6-2 is a flowchart for explaining the processing at step S610 more in detail. As shown in the figure, processing at steps S621 to S624 configures loop processing for extracting, one by one, machining shapes that depend on designated machining shapes and executing update of a position in the function for recursively carrying out update of the position concerning the machining shapes that depend on the designated machining shapes. At step S622, a position of the extracted machining shape is recalculated according to a state of the depending machining shape. At step S623, a function for carrying out update of the position concerning the depending machining shape is recursively invoked using, as an argument, the machining shape for which the machining position is recalculated.

At step S611, the machining-material-shape generating unit 6 generates machining material shape data from the material shape data and the machining shape data and stores the generated machining material shape data in the machining-material-shape-data storing unit 11.

The processing at step S611 is specifically carried out as explained below. First, the machining-material-shape generating unit 6 sets a copy of the material shape data as the machining material shape data. While extracting machining shapes in order one by one, when a region of the extracted machining shape is determined based on the machining material shape, the machining-material-shape generating unit 6 decides a region of the machining shape based on the machining material shape and removes the machining shape, the region of which is decided, from the machining material shape to update the machining material shape data.

FIG. 9-2 is a diagram of an example of the machining material shape after the pocket machining shape shown in FIG. 9-1 has been removed. An attribute indicating a surface of the material shape and an attribute indicating a surface to which the pocket machining shape has been transferred are attached to respective surfaces of the machining material shape.

FIGS. 10-1, 10-2, 10-3, 10-4, 11-1, 11-2, 12-1, and 12-2 are diagrams of states in which a pocket section (a second stage pocket) is further added to the bottom surface of the first stage pocket.

Figures 1, 2, 10:
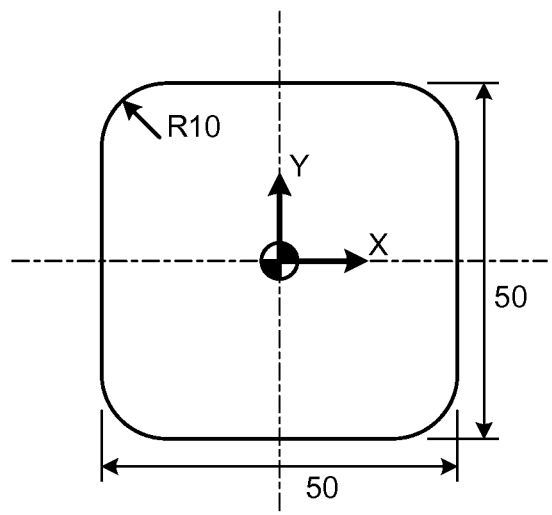

FIG. 10-1 shows a machining region for defining the second stage pocket. FIGS. 10-2 to 10-4 are examples of a display screen for input for defining a machining shape of the second stage pocket using the machining region. Input items include reference point selection on the machining shape for designating a position of the machining shape, XY direction positions (a position X and a position Y) on a work coordinate system of a reference point, dimensions (length X and length Y) in the X and Y-axis directions of the machining shape, the radius of a corner R, an upper surface Z position (an upper surface Z) of the machining shape, and a distance (depth) from the upper surface to the lower surface (the surface of the machining shape perpendicular to the Z axis and on the Z-axis-direction side) of the machining shape.

As shown in FIG. 10-2, when an input item to be input is shifted to the upper surface Z position (the upper surface Z) of the machining shape, because a value is blank, the calculation of the upper surface Z position is executed according to the processing at step S605. A calculated value is displayed as shown in FIG. 10-3.

Figures 1, 11:
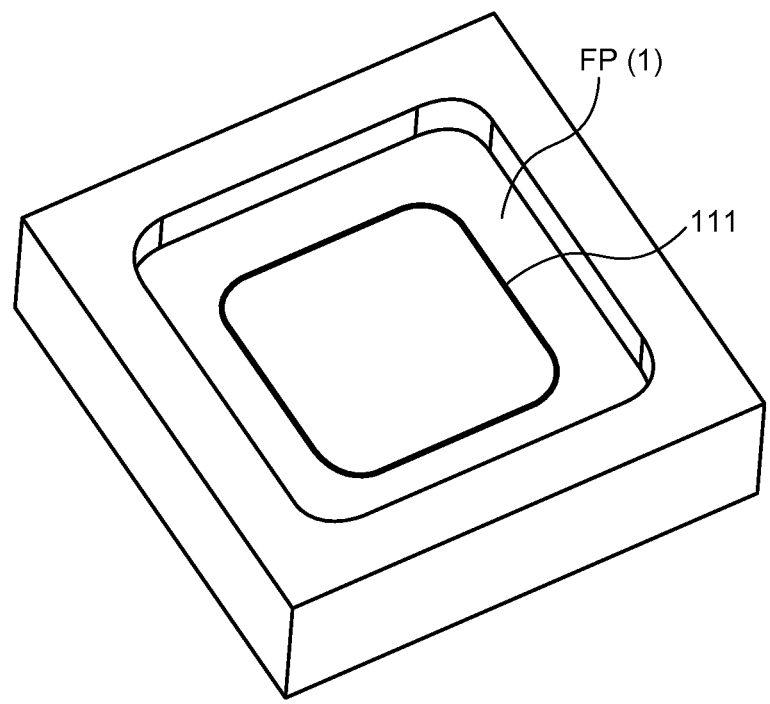
Figures 2, 11:
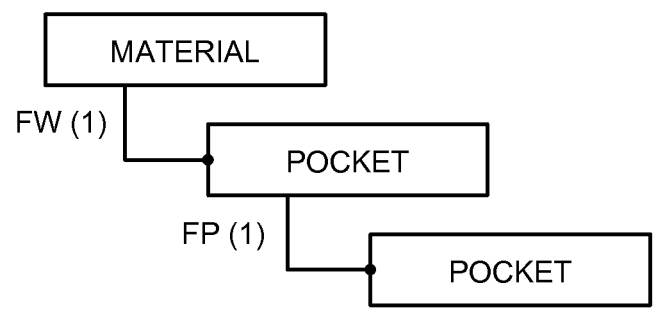

FIG. 11-1 shows a state at the time when the machining region shown in FIG. 10-1 comes into contact with a machining material shape first. As shown in the figure, a machining region 111 is located on the bottom surface of the first stage pocket. As shown in FIG. 11-2, a surface of the machining material shape with which the machining region on the plane of the machining shape perpendicular to the Z axis comes into contact first is extracted. From an attribute attached to the surface, it is recognized whether the surface is a surface of a material shape or it is recognized a surface of which machining shape the surface is. A relation that the machining shape being set depends on the recognized material shape or machining shape is set.

Figures 1, 12:
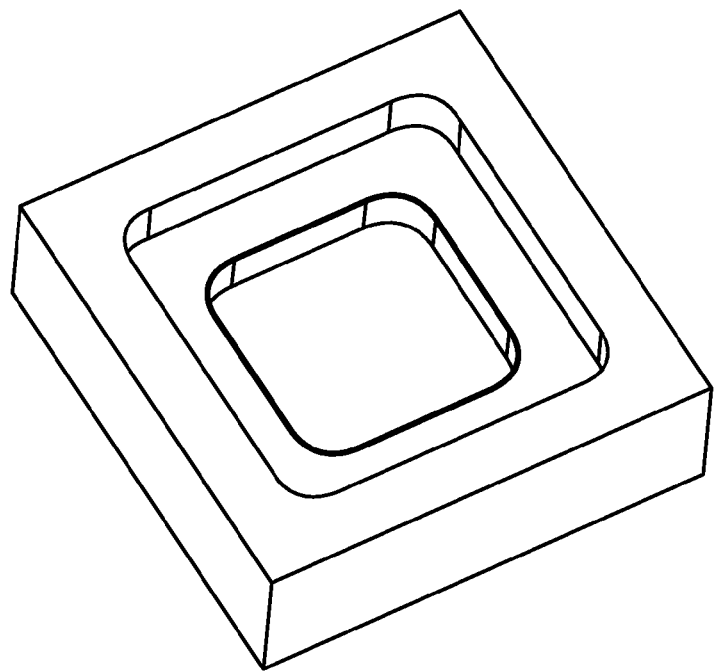
Figures 2, 12:
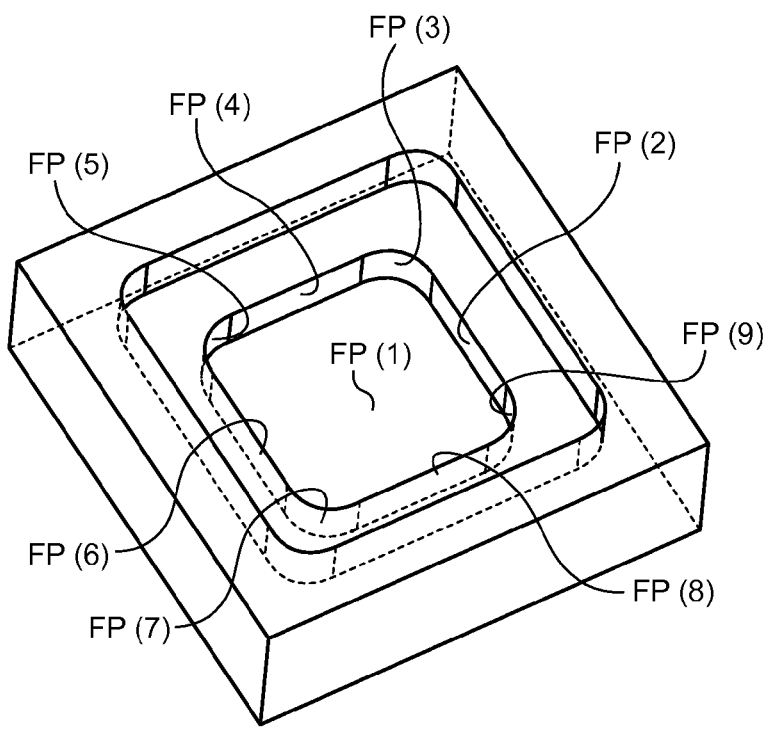

FIG. 10-4 shows a display screen for input to which the distance (depth) from the upper surface to the lower surface of the machining shape has been input. At this point, the positional relation between the machining material shape and the machining shape is as shown in FIG. 12-1. FIG. 12-2 shows an example of the machining material shape from which the machining shape related to the second stage pocket shown in FIG. 12-1 has been removed. An attribute indicating the surface of the material shape and an attribute indicating the surface to which the pocket machining shape has been transferred are attached to respective surfaces of the machining material shape.

In the input of the machining shape data explained above, a dependency relation between the material shape and the machining shape is set together with an upper surface Z position of the machining shape simply by giving data of the machining region. Therefore, labor and time for an input of the upper surface Z position of the machining shape are saved. Further, it is possible to perform associated correction of the machining shape without requiring additional labor and time for associating correction of the machining shape.

After the processing at step S305, the automatic programming apparatus 1000 proceeds to the processing at S318.

At step S306, the automatic programming apparatus 1000 checks an operator instruction to carry out an input of a machining process. When the instruction to carry out an input of a machining process is received (Yes at step S306), the automatic programming apparatus 1000 proceeds to processing at step S307. When the instruction to carry out an input of a machining process is not received (No at step S306), the automatic programming apparatus 1000 proceeds to processing at step S308.

At step S307, the machining-process-data generating/editing unit 3 generates machining process data based on the machining shape data stored in the machining-shape-data storing unit 12 and stores the generated machining process data in the machining-process-data storing unit 13.

Figures 1, 13:
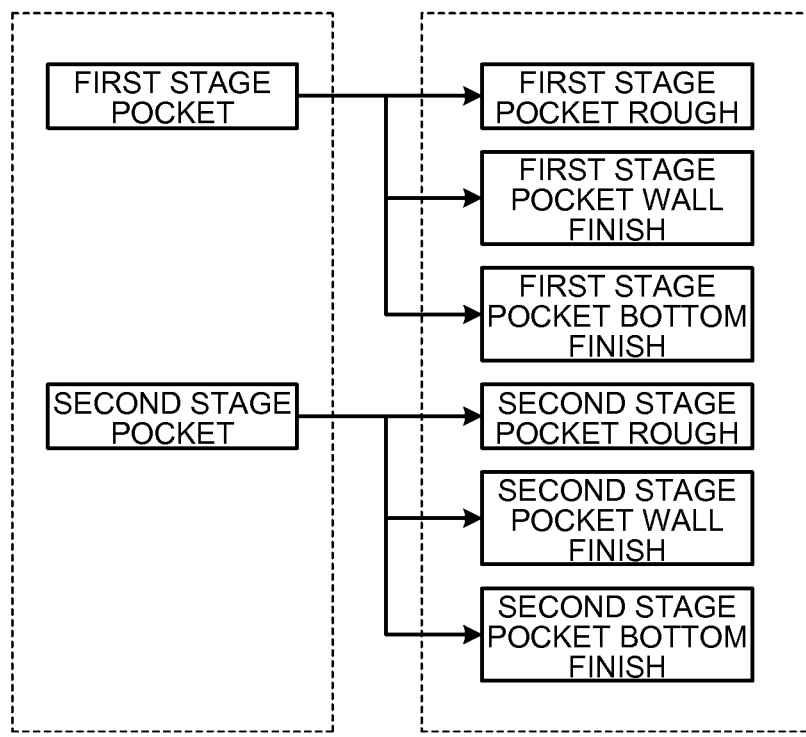
Figures 2, 13:
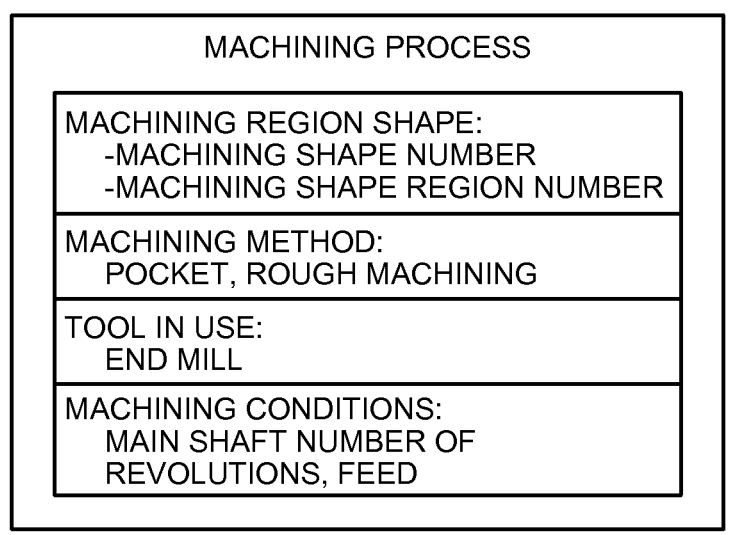
Figures 1, 16:
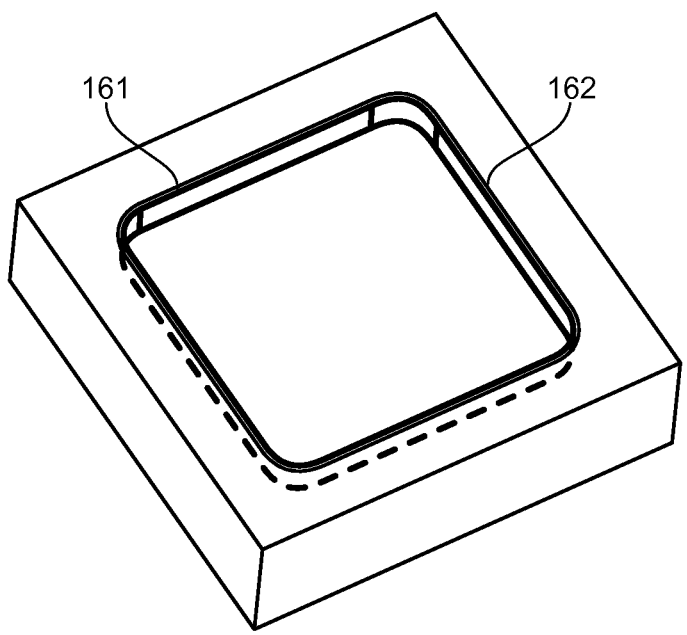
Figures 2, 16:
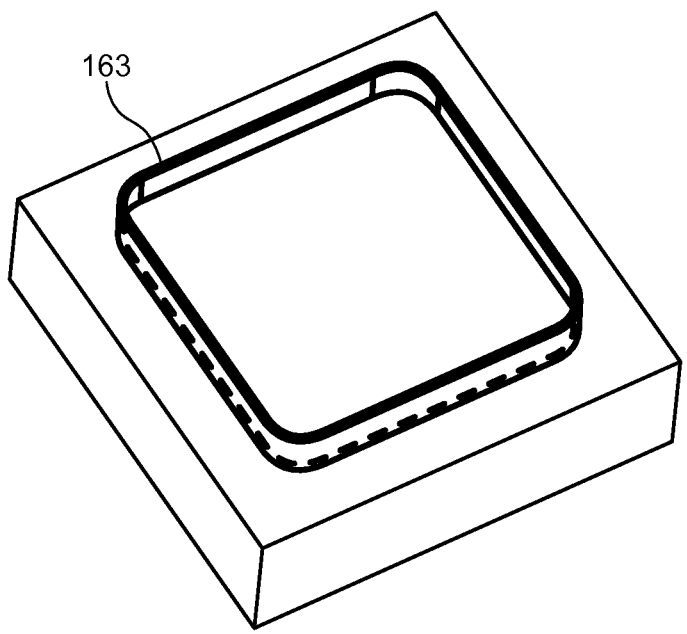
Figures 3, 16:
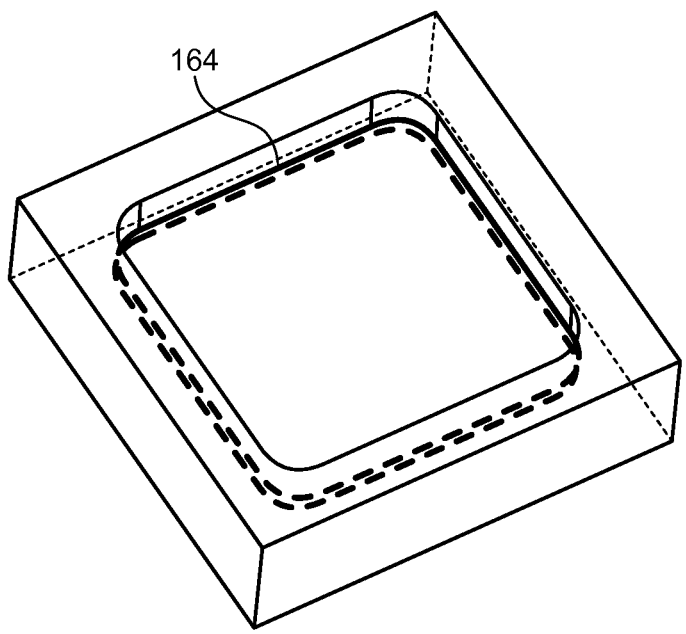
Figures 4, 16:
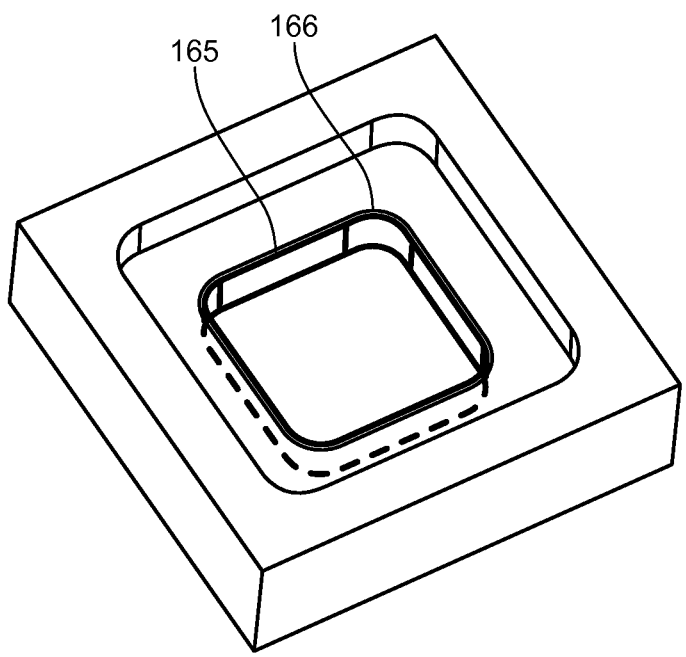
Figures 5, 16:
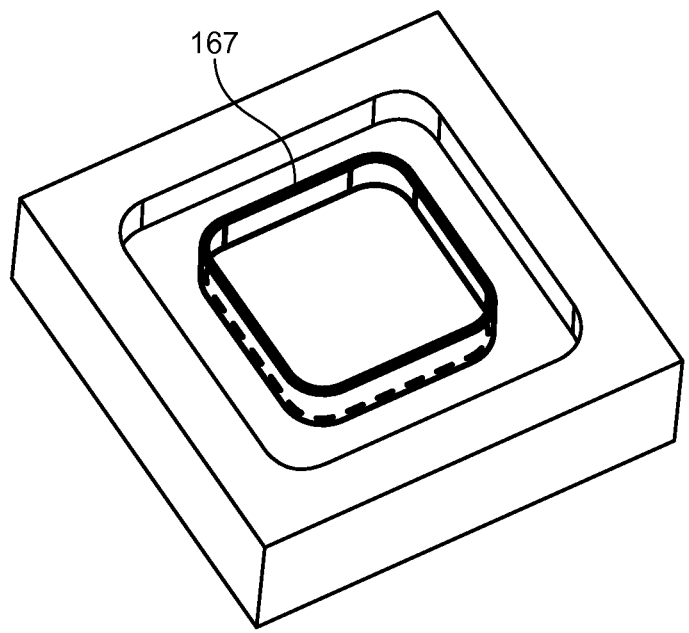
Figures 6, 16:
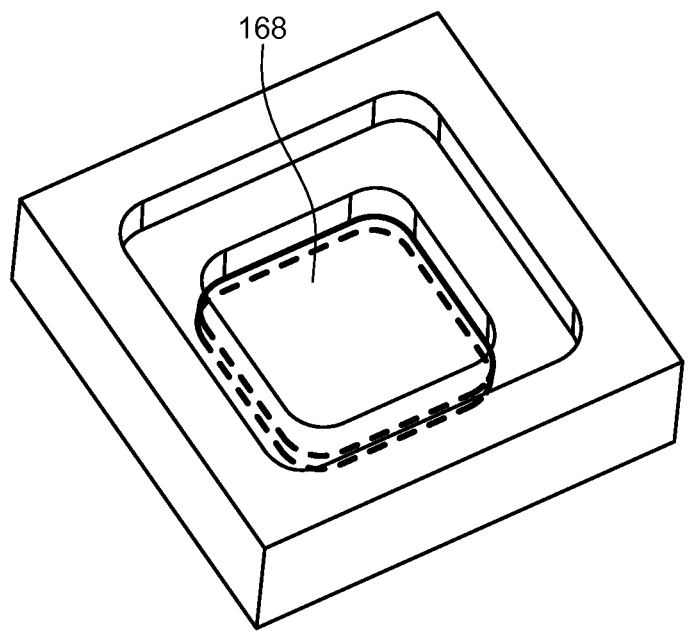

FIGS. 13-1 and 13-2 are diagrams of states of generation of the machining process data. As shown in FIG. 13-2, the machining process data includes descriptions for executing partial machining such as a machining shape, a machining method, a tool in use, and machining conditions. FIG. 13-1 shows an example of a relation between machining shapes and machining processes to be generated. Machining processes of pocket rough machining, pocket wall finish machining, and pocket bottom finish machining are generated from a machining shape of a pocket at a first stage. Machining processes of pocket rough machining, pocket wall finish machining, and pocket bottom finish machining are generated from a machining shape of a pocket at a second stage.

After the processing at step S307, the automatic programming apparatus 1000 proceeds to the processing at step S318.

At step S308, the automatic programming apparatus 1000 checks an operator instruction to carry out editing of tools in use, execution order, and tool directions of machining processes. When the operator instruction to carry out the editing is received (Yes at step S308), the automatic programming apparatus 1000 proceeds to processing at step S309. When the operator instruction to carry out the editing is not received (No at step S308), the automatic programming apparatus 1000 proceeds to processing at step S315.

At step S309, the tool/machining order/tool direction editing unit 4 displays, based on the machining process data stored in the machining-process-data storing unit 13, a list of tools in use for machining processes in the execution order of the machining processes and executes, based on an instruction from the operator, a change of the tools in use of the machining processes and a change of the execution order of the machining processes. The tool/machining order/tool direction editing unit 4 stores the changed machining process data in the machining-process-data storing unit 13.

FIG. 14-1 is a diagram of a list of machining processes and tools in use. The order of the machining processes in the figure is the order at the time when the machining processes are generated from the machining shapes shown in FIG. 13-1. When the machining processes are executed without changing the order, six times of tool replacing operations are necessary from pocket rough (first stage pocket) to pocket bottom finish (second stage pocket). Therefore, when the machining order is changed to put together the processes in which the same tools are used as shown in FIG. 14-2, the machining processes can be performed in three times of tool replacing operations and a machining time is reduced. It is important in reducing the machining time to minimize replacing operations for tools. Work including changes of the tools in use is facilitated by enabling this work to be performed on the list display shown in FIGS. 14-1 and 14-2.

After the processing at step S309, the automatic programming apparatus 1000 proceeds to the processing at step S318.

At step S310, the automatic programming apparatus 1000 checks an operator instruction to execute machining process adjustment. When the instruction to execute the machining process adjustment is received (Yes at step S310), the automatic programming apparatus 1000 proceeds to processing at step S311. When the instruction to execute the machining process adjustment is not received (No at step S310), the automatic programming apparatus 1000 proceeds to processing at step S317.

At step S311, adjustment of the machining processes is executed. FIG. 15 is a flowchart for explaining the adjustment of the machining processes more in detail.

As shown in the figure, processing at steps S1501 to S1503 configures loop processing for generating machining shapes corresponding to designated machining processes. Processing at steps S1504 to S1507 configures loop processing for acquiring machining processes that depend on the designated machining processes and executing, from machining shapes of the depending machining processes, deformation of machining shapes of the designated machining processes one by one.

At step S1502, the machining-process adjusting unit 5 extracts, from the machining shapes stored in the machining-shape-data storing unit 12, a machining shape corresponding to a designated machining process and generates, from the extracted machining shape, a machining shape corresponding to the designated machining process.

FIGS. 16-1, 16-2, 16-3, 16-4, 16-5, and 16-6 are diagrams of a machining shape for each of machining processes. A machining shape 161 indicated by a thick line obtained by excluding, from the machining shape shown in FIG. 9-1, a wall margin for wall finish machining and a bottom margin for bottom finish machining is a rough machining shape of the first stage pocket (hereinafter, pocket rough (first stage pocket) 161). A shape 162 indicated by a thin line indicates a shape of an opening section related to the first stage pocket of the work piece. A machining shape 163 indicated by a thick line obtained by extracting wall finish from the machining shape shown in FIG. 9-1 is a machining shape of wall finish of the first stage pocket (hereinafter, pocket wall finish (first stage pocket) 163). A machining shape 164 indicated by a thick line obtained by extracting bottom finish from the machining shape shown in FIG. 9-1 is a machining shape of bottom finish of the first stage pocket (hereinafter, pocket bottom finish (first stage pocket) 164). A machining shape 165 indicated by a thick line obtained by removing a wall margin for wall finish machining and a bottom margin for bottom finish machining from the machining shape shown in FIG. 12-1 is a rough machining shape of the second stage pocket (hereafter, pocket rough (second stage pocket) 165). A shape 166 indicated by a thin line indicates a shape of an opening section related to the second stage pocket of the work piece. A machining shape 167 indicated by a thick line obtained by extracting wall finish from the machining shape shown in FIG. 12-1 is a machining shape of wall finish of the second stage pocket (hereinafter, pocket wall finish (second stage pocket) 167). A machining shape 168 indicated by a thick line obtained by extracting bottom finish from the machining shape shown in FIG. 12-1 is a machining shape of bottom finish of the second stage pocket (hereinafter, pocket bottom finish (second stage pocket) 168).

At step S1505, the machining-process adjusting unit 5 acquires a machining process on which the designated machining process depends. The machining process on which the designated machining process depends means a machining process, the machining order of which is earlier than the machining order of the designated machining process and a machining shape related to which is located in a place closest to the machining shape regarding the designated machining process on an entering route of a tool for machining a machining shape related to the designated machining process. That is, machining of the machining shape related to the designated machining process is executed before a machining process that depends on the machining shape related to the machining process. The machining shape related to the designated machining process is located in a tool direction viewed from the machining shape related to the machining process that depends on the machining process. For example, both of the pocket rough (second stage pocket) and the pocket wall finish (second stage pocket) depend on the pocket rough (first stage pocket). The entering route of the tool means a route of the tool from the start of movement of the tool until the completion of machining of the machining shape related to the designated machining process. Therefore, if the machining order of a machining process, a machining shape related to which overlaps the machining shape related to the designated machining process, is before the machining order of the designated machining process, the machining order corresponds to the machining process on which the designated machining process depends.

Figures 1, 17:
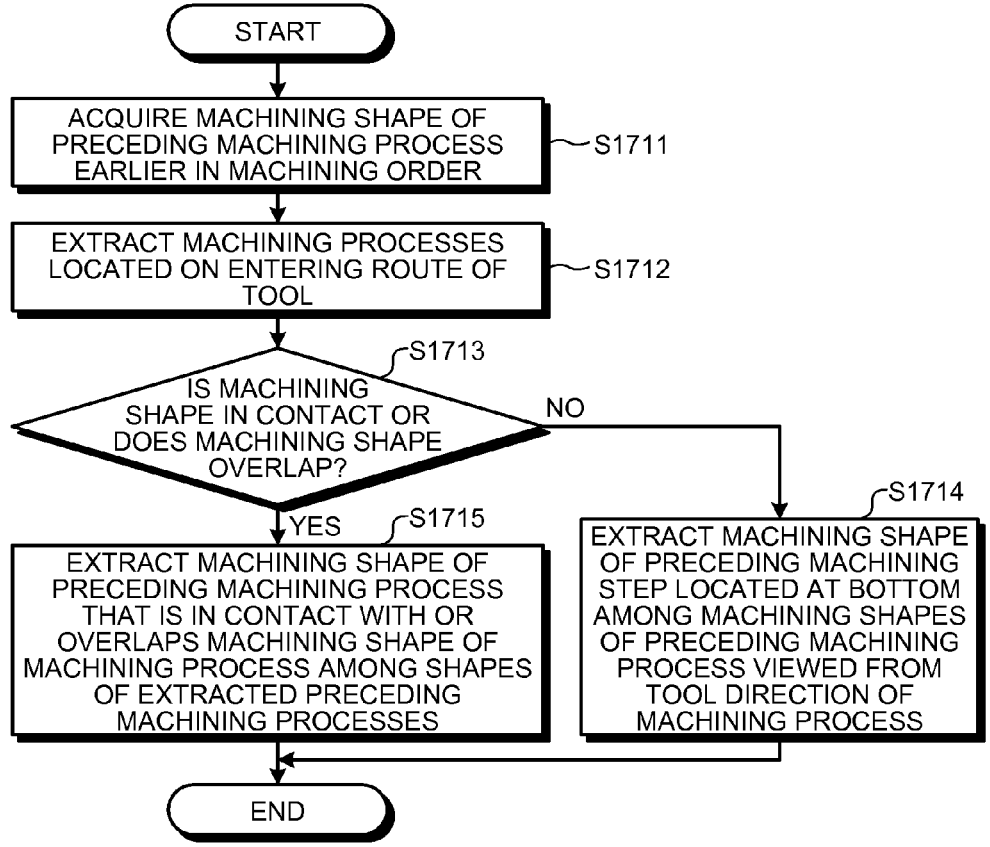
Figures 2, 17:
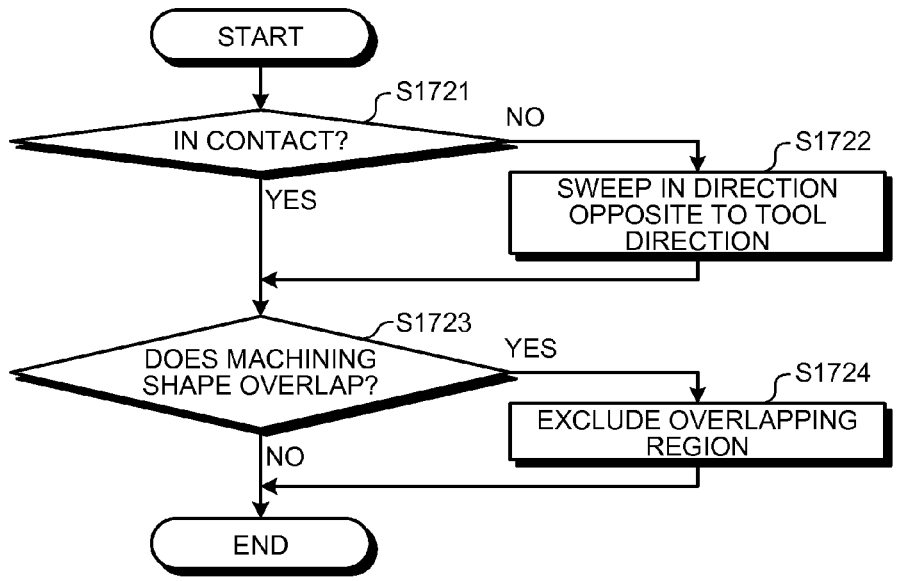

FIG. 17-1 is a flowchart for explaining the operation at step S1505 more in detail. As shown in the figure, first, the machining-process adjusting unit 5 acquires a machining process, the machining order of which is earlier than the machining order of the designated machining process (step S1711). The machining-process adjusting unit 5 extracts, from the acquired machining process, machining processes located on the entering route of the tool for realizing the designated machining process (step S1712). At step S1712, for example, the machining-process adjusting unit 5 can extend the machining shape related to the designated machining process in a direction opposite to the tool direction and extract a machining process, a machining shape related to which comes into contact with or overlaps the extended machining shape first.

In processing at step S1713, the machining-process adjusting unit 5 determines whether the machining shape related to the extracted machining process is in contact with or is overlapping the machining shape related to the designated machining process. When the machining shape related to the extracted machining process is not in contact with and is not overlapping the machining shape related to the designated machining process (No at step S1713), the machining-process adjusting unit 5 proceeds to processing at step S1714. When the machining shape related to the extracted machining process is in contact with or is overlapping the machining shape related to the designated machining process (Yes at step S1713), the machining-process adjusting unit 5 proceeds to processing at step S1715.

In the processing at step S1714, the machining-process adjusting unit 5 extracts, from the machining processes extracted by the processing at step S1712, a machining process, a machining shape related to which is located in a place closest to the machining shape related to the designated machining process on the entering route of the tool for machining the machining shape related to the designated machining process. In the processing at step S1715, the machining-process adjusting unit 5 extracts, from the machining processes extracted by the processing at step S1712, a machining process, a machining shape related to which comes into contact with or overlaps the machining shape related to the designated machining process. The machining process extracted by the processing at step S1714 or step S1715 is a machining process on which the designated machining process depends. After ending the processing at step S1714 or S1715, the machining-process adjusting unit 5 ends the operation at step S1505.

At step S1506, the machining-process adjusting unit 5 adjusts the machining shape related to the designated machining process. FIG. 17-2 is a flowchart for explaining the operation at step S1506 more in detail.

First, the machining-process adjusting unit 5 checks whether the machining shape related to the designated machining process and the machining shape related to the machining process on which the designated machining process depends are in contact with each other (step S1721). When the machining shape related to the designated machining process and the machining shape related to the machining process on which the designated machining process depends are not in contact with each other (No at step S1721), the machining-process adjusting unit 5 proceeds to processing at step S1722. When the machining shape related to the designated machining process and the machining shape related to the machining process on which the designated machining process depends are in contact with each other (Yes at step S1721), the machining-process adjusting unit 5 proceeds to processing at step S1723.

In the processing at step S1722, the machining-process adjusting unit 5 sweeps, i.e., extends the machining shape related to the designated machining process in a direction opposite to the tool direction until the machining shape related to the designated machining process comes into contact with the machining shape related to the machining process that depends on the designated machining process. The machining-process adjusting unit 5 shifts to the processing at step S1723.

Figures 1, 18:
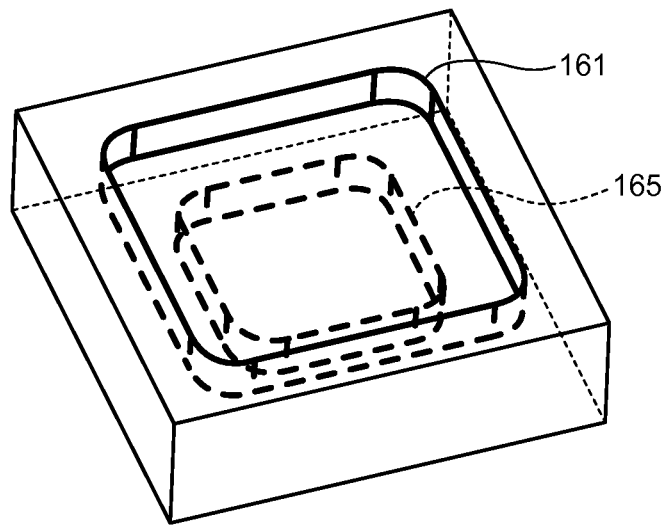
Figures 2, 18:
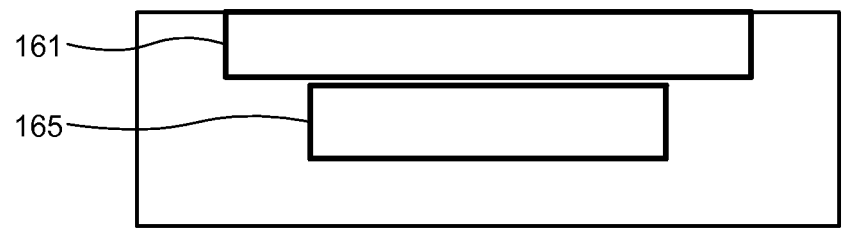
Figures 3, 18:
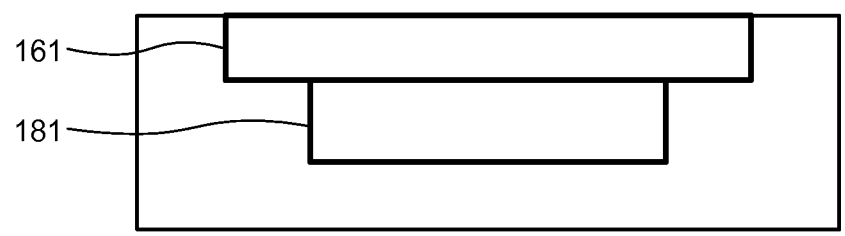

FIGS. 18-1, 18-2, and 18-3 are diagrams for explaining states of deformation of a machining shape of the pocket rough (second stage pocket). FIG. 18-1 is a perspective view for explaining the machining shape before deformation. FIG. 18-2 is a sectional view for explaining the machining shape before deformation. FIG. 18-3 is a sectional view for explaining the machining shape after deformation. As shown in FIGS. 18-1 and 18-2, the pocket rough (second stage pocket) 165 does not come into contact with the pocket rough (first stage pocket) 161 on which the pocket rough (second stage pocket) depends. Therefore, according to the processing at step S1722, a machining upper surface of the pocket rough (second stage pocket) 165 is swept to come into contact with the bottom surface of the pocket rough (first stage pocket) 161 of the preceding machining process to deform the machining shape. That is, the pocket rough (second stage pocket) 165 is deformed like pocket rough (second stage pocket) 181 shown in FIG. 18-3.

Figures 1, 19:
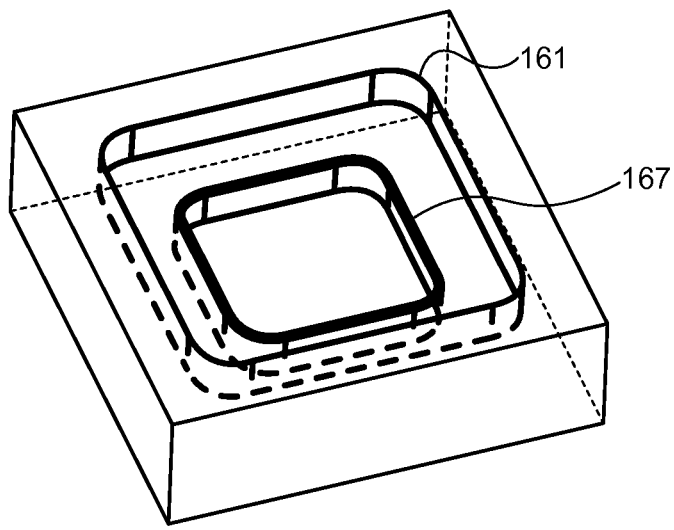
Figures 2, 19:
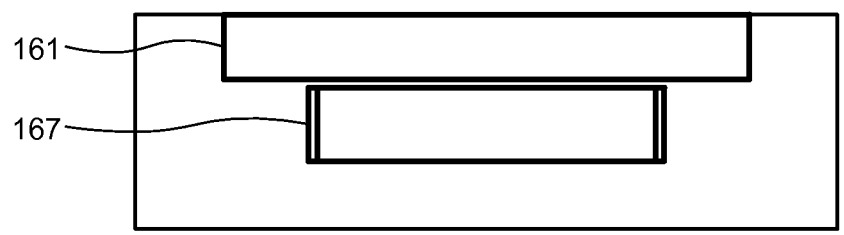
Figures 3, 19:
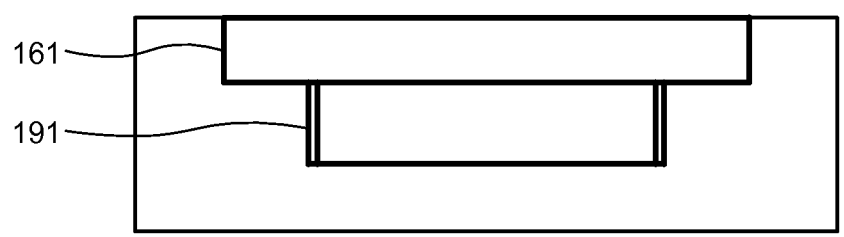

FIGS. 19-1, 19-2, and 19-3 are diagrams for explaining states in which a machining shape of the pocket wall finish (second stage pocket) is deformed. FIG. 19-1 is a perspective view for explaining the machining shape before deformation. FIG. 19-2 is a sectional view for explaining the machining shape before deformation. FIG. 19-3 is a sectional view for explaining the machining shape after deformation. As shown in FIGS. 19-1 and 19-2, the pocket wall finish (second stage pocket) 167 does not come into contact with the pocket rough (first stage pocket) 161 on which the pocket wall finish (second stage pocket) 167 depends. Therefore, according to the processing at step S1722, a machining upper surface of the pocket wall finish (second stage pocket) 167 is swept to come into contact with the bottom surface of the pocket rough (first stage pocket) 161 of the preceding machining process to deform the machining shape. That is, the pocket wall finish (second stage pocket) 167 is deformed like pocket wall finish (second stage pocket) 191 shown in FIG. 19-3.

In the processing at step S1723, the machining-process adjusting unit 5 checks whether the machining shape related to the designated machining process and the machining shape related to the machining process on which the designated machining process depends overlap (Yes at step S1723). When the machining shapes overlap (Yes at step S1723), the machining-process adjusting unit 5 proceeds to processing at step S1724. When the machining shapes do not overlap (No at step S1723), the machining-process adjusting unit 5 ends the operation related to the processing at step S1506.

In the processing at step S1724, the machining-process adjusting unit 5 deforms the machining shape related to the designated machining process to remove an overlapping portion. After the processing at step S1724, the machining-process adjusting unit 5 ends the operation related to the processing at step S1506.

FIGS. 20-1, 20-2, 20-3, 20-4, 20-5, 20-6, and 20-7 are diagrams for explaining states of deformation of the pocket bottom finish (first stage pocket) 164. FIG. 20-1 is a top view of the pocket bottom finish (first stage pocket) 164. FIG. 20-2 is a sectional view of the pocket bottom finish (first stage pocket) 164. FIG. 20-3 is a top view of the pocket rough (second stage pocket) 181 after deformation. FIG. 20-4 is a sectional view of the pocket rough (second stage pocket) 181 after deformation. FIGS. 20-5, 20-6, and 20-7 respectively show a top view, a sectional view, and a perspective view of a pocket bottom finish (first stage pocket) 201 after deformation. A part of the pocket rough (second stage pocket) 181 after deformation in the processing at step S1722 overlaps the pocket bottom finish (first stage pocket) 164, which is a process after the pocket rough (second stage pocket) 181 in the machining order, according to the deformation. Therefore, in the processing at step S1505, the machining-process adjusting unit 5 extracts the pocket rough (second stage pocket) 181 as a machining process on which the pocket bottom finish (first stage pocket) 164 depends. In the processing at step S1724, the machining-process adjusting unit 5 deforms the machining shape of the pocket bottom finish (first stage pocket) 164 to remove a portion overlapping the pocket rough (second stage pocket) 181 from the machining shape of the pocket bottom finish (first stage pocket) 164. That is, the portion overlapping the pocket rough (second stage pocket) 181 is removed from the pocket bottom finish (first stage pocket) 164. The pocket bottom finish (first stage pocket) 164 is deformed like the pocket bottom finish (first stage pocket) 201.

Figures 1, 21:
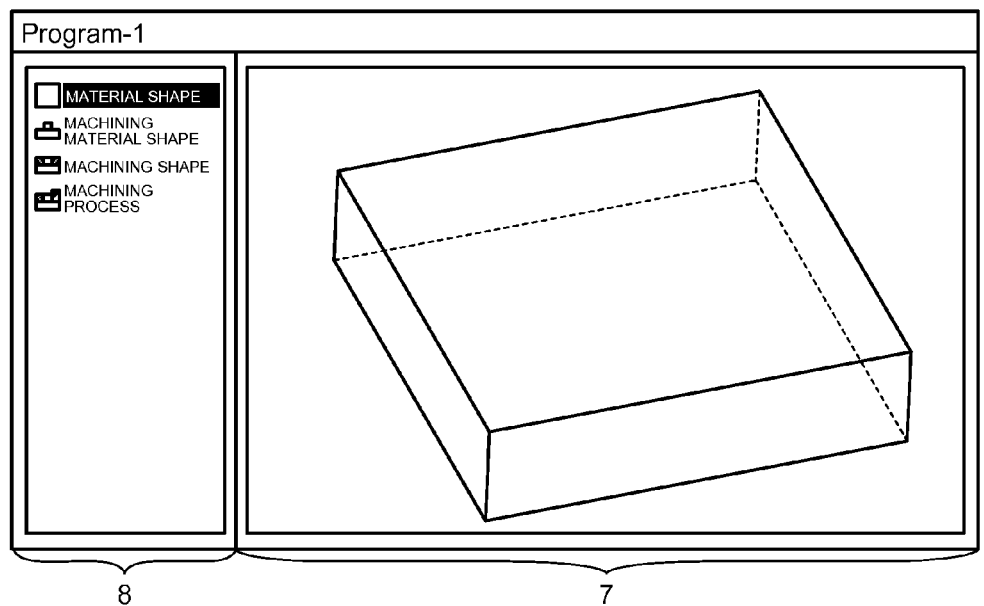
Figures 2, 21:
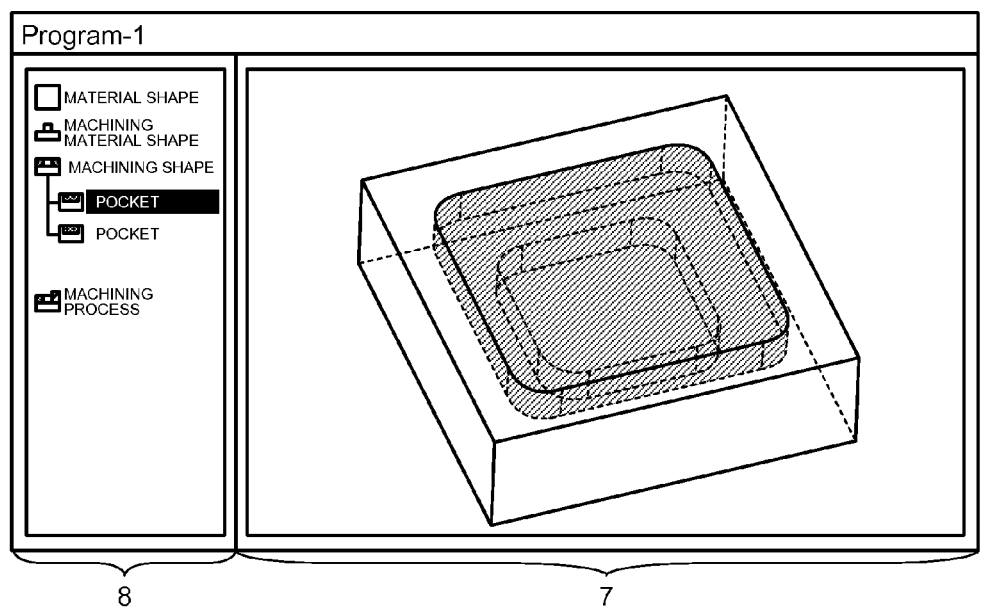

FIGS. 21-1, 21-2, 22-1, 22-2, 23-1, 23-2, 23-3, 24-1, 24-2, 24-3, 24-4, 24-5, 24-6, 25-1, 25-2, 25-3, 25-4, 25-5, and 25-6 are diagrams of display screen examples displayed on the output device 1005 of the automatic programming apparatus 1000. As shown in FIG. 21-1, the display screen includes the program-component-list display unit 8 and the shape display unit 7. The program-component-list display unit 8 is configured such that each of a material shape, a machining material shape, a machining shape, and a machining process can be selected. On the shape display unit 7, a shape corresponding to the elements (the material shape, the machining material shape, the machining shape, and the machining process) selectable in the program-component-list display unit 8 is three-dimensionally displayed.

After the processing at step S303, as shown in FIG. 21-1, the program-component-list display unit 8 changes "material shape" to a selected state and highlights the "material shape". The shape display unit 7 displays a material shape corresponding to the "material shape".

After the processing at step S305, as shown in FIG. 21-2, the program-component-list display unit 8 changes "pocket" belonging to the input and set machining shape to a selected state and highlights the "pocket". The shape display unit 7 displays the machining shape together with the machining material shape. Because the shape display unit 7 displays the machining shape together with the machining material shape, it is easy to check a positional relation of the machining shape with the machining material shape. A burden on the operator for inputting and setting a sure machining shape is reduced. When the operator desires to check only the machining material shape, as shown in FIG. 22-1, the operator can cause the shape display unit 7 to display a desired machining material shape by selecting "machining material shape" in the program-component-list display unit 8.

Figures 1, 22:
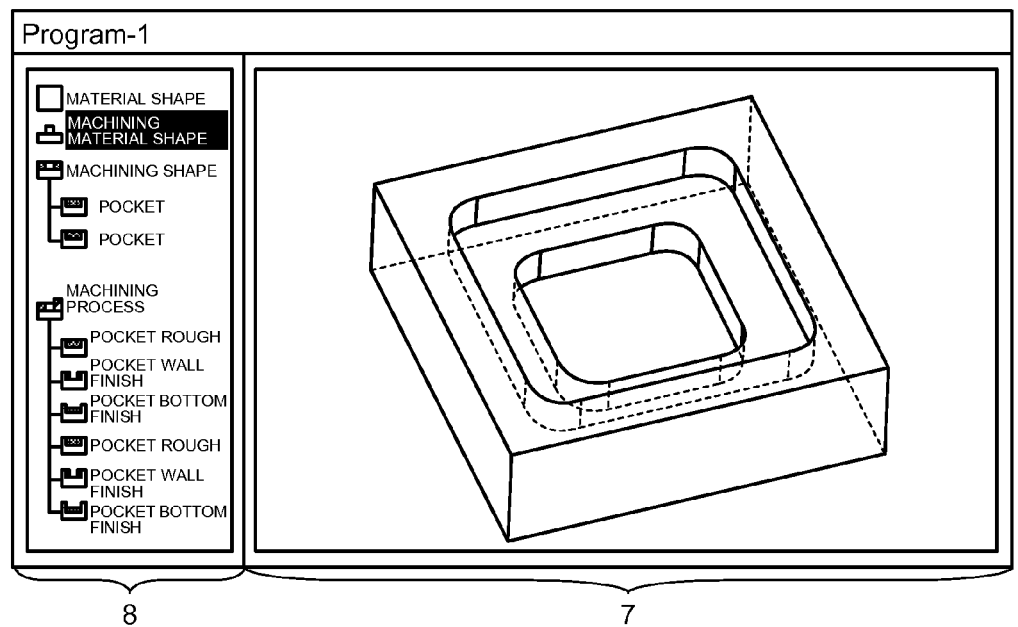
Figures 2, 22:
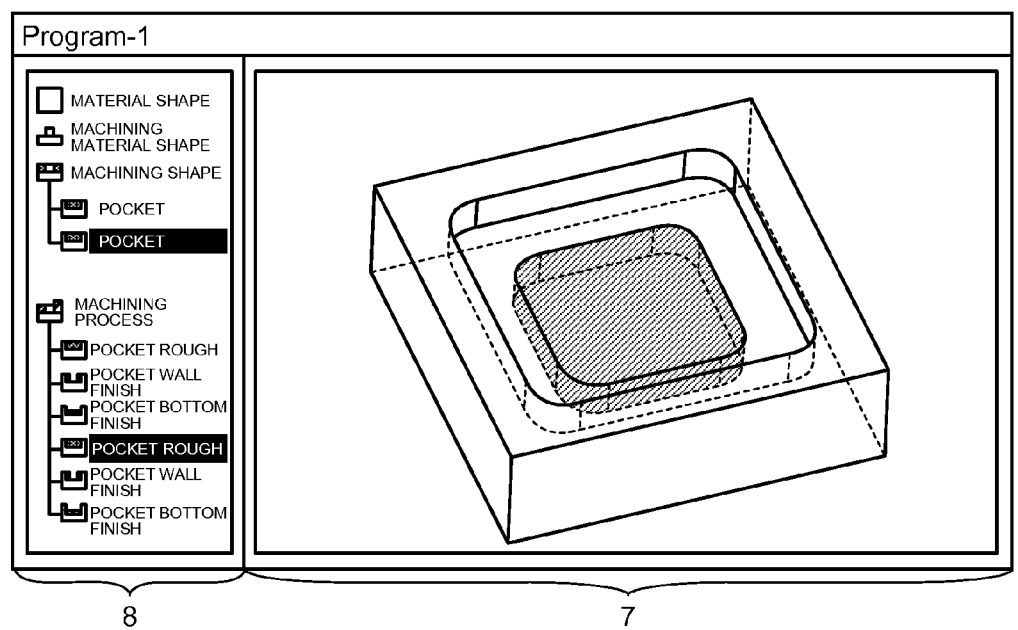

After the processing at step S307, as shown in FIG. 22-2, the program-component-list display unit 8 changes a machining shape related to the input and set machining process to a selected state and highlights the machining shape. The shape display unit 7 displays the related machining shape together with the machining material shape.

Figures 1, 23:
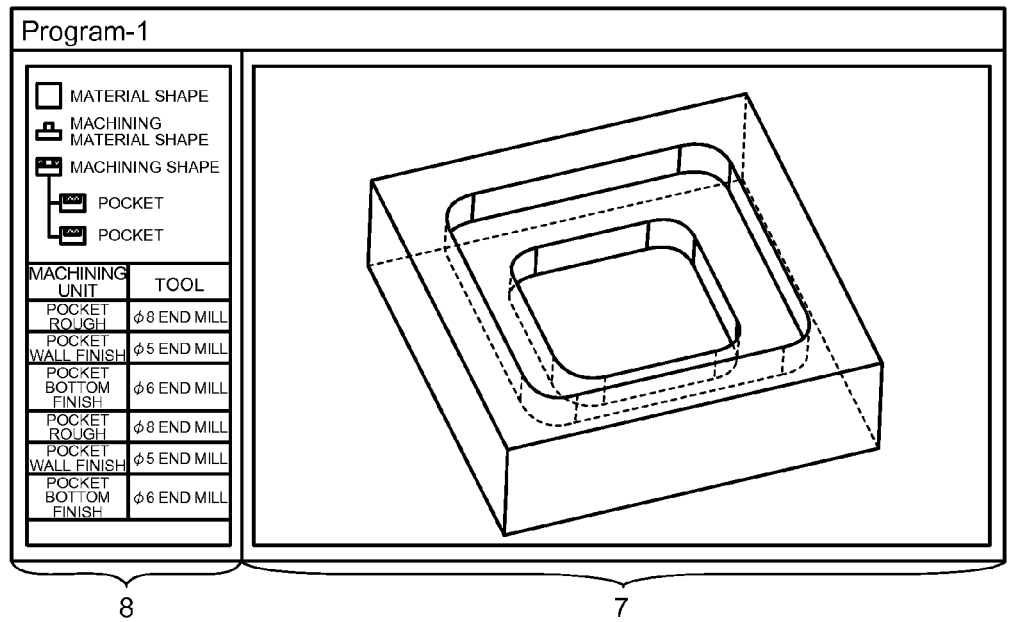
Figures 2, 23:
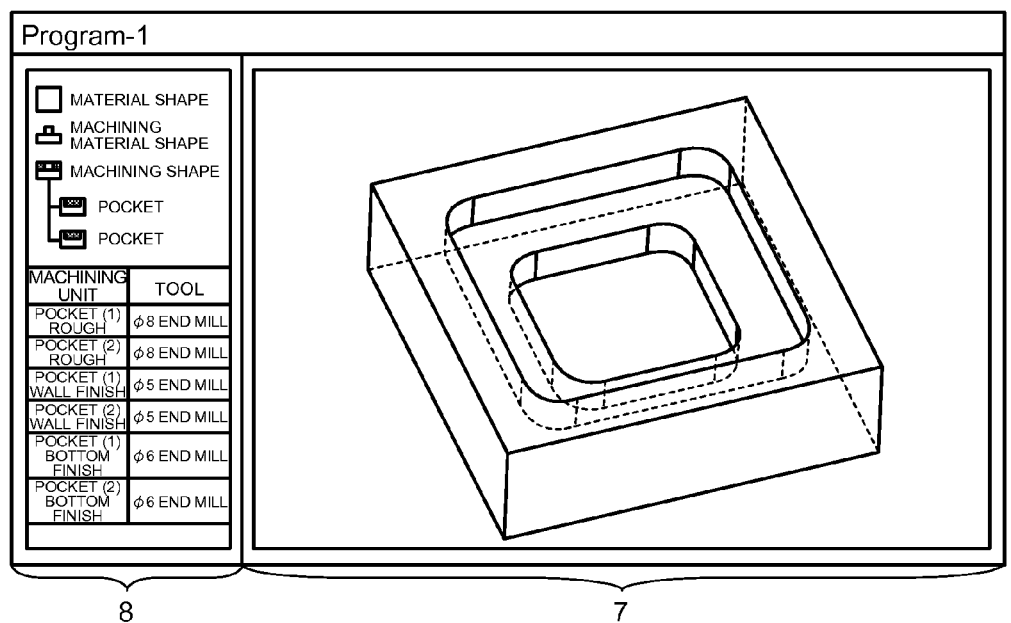
Figures 3, 23:
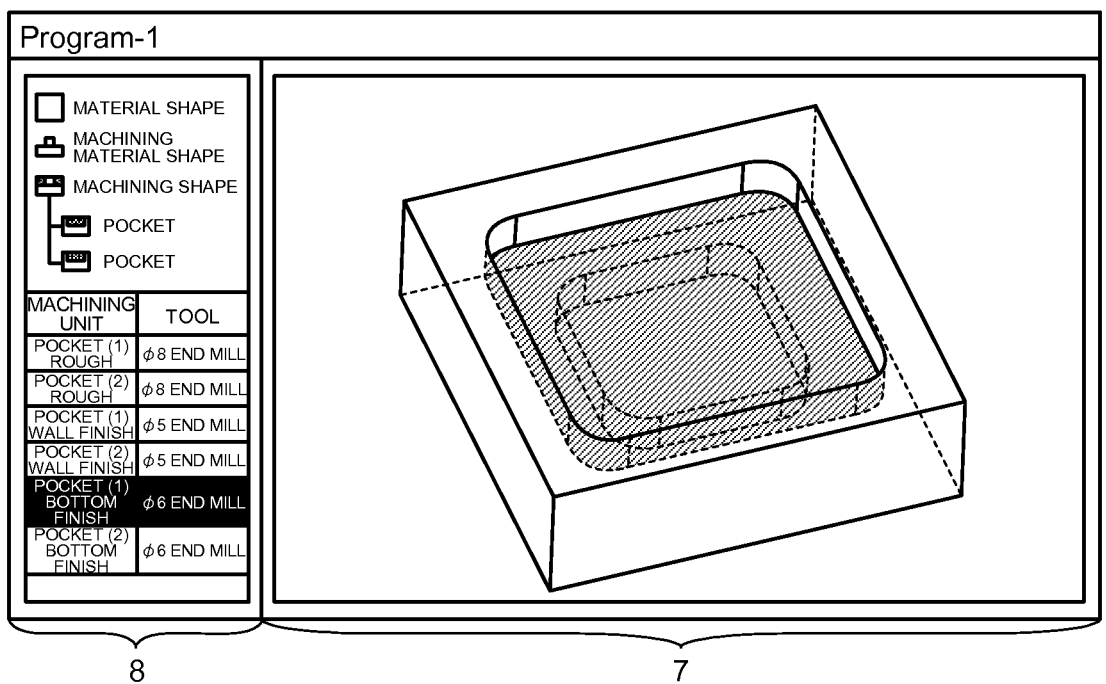

Immediately before the processing at step S309, as shown in FIG. 23-1, the program-component-list display unit 8 displays a list of machining processes. After executing the processing at step S309, as shown in FIG. 23-2, the program-component-list display unit 8 changes the order of the machining processes from the state shown in FIG. 23-1 and displays the machining processes. When the operator selects a machining process, as shown in FIGS. 23-3, the program-component-list display unit 8 changes the selected machining process to a selected state and highlights the selected machining process. The shape display unit 7 displays a machining shape related to the selected machining process together with the machining material shape. Because the shape display unit 7 displays the machining shape related to the selected machining process together with the machining material shape, it is possible to easily check the machining region conforming to the order of machining. A burden on the operator for setting sure machining order is reduced.

Figures 1, 24:
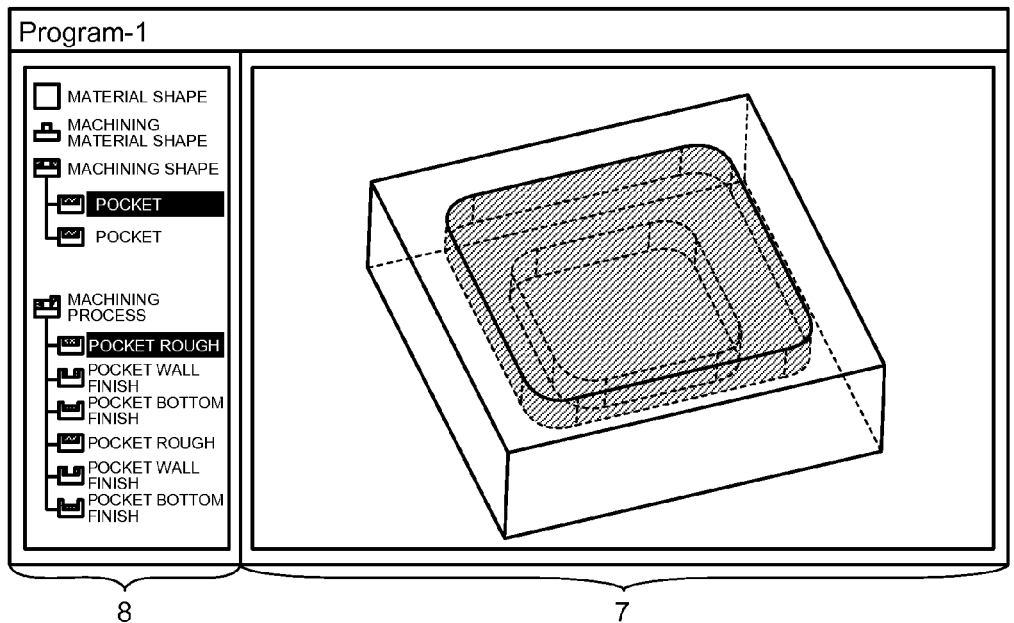
Figures 2, 24:
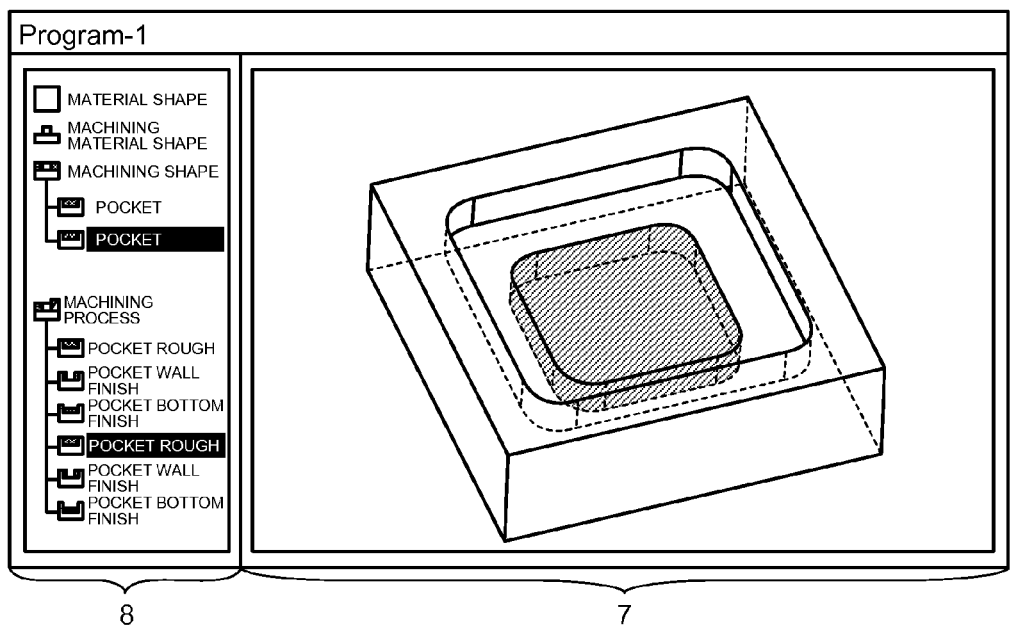
Figures 3, 24:
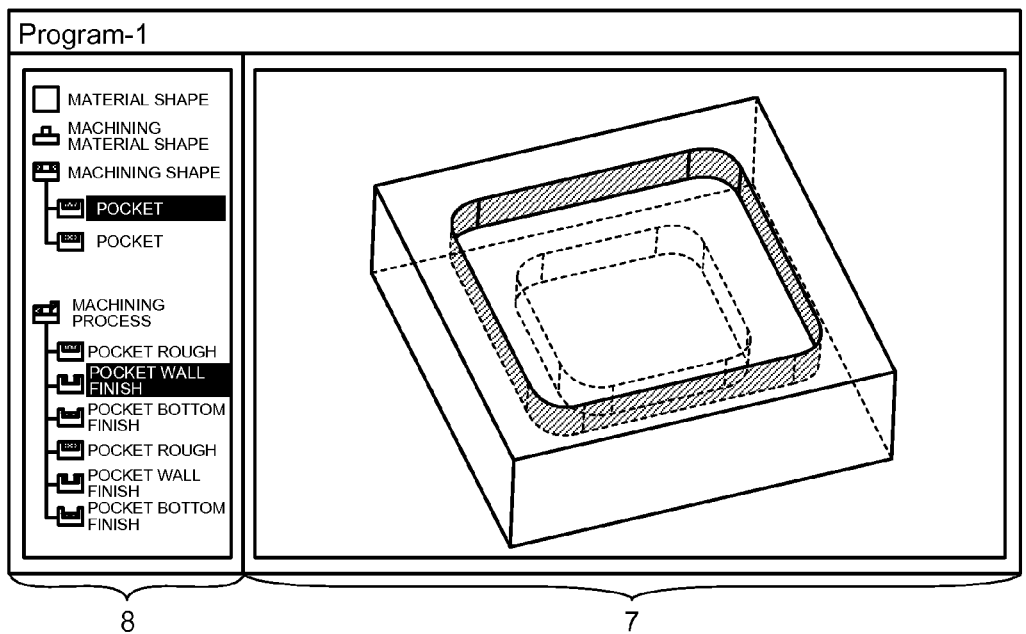
Figures 4, 24:
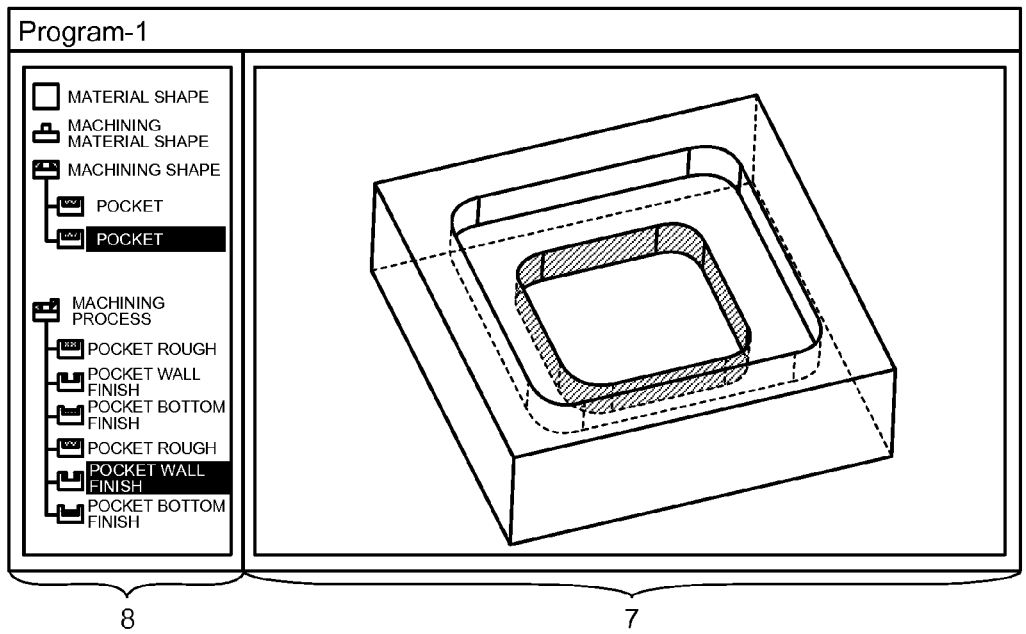
Figures 5, 24:
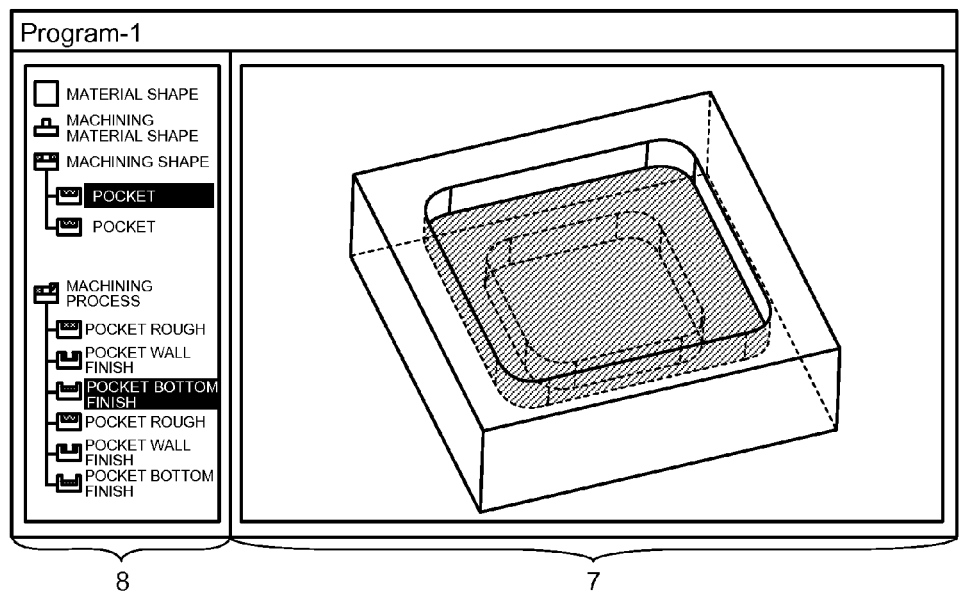
Figures 6, 24:
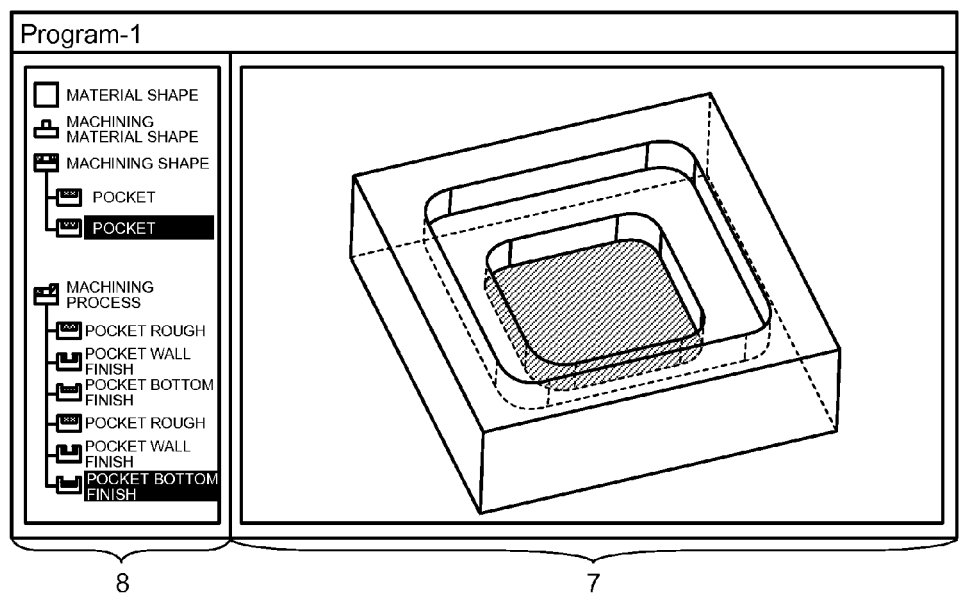
Figures 1, 25:
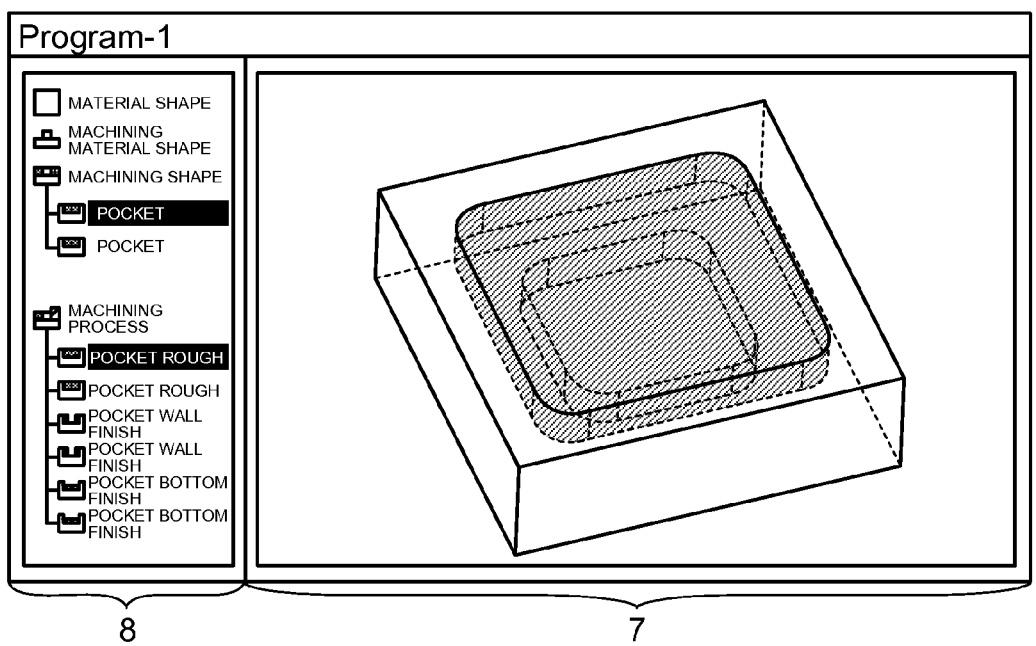
Figures 2, 25:
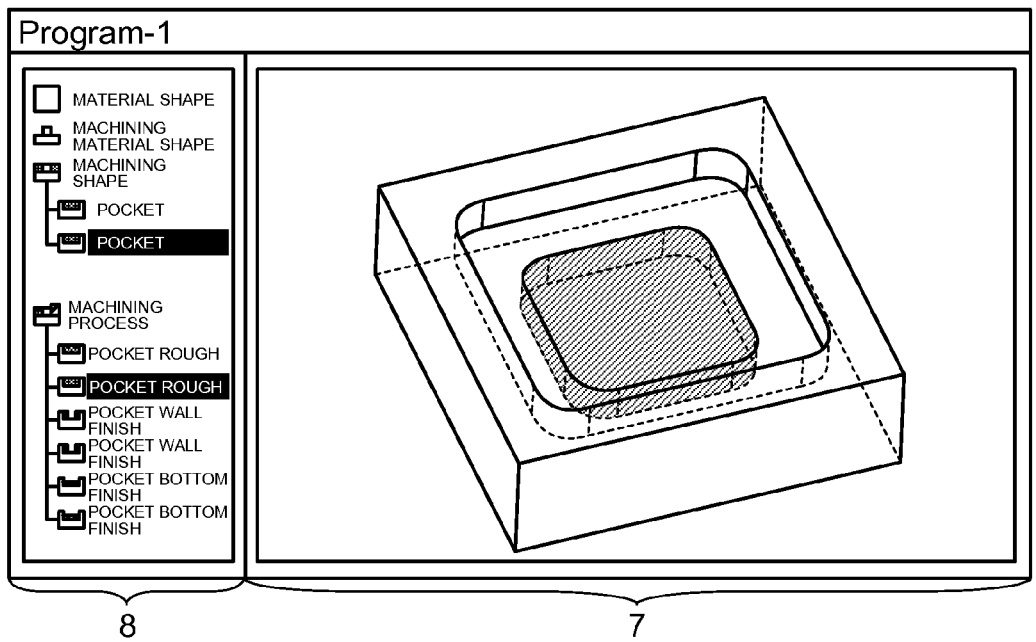
Figures 3, 25:
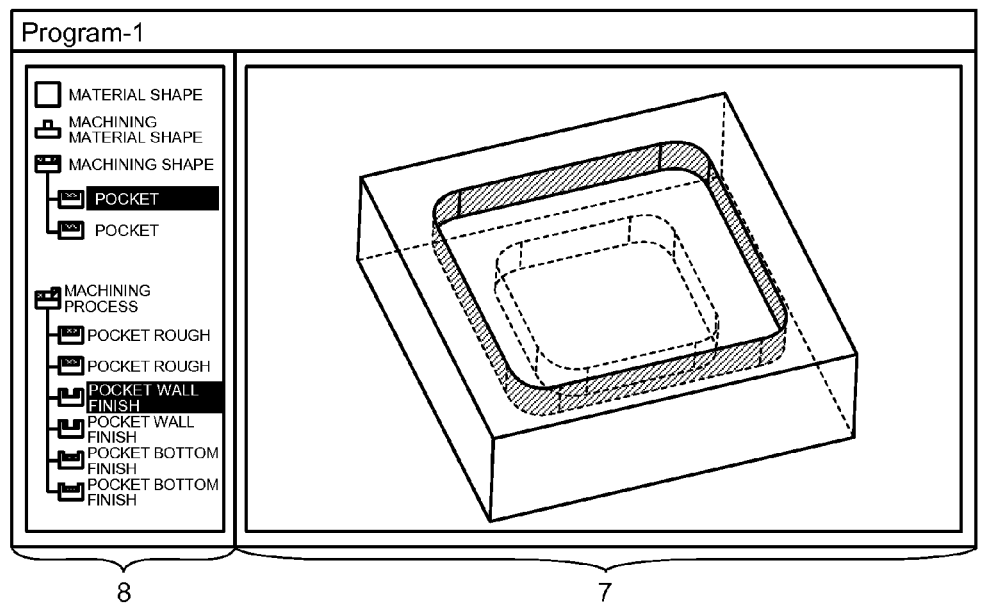
Figures 4, 25:
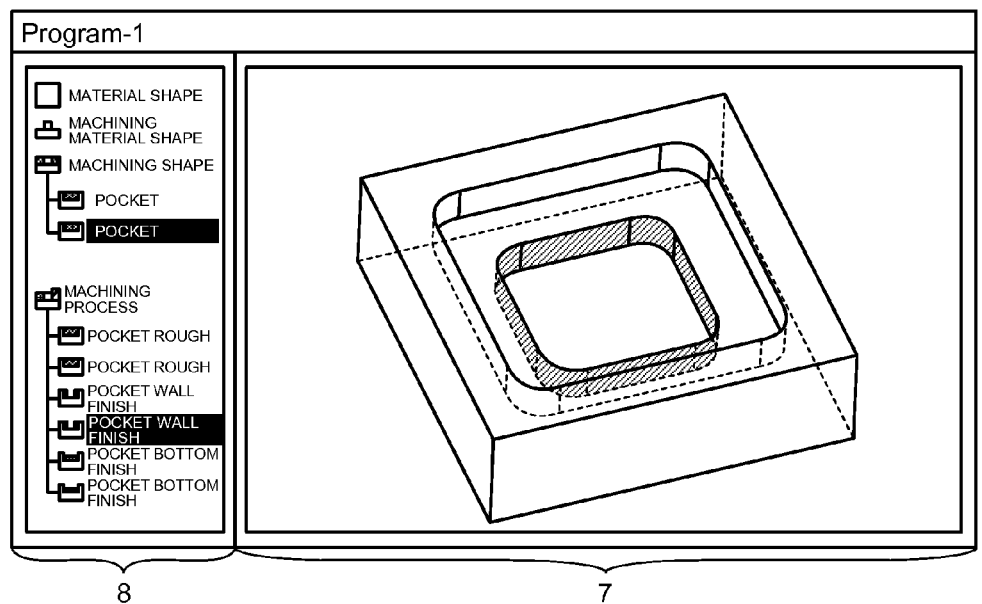
Figures 5, 25:
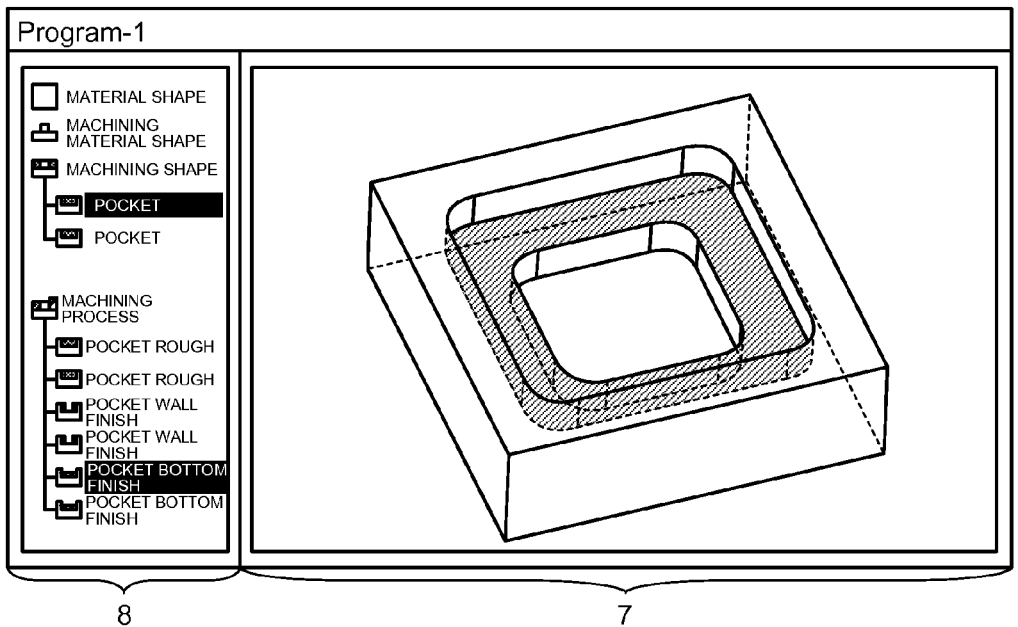
Figures 6, 25:
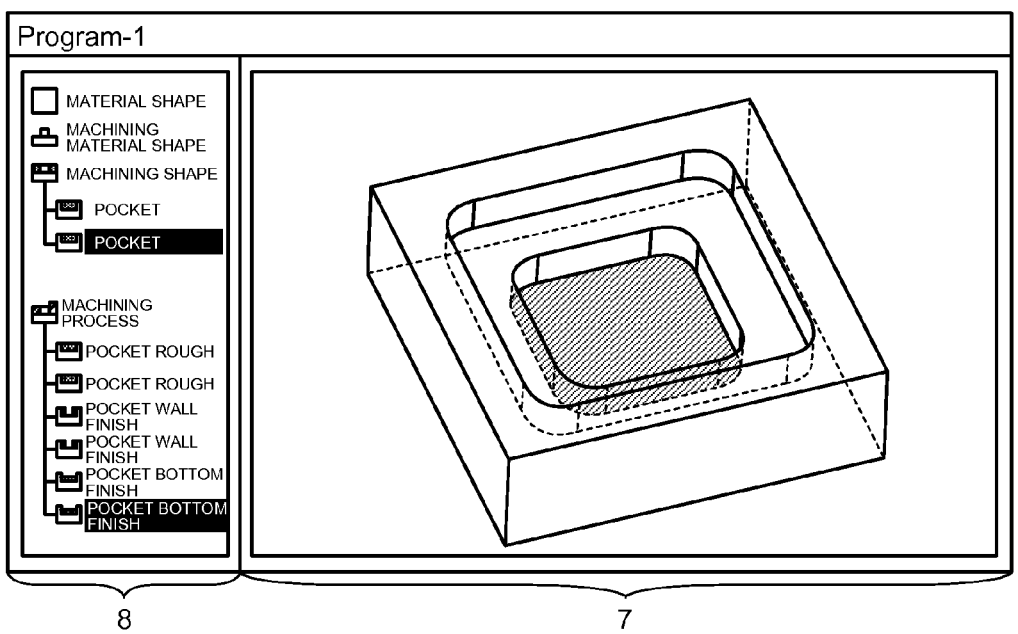

FIGS. 24-1 to 24-6 and FIGS. 25-1 to 25-6 are diagrams for explaining the difference in display related to a machining shape before and after the processing at step S311 (i.e., the adjustment of the machining processes). FIGS. 24-1 to 24-6 show screen display before the processing at step S311. FIGS. 25-1 to 25-6 show screen display after the processing at step S311. Display of a machining shape of pocket bottom finish of a pocket at a first stage before the processing at step S311 and the display after the processing at step S311 are compared. In setting before the processing at step S311, machining is performed even concerning a portion in the center to be shaved by machining related to pocket rough and wall finish at a second stage, which is the following process in the machining order. After the processing at step S311, the portion in the center is deleted from the machining shape. That is, in the setting after the processing at step S311, it can be confirmed that useless machining is reduced. Although it is unclear from the drawings, according to the screen display after the processing at step S311, the machining shapes of the pocket rough and the wall finish at the second stage are respectively extended upward such that machining upper surfaces thereof come into contact with the machining shape of the pocket rough at the first stage.

Referring back to FIG. 3, at step S312, the automatic programming apparatus 1000 checks an operator instruction to execute an input program. When the instruction to execute the program is received (Yes at step S312), the automatic programming apparatus 1000 proceeds to processing at step S314. When the instruction to execute the program is not received (No at step S312), the automatic programming apparatus 1000 proceeds to processing at step S313.

Processing at steps S314 to S316 configures loop processing in which the control-command generating unit 9 extracts, one by one, machining process data stored in the machining-process-data storing unit 13 and sequentially converts the extracted machining process data into control commands. The control-command generating unit 9 generates a control command from the extracted machining process data and outputs the generated control command to the RAM 1002 (step S315).

At step S313, the automatic programming apparatus 1000 checks an operator instruction to end the program input and execution operation. When the instruction to end the program input and execution operation is received (Yes at step S313), the automatic programming apparatus 1000 ends the operation. When the instruction to end the program input and execution operation is not received (No at step S313), the automatic programming apparatus 1000 proceeds to the processing at step S301.

At step S317, the automatic programming apparatus 1000 checks an operator instruction to change a display target such as an input for selecting an element different from an element being selected and displayed on the shape display unit 7. When the operator instruction to change a display target is received (Yes at step S317), the automatic programming apparatus 1000 proceeds to the processing at step S318. When the operator instruction to change a display target is not received (No at step S317), the automatic programming apparatus 1000 proceeds to the processing at step S301.

In this way, according to the first embodiment of the present invention, the machining-process-data generating/editing unit 3 is configured to generate machining shapes (second machining shapes) for each of the machining processes from each of externally-input machining shapes (first machining shapes). The tool/machining order/tool direction editing unit 4 is configured to receive an input of execution order of the machining processes. The machining-process adjusting unit 5 is configured to deform, concerning a plurality of machining shapes having the same tool direction among the second machining shapes, one machining shape among the plurality of machining shapes such that machining can be executed in the input execution order, delete, from another machining shape overlapping the one machining shape because of the deformation of the one machining shape, a portion of the overlap, and generate a third machining shape. The control-command generating unit 9 is configured to generate, based on the third machining shape and the input execution order, a control command for causing a machine tool to operate. Therefore, a machining shape is deformed such that the order of the machining processes input by the operator can be executed. According to the deformation of the machining shape, a portion overlapping in the deformed machining shape and a machining shape machined before the deformed machining shape is deleted from the machining shape machined before the deformed machining shape. Therefore, it is possible to generate a control command for performing machining while reducing useless machining as much as possible.

The second machining shapes generated by the machining-process-data generating/editing unit 3 is configured to include a machining shape machined by rough machining, a machining shape machined by wall finish machining, and a machining shape machined by bottom finish machining.

The one machining shape is a machining shape related to a machining process executed before a machining process related to the other machining shape and located in the tool direction viewed from the other machining shape. The one machining shape is deformed such that machining can be executed in the input execution order. This means that the one machining shape is extended in a direction opposite to the tool direction to pierce through the other machining shape. Therefore, a machining shape is deformed such that the order of machining processes input by the operator can be executed. According to the deformation of the machining shape, a portion overlapping in the deformed machining shape and a machining shape machined before the deformed machining shape is deleted from the machining shape machined before the deformed machining shape. Therefore, it is possible to generate a control command for performing machining while reducing useless machining as much as possible.

Second Embodiment.

An automatic programming apparatus and a control command generating method in a second embodiment are explained with reference to a new specific example. The configuration of the automatic programming apparatus in the second embodiment is substantially the same as the configuration in the first embodiment explained with reference to FIGS. 1 and 2. Therefore, in the following explanation, the configuration in the first embodiment is applied. The explanation of FIGS. 3, 6-1, 6-2, and 15 is applied to the control command generating method in the second embodiment. Redundant explanation is omitted.

First, an operation in which the material-shape-data input unit 1 receives externally-input material shape data in the processing at step S303 is explained with reference FIGS. 26-1, 26-2, 26-3, 27-1, 27-2, and 27-3.

Figures 1, 26:
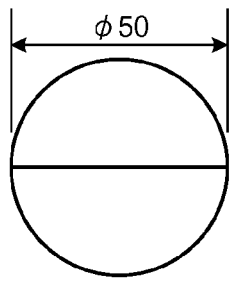
Figures 2, 26:
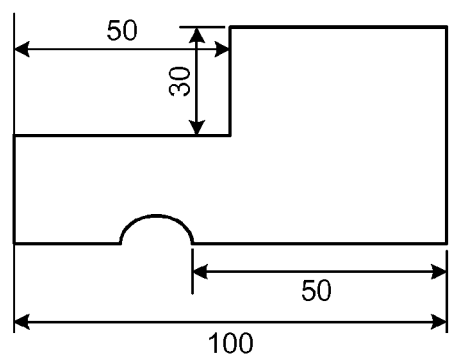
Figures 3, 26:
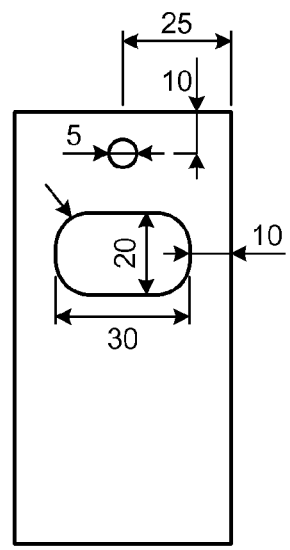
Figures 1, 2, 27:
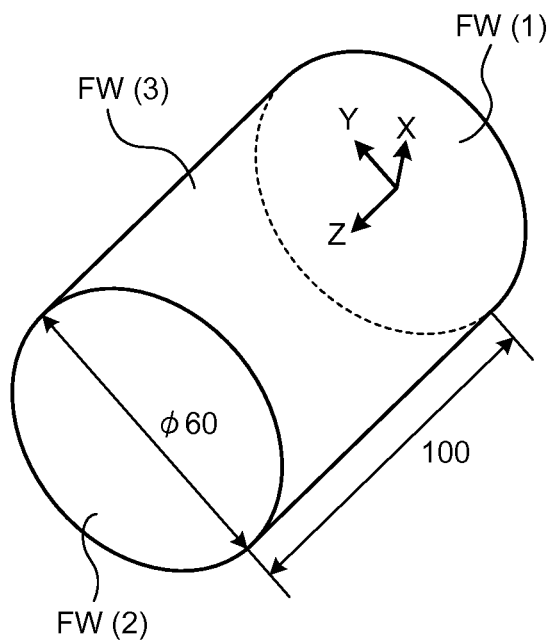
Figures 3, 27:
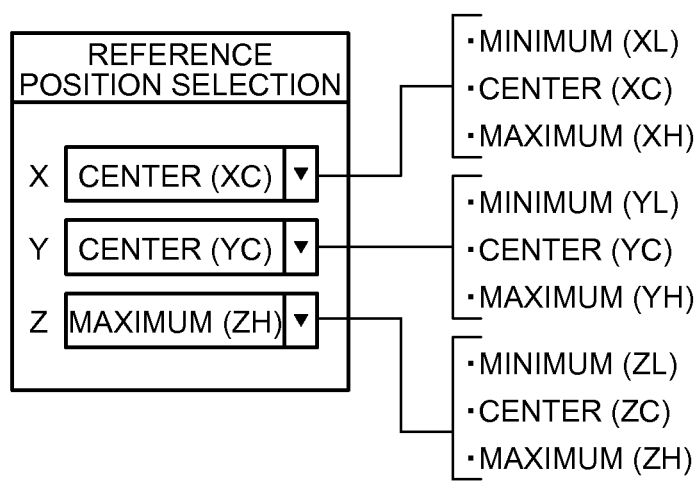

FIGS. 26-1 to 26-3 are diagrams for explaining a work piece explained in the second embodiment. FIG. 27-1 is a perspective view of a material shape for creating the work piece shown in FIGS. 26-1 to 26-3. FIGS. 27-2 and 27-3 are diagrams for explaining examples of a display screen for inputting material shape data of the material shape. As shown in FIG. 27-1, the material shape of the work piece has a columnar shape. As shown in FIG. 27-2, input items related to setting of material shape data include a reference point position on a material shape for designating a position of a material shape, positions (a position X, a position Y, and a position Z) on a work coordinate system of a reference point on the material shape, and the diameter of the material shape and a dimension in a Z-axis direction (a diameter and length Z). The reference point on the material shape is designated by selecting positions of any one of minimums, centers, and maximums in ranges of the material shape in the respective X, Y, and Z-axis directions on a display screen shown in FIG. 27-3. In the example shown in FIG. 27-2, XC-YC-ZH (the centers of ranges in the X and Y-axis directions and a point of the maximum in the range in the Z-axis direction) has been selected as the reference point. The center point of a surface of the columnar shape perpendicular to the Z-axis and on the Z-axis direction side is the reference point, which is matched with a reference point on the diagram shown in FIGS. 26-1 to 26-3. This is for facilitating position designation of a machining shape with respect to a material shape by selecting a reference point on the machining shape in the same manner in the input of the machining shape data in the processing at step S305. The material shape is set according to the setting of the display screen example shown in FIG. 27-2 such that a reference point coincides with a work origin as shown in FIG. 27-1. Attribute information (FW(1) to FW(3)) indicating surfaces of the material shape is added to the respective surfaces of the material shape.

An operation in which the machining-shape-data input unit 2 carries out the calculation of a Z-axis position on a machining shape upper surface and a dependency relation between a material shape and a machining shape or between machining shapes in the processing at step S605 is explained with reference to FIGS. 28-1, 28-2, 28-3, 28-4, 29-1, 29-2, 30-1, and 30-2.

Figures 1, 2, 28:
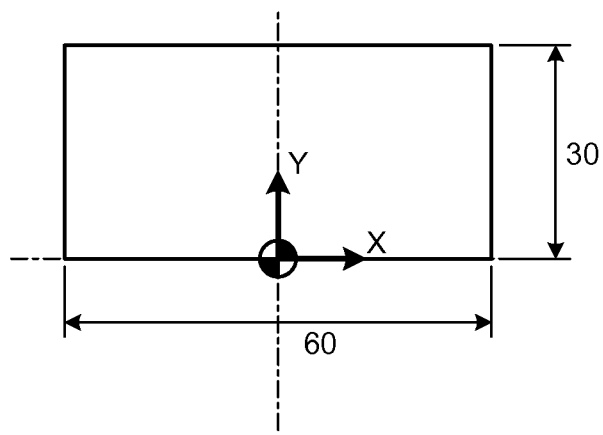

FIGS. 28-1 to 28-4, 29-1, 29-2, 30-1, and 30-2 are diagrams for explaining states in which a machining shape of a pocket section (a first pocket) of an end face in the work piece shown in FIGS. 26-1 to 26-3 is defined. FIG. 28-1 is a diagram of a machining area for defining the pocket section. FIGS. 28-2 to 28-4 are diagrams of examples of a display screen for an input for defining a machining shape of the pocket section. As shown in FIGS. 28-2 to 28-4, input items for defining a machining shape of the pocket section include reference point selection on a machining shape for designating a position of the machining shape, XY direction positions (a position X and a position Y) on a work coordinate system of a reference point, dimensions (length X and length Y) in the X and Y-axis direction of the machining shape, the radius of a corner R, an upper surface Z position (an upper surface Z) of the machining shape, and a distance (depth) from an upper surface to a lower surface (a surface of the machining shape perpendicular to the Z axis and on a Z-axis-direction side) of the machining shape. A setting method same as the setting method in inputting the material shape data is used as a setting method for the reference point. As an initial value, the value in the material shape data input is input. Consequently, in most cases where an input of a position can be easily performed because the reference point is set by the same method for the material shape and the machining shape, labor and time for designating the reference point can be saved.

On a display screen shown in FIG. 28-2, values for determining a position and a dimension in a machining region on a plane of the machining shape perpendicular to the Z axis (a machining region 291 shown in FIG. 29-1) are input. When an operator shifts an input item to be input to the upper surface Z position (the upper surface Z) of the machining shape, because the value is blank, the calculation of the upper surface Z position is executed according to the processing at step S605.

Figures 1, 29:
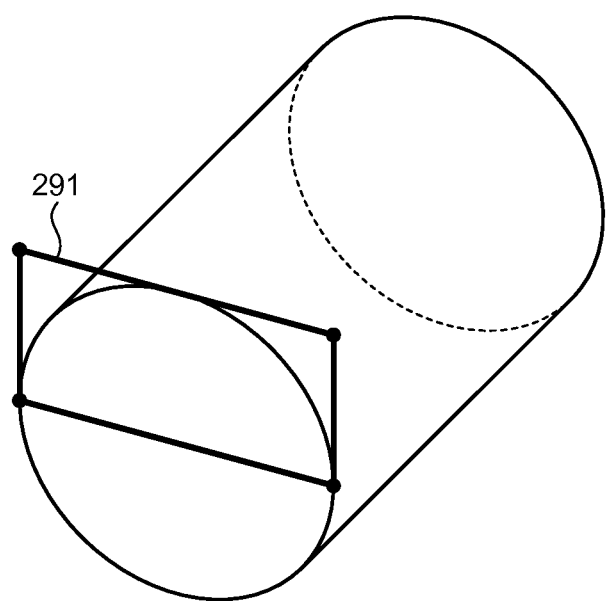
Figures 2, 29:
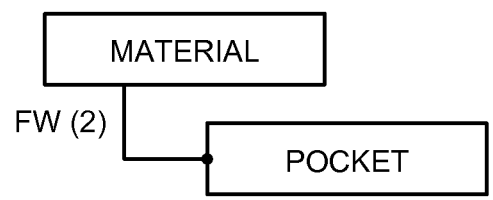

In this calculation, when the machining region is moved in the Z-axis-direction from a position apart from the machining material shape in the Z-axis direction, a Z position of the machining region at the time when the machining region comes into contact with the machining material shape first is extracted and set as a value of the upper surface Z position (FIG. 28-3). FIG. 29-1 is a diagram of a state at the time when the machining region shown in FIG. 28-1 comes into contact with the machining material shape first.

At this point, the surface of the machining material shape with which a region shape on the plane of the machining shape perpendicular to the Z axis comes into contact first is extracted. From an attribute attached to the surface, it is recognized whether the surface is a surface of a material shape or it is recognized a surface of which machining shape the surface is. The relation that the machining shape being set depends on the recognized material shape or machining shape is set. FIG. 29-2 shows a state in which the relation that the pocket depends on a surface FW(2) of a material has been set.

Figures 1, 30:
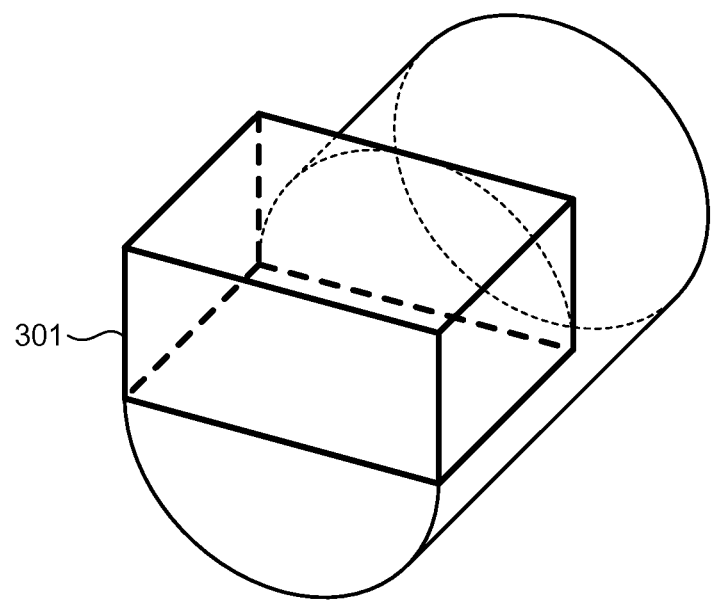
Figures 2, 30:
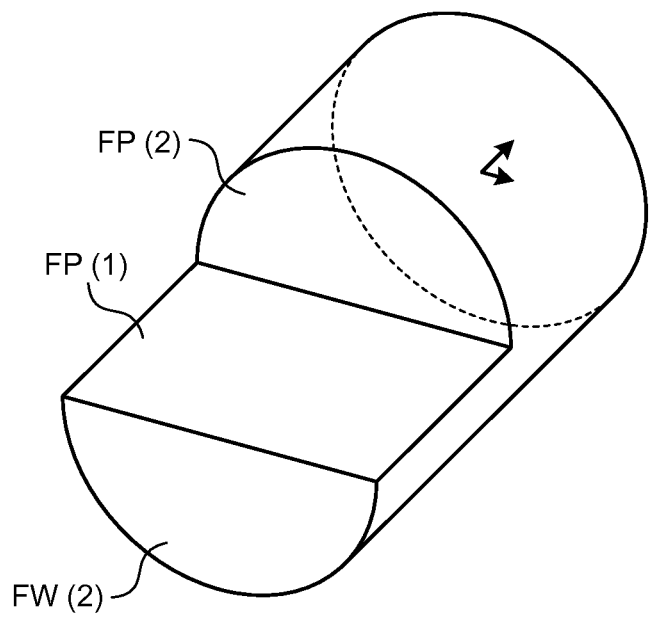

FIG. 28-4 shows a display screen to which a distance (depth) from the upper surface to the lower surface of the machining shape has been input. At this point, the positional relation between the machining material shape and the machining shape is as shown in FIG. 30-1. The portion indicated by a thin line is the machining material shape and the portion indicated by a thick line is the machining shape of the pocket section.

The processing by the machining-material-shape generating unit 6 at step S611 is specifically explained. FIG. 30-2 is a diagram of an example of a machining material shape generated by removing a pocket machining shape shown in FIG. 30-1 from the machining material shape. An attribute indicating a surface of the material shape and an attribute indicating a surface to which the pocket machining shape has been transferred are attached to respective surfaces of the machining material shape.

FIGS. 31-1, 31-2, 31-3, 31-4, 32-1, 32-2, 33-1, and 33-2 are diagrams of states in which a pocket (a second pocket) is further added to the wall surface of the first pocket.

Figures 1, 2, 31:
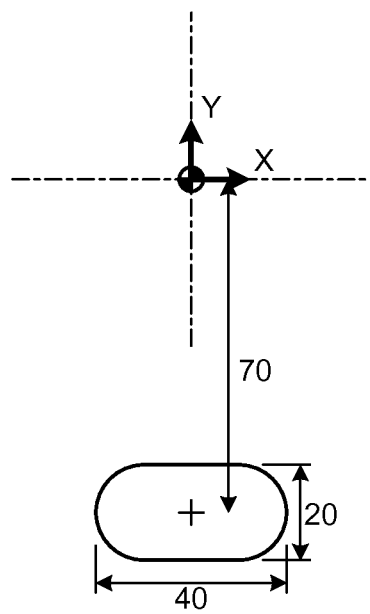

FIG. 31-1 shows a machining region for defining the second pocket. FIGS. 31-2 to 31-4 are examples of a display screen for input for defining the machining shape of the second pocket using the machining region. Input items of the display screen include reference point selection on the machining shape for designating a position of the machining shape, XY direction positions (a position X and a position Y) on a work coordinate system of the reference point, dimensions (length X and length Y) in the X and Y-axis directions of the machining shape, the radius of a corner R, an upper surface Z position (an upper surface Z) of the machining shape, and a distance (depth) from the upper surface to the lower surface (a surface of the machining shape perpendicular to the Z axis and on the Z-axis- direction side) of the machining shape.

As shown in FIG. 31-2, when an input item to be input is shifted to the upper surface Z position (the upper surface Z) of the machining shape, because a value is blank, the calculation of the upper surface Z position is executed according to the processing at step S605. A calculated value is displayed as shown in FIG. 31-3.

Figures 1, 32:
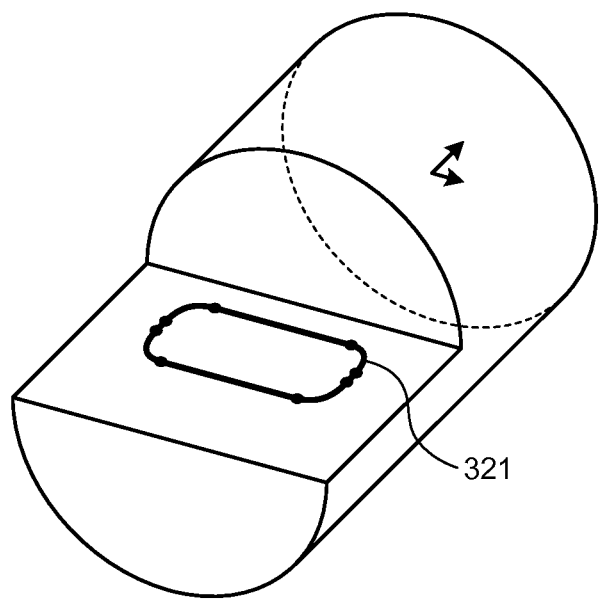
Figures 2, 32:
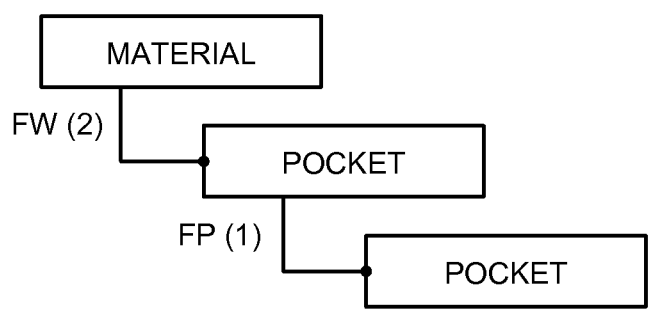

FIG. 32-1 shows a state at the time when the machining region shown in FIG. 31-1 comes into contact with a machining material shape first. In the processing at step S605, the surface (region 321) of the machining material shape with which a machining region on the plane of the machining shape perpendicular to the Z axis comes into contact first is extracted. From an attribute attached to the surface, it is recognized whether the surface is a surface of a material shape or it is recognized a surface of which machining shape the surface is. A relation that the machining shape being set depends on the recognized material shape or machining shape is set. FIG. 32-2 shows a state in which the relation that the pocket depends on the surface of FW(2) of a material is set.

Figures 1, 33:
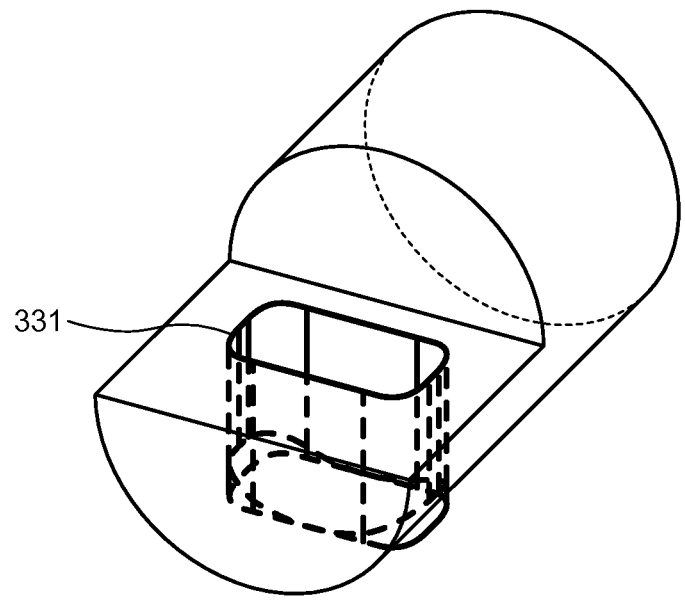
Figures 2, 33:
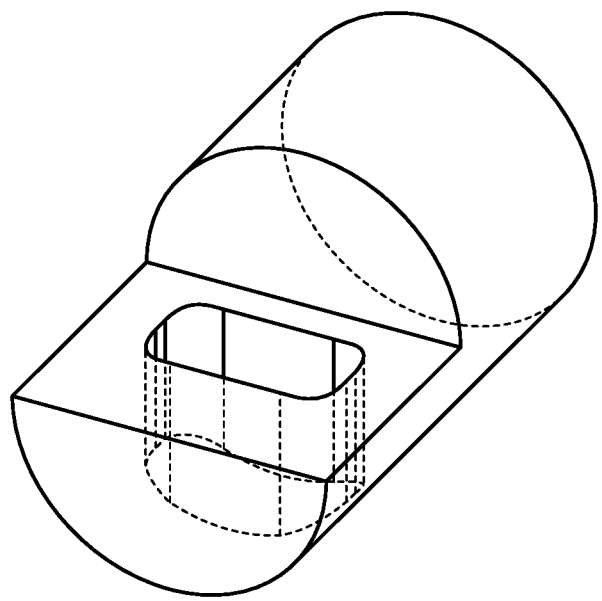

FIG. 31-4 shows an input window to which the distance (depth) from the upper surface to the lower surface of the machining shape has been input. At this point, a positional relation between the machining material shape and the machining shape is as shown in FIG. 33-1. A machining shape 331 indicated by a thick line is the machining shape. FIG. 33-2 shows an example of the machining material shape from which the machining shape related to the second pocket shown in FIG. 33-1 has been removed. An attribute indicating that it is a surface of the material shape and an attribute indicating that it is a surface to which the pocket machining shape has been transferred are attached to respective surfaces of the machining material shape.

FIGS. 34-1, 34-2, 34-3, 35-1, 35-2, 36-1, and 36-2 are diagrams of states in which a machining shape of a simple hole is added to the wall surface of the first pocket.

Figures 1, 34:
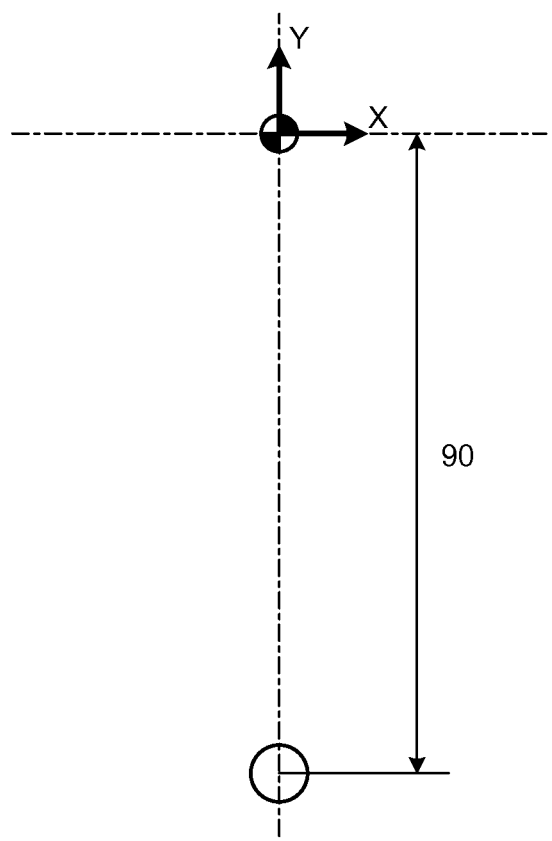
Figures 1, 35:
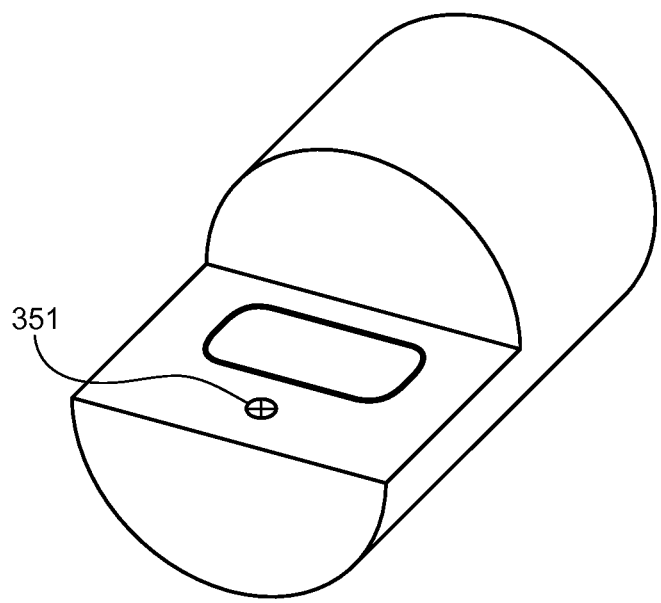
Figures 2, 35:
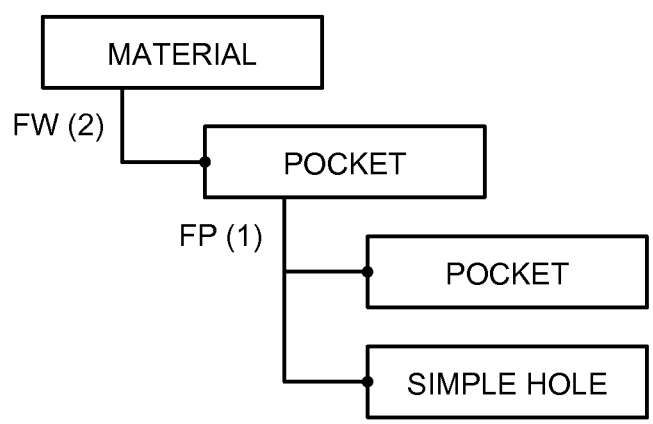

FIG. 34-1 shows a machining region on a plane of a machining shape perpendicular to the Z axis set on a display screen for input shown in FIG. 34-2. FIG. 34-3 is a diagram in which a Z position on a machining shape upper surface of the display screen has been automatically set. A position (a region 351) shown in FIG. 35-1 is extracted based on a region shape and the machining material shape shown in FIG. 33-2. The surface with which the region shape is in contact is the surface FW(2) to which an attribute indicating a surface of a material shape is attached. Therefore, as shown in FIG. 35-2, a dependency relation is established between the material shape and the machining shape of the simple hole.

Figures 1, 36:
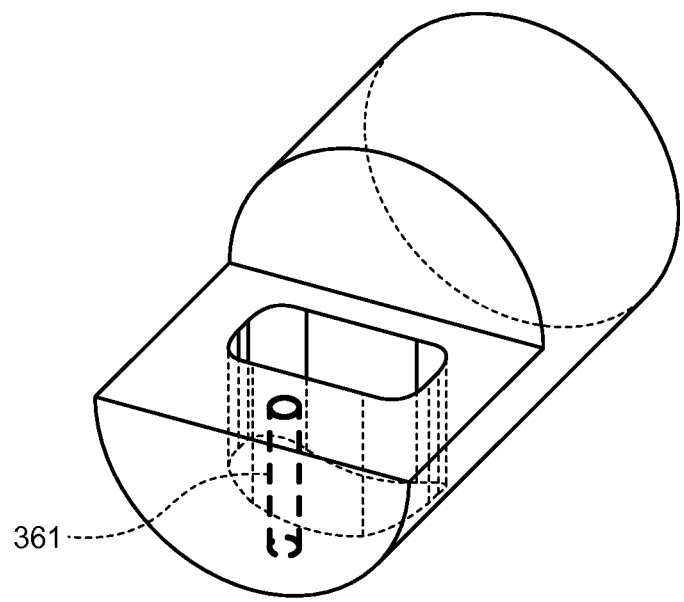
Figures 2, 36:
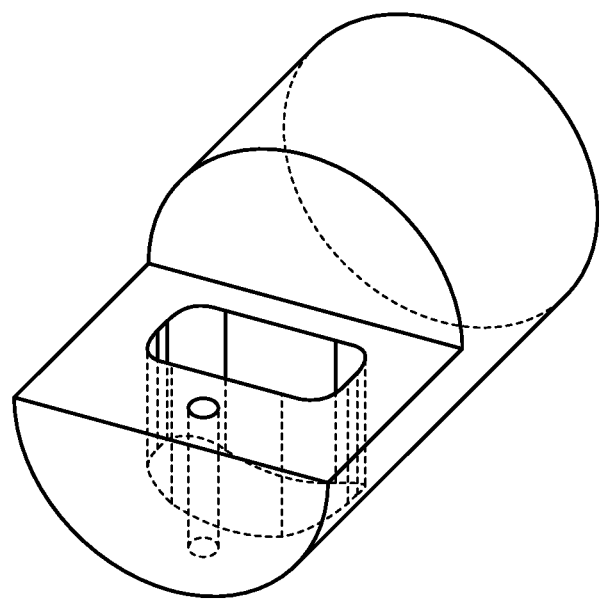

Further, when the machining material shape is generated, because the machining shape of the simple hole is a piercing-through type and a region in the depth direction is determined based on the machining material shape, as shown in FIG. 36-1, depth of the simple hole piercing through the machining material shape is automatically determined and a machining shape 361 of the simple hole is determined by the machining-material-shape generating unit 6. A machining material shape shown in FIG. 36-2 is obtained as a result.

In the input of the machining shape data explained above, a dependency relation between the material shape and the machining shape is set together with an upper surface Z position of the machining shape simply by giving data of the machining region on the plane of the machining shape perpendicular to the Z axis. Therefore, labor and time for an input of the upper surface Z position of the machining shape are saved. Further, it is possible to perform associated correction of the machining shape without requiring additional labor and time for associating correction of the machining shape.

An operation in which the machining-process-data generating/editing unit 3 generates machining process data based on the machining shape data stored in the machining-shape-data storing unit 12 in the processing at step S307 is specifically explained.

Figures 1, 37:
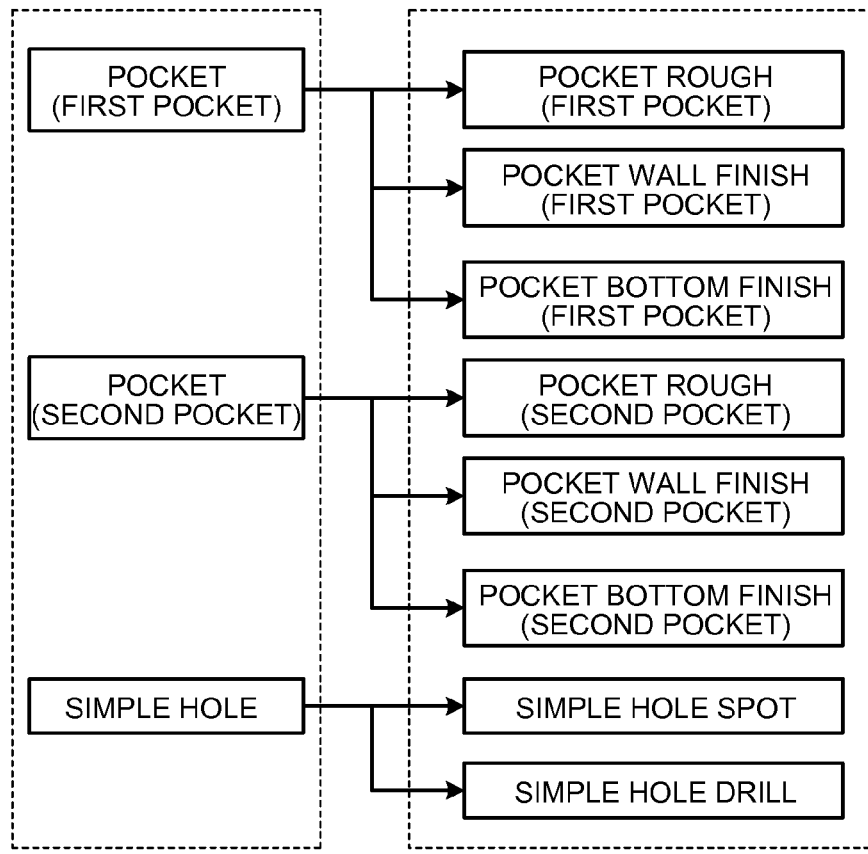
Figures 2, 37:
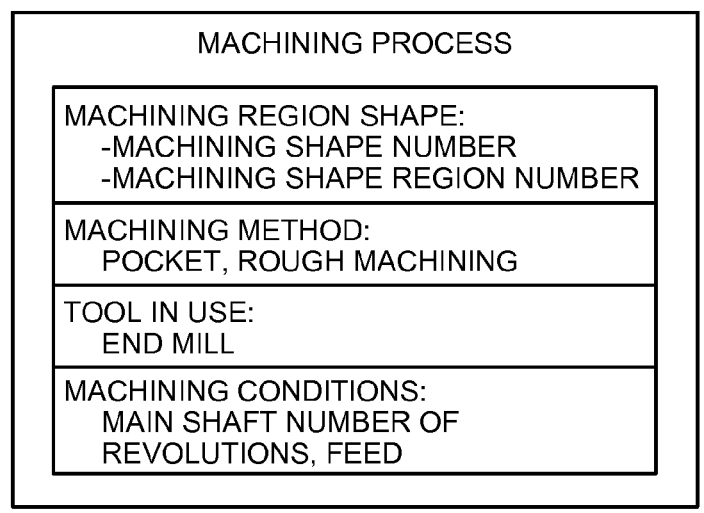

FIGS. 37-1 and 37-2 are diagrams of states of generation of machining process data. As shown in FIG. 37-2, the machining process data includes data for executing partial machining such as a machining shape, a machining method, a tool in use, and machining conditions. FIG. 37-1 is a diagram of an example of a relation between machining shapes and machining processes to be generated. As shown in the figure, machining processes of pocket rough (first pocket) machining, pocket wall finish machining (first pocket), and pocket bottom finish (first pocket) machining are generated from a machining shape of a first pocket. Machining processes of pocket rough (first pocket) machining, pocket wall finish (second pocket) machining, and second pocket bottom finish machining are generated from a machining shape of a second pocket. Machining processes of a simple hole spot and a simple hole drill are generated from a machining shape of a simple hole.

An operation in which the tool/machining order/tool direction editing unit 4 displays a list of tools in use for machining processes in the execution order of the machining processes from the machining process data stored in the machining-process-data storing unit 13 in the processing at step S309 is explained.

Figures 3, 38:
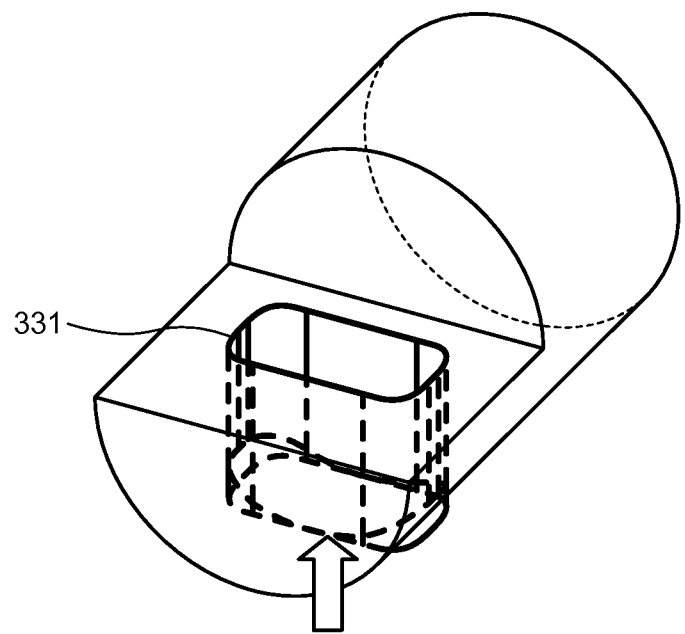
Figures 4, 38:
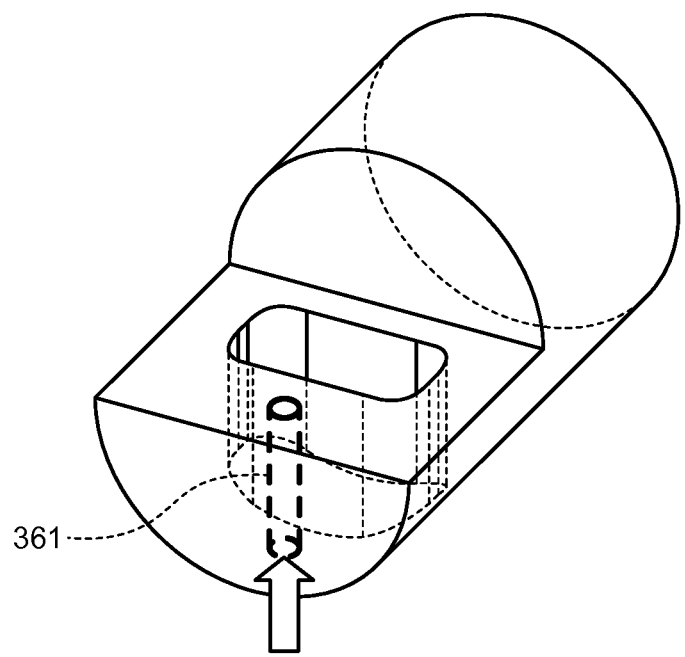

FIG. 38-1 is a diagram of a list of machining processes and machining tools. FIGS. 38-2, 38-3, and 38-4 are respectively diagrams of setting examples of a tool direction of the first pocket, a tool direction of the second pocket, and a tool direction of the simple hole set by the operator. The respective tool directions are indicated by white arrows. In this way, a tool direction can be set as desired. Therefore, it is possible to reduce machining depth by setting a tool direction of a machining shape located in an upper part on the paper surface to a direction from the upper part of the paper surface and setting a tool direction of a machining shape located in a lower part of the paper surface to a direction from the lower part of the paper surface. It is possible to prevent holder interference. Further, it is possible to reduce a tool projection amount. As a result, it is possible to increase cutting speed.

An operation in which the machining-process adjusting unit 5 generates a machining shape corresponding to designated machining process data from the machining shapes stored in the machining-shape-data storing unit 12 in the processing at step S1502 is explained.

Figures 1, 39:
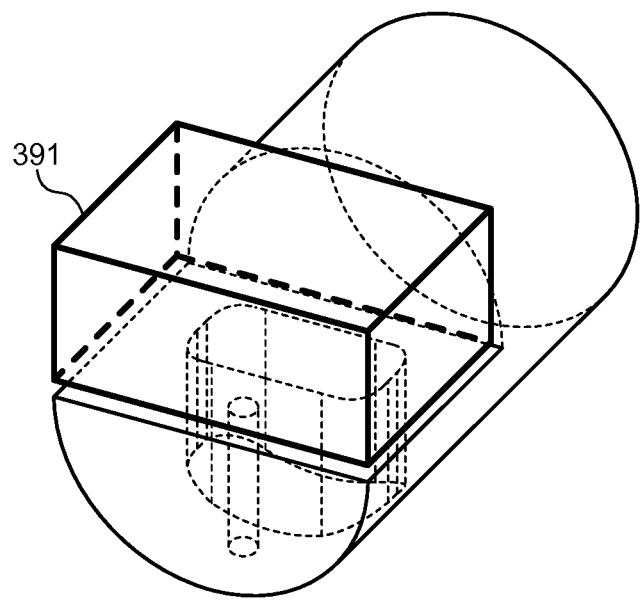
Figures 2, 39:
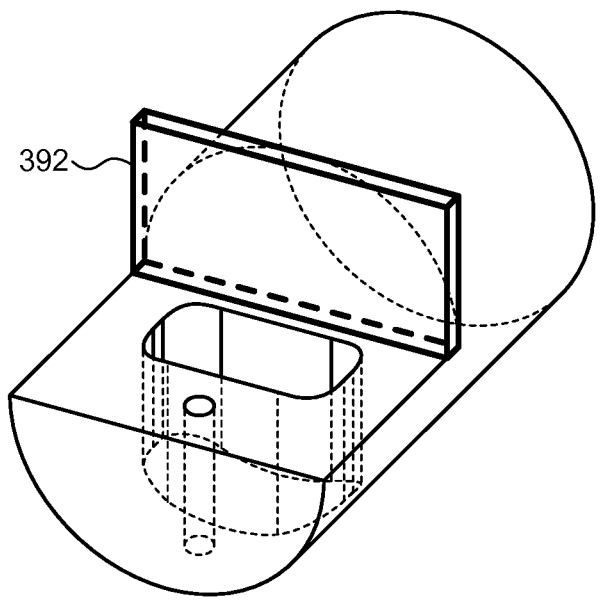
Figures 3, 39:
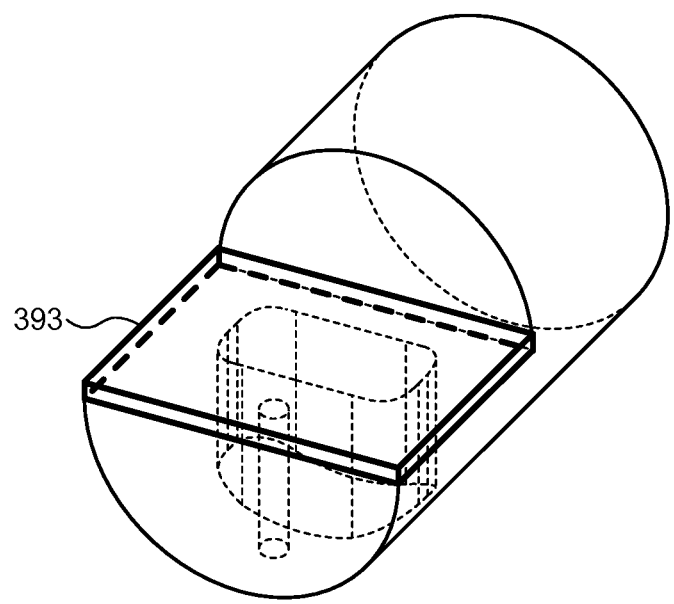
Figures 4, 39:
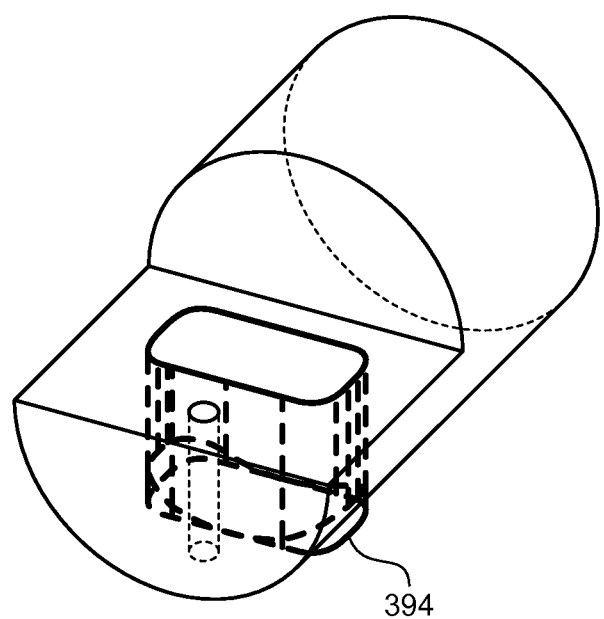
Figures 5, 39:
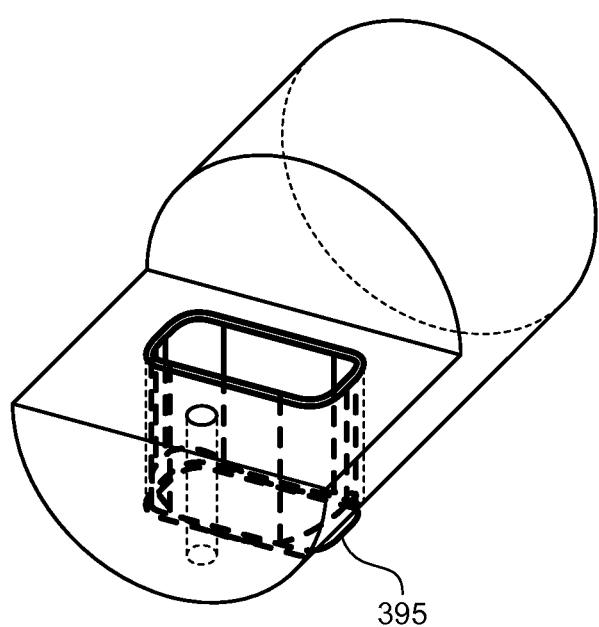

FIGS. 39-1, 39-2, 39-3, 39-4, and 39-5 are diagrams of machining shapes for each of machining processes. As shown in FIG. 39-1, a machining shape 391 indicated by a thick line obtained by excluding, from the machining shape 301 shown in FIG. 30-1, a wall margin for wall finish machining and a bottom margin for bottom finish machining is a machining shape of pocket rough (first pocket) (hereinafter, pocket rough (first stage pocket) 391). As shown in FIG. 39-2, a shape 392 indicated by a thick line obtained by extracting wall finish from the machining shape 301 shown in FIG. 30-1 indicates a machining shape of pocket wall finish (first pocket) (hereinafter, pocket wall finish (first pocket) 392). As shown in FIG. 39-3, a machining shape 393 indicated by a thick line obtained by extracting bottom finish from the machining shape 301 shown in FIG. 30-1 is a machining shape of pocket bottom finish (first pocket) (hereinafter, pocket bottom finish (first pocket) 393). As shown in FIG. 39-4, a machining shape 394 indicated by a thick line obtained by removing a wall margin for wall finish machining and a bottom margin for bottom finish machining from the machining shape 331 shown in FIG. 33-1 is a machining shape of pocket rough (second pocket) (hereinafter, pocket rough (second pocket) 394). As shown in FIG. 39-5, a machining shape 395 indicated by a thick line obtained by extracting wall finish from the machining shape 331 shown in FIG. 33-1 is a machining shape of pocket wall finish (second pocket) (hereinafter, pocket wall finish (second pocket) 395). There is no machining shape of pocket bottom finish (second pocket) because bottom finish cannot be extracted from the machining shape 331 shown in FIG. 33-1.

In the processing at step S1505, the machining-process adjusting unit 5 acquires a machining process on which the designated machining process depends. In the second embodiment, when extracting a machining process on which the designated machining process from a machining process in which a tool direction is the same as a tool direction in the designated process, the machining-process adjusting unit 5 operates according to the flowchart of FIG. 17-1 explained in the first embodiment. Concerning a machining process in which a tool direction is different from the tool direction in the designated machining process, a machining process, a machining shape related to which comes into contact with the bottom surface section of a machining shape related to the designated machining shape, and a machining process, a machining shape related to which overlaps the machining shape related to the designated machining process, are extracted as the machining process on which the designated machining process depends. For example, bottom surface sections of the pocket rough (second pocket) 394 and the wall finish (second pocket) 395 are in contact with the pocket bottom finish (first pocket) 393. Therefore, the pocket rough (second pocket) 394 and the wall finish (second pocket) 395 depend on the pocket bottom finish (first pocket) 393.

Figures 1, 40:
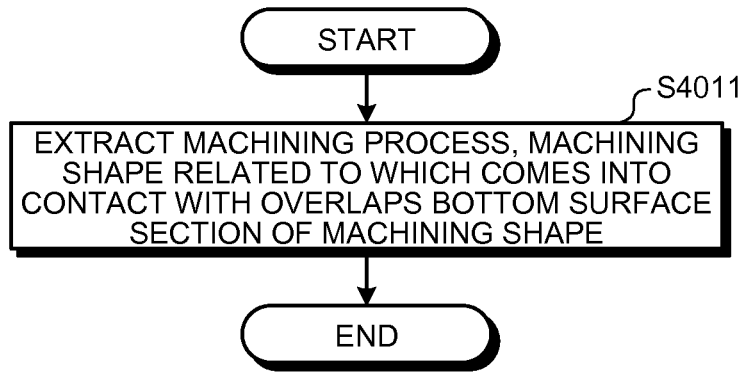
Figures 2, 40:
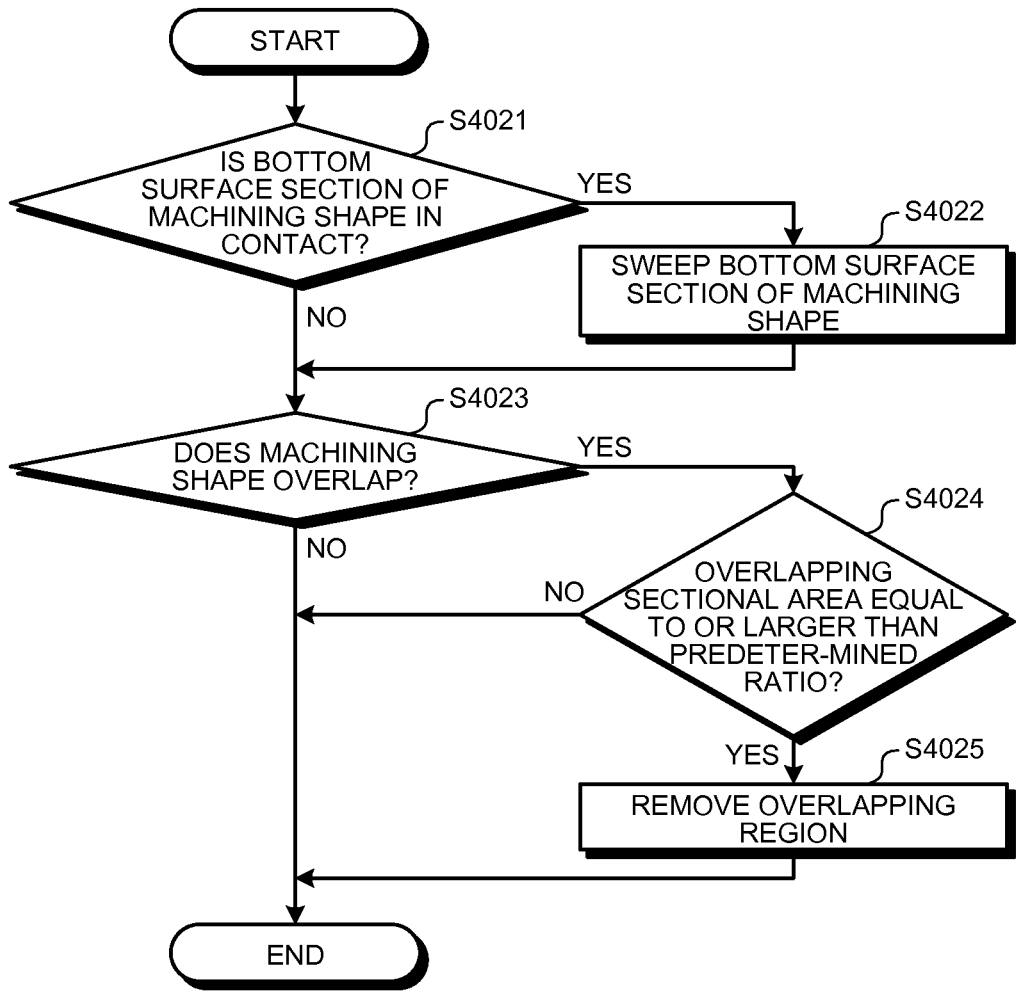

FIG. 40-1 is a flowchart for explaining, more in detail, the operation at step S1505 performed when a machining process on which the designated machining process depends is extracted from a machining process in which a tool direction is different from the tool direction in the designated machining process.

As shown in the figure, the machining-process adjusting unit 5 extracts a machining process, a machining shape related to which comes into contact with or overlaps the bottom surface section of the machining shape related to the designated machining process (step S4011). The machining-process adjusting unit 5 ends the processing at step S1505.

In the processing at step S1506, the machining-process adjusting unit 5 executes an operation for adjusting the machining shape related to the designated machining process. When the tool direction in the designated machining process and a tool direction in a machining process on which the designated machining process depends are the same, the machining-process adjusting unit 5 deforms the machining shape related to the designated machining process according to the processing equivalent to the processing in the first embodiment. FIG. 40-2 is a flowchart for explaining, more in detail, the operation at step S1506 performed when the tool direction in the designated machining process and the tool direction in the machining process on which the designated machining process depends are different.

At step S4021, the machining-process adjusting unit 5 checks whether the bottom surface of the machining shape related to the designated machining process is in contact with a machining shape related to the machining process that depends on the designated machining process extracted by the processing at step S1505. When the bottom surface is in contact with the machining shape (Yes at step S4021), the machining-process adjusting unit 5 proceeds to processing at step S4022. When the bottom surface is not in contact with the machining shape (No at step S4021), the machining-process adjusting unit 5 proceeds to processing at step S4023.

At step S4022, the machining-process adjusting unit 5 sweeps, i.e., extends the bottom surface section of the machining shape related to the designated machining process in the tool direction by an amount determined in advance and deforms the machining shape. After the processing at step S4022, the machining-process adjusting unit 5 proceeds to processing at step S4023.

Figures 1, 41:
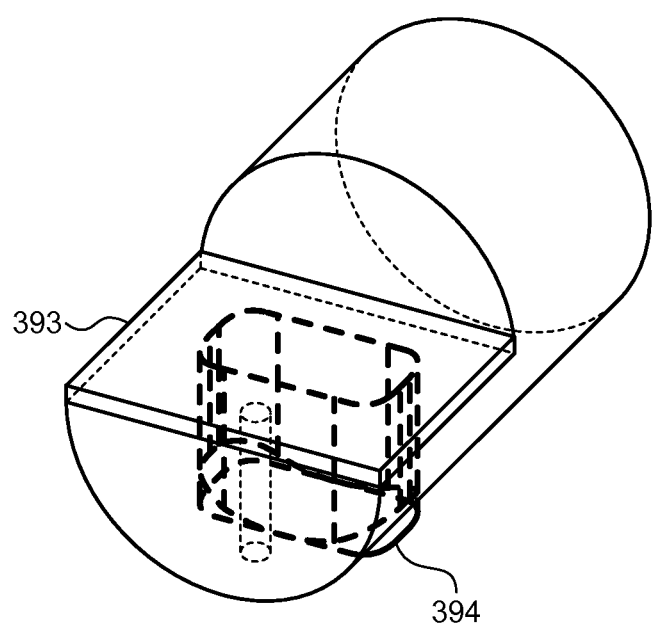
Figures 2, 41:
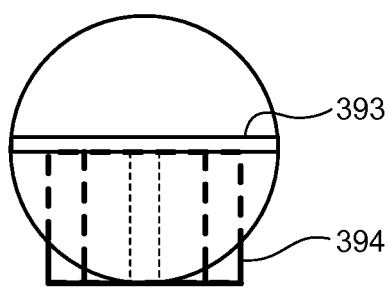
Figures 3, 41:
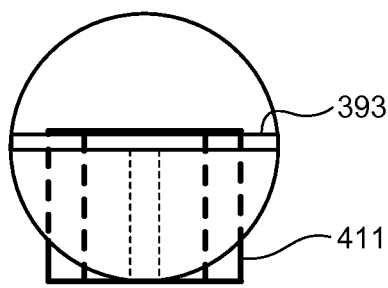

FIGS. 41-1, 41-2, and 41-3 are diagrams for explaining states in which a machining shape of the pocket rough (second pocket) 394 is deformed. FIG. 41-1 is a perspective view of the machining shape before deformation. FIG. 41-2 is a sectional view for explaining the machining shape before deformation. FIG. 41-3 is a sectional view for explaining the machining shape after deformation. FIG. 41-3 is a sectional view for explaining the machining shape after deformation. As shown in FIGS. 41-1 and 41-2, the pocket rough (second pocket) 394 comes into contact with the pocket bottom finish (first pocket) 393 with which the pocket rough (second pocket) 394 interferes. Therefore, according to the processing at step S4022, the bottom surface section of the pocket bottom finish (first pocket) 393 is swept to be extended in the tool direction to deform the machining shape. That is, the pocket rough (second pocket) 394 is deformed like a machining shape 411 (hereinafter, pocket rough (second pocket) 411) shown in FIG. 41-3.

Figures 1, 42:
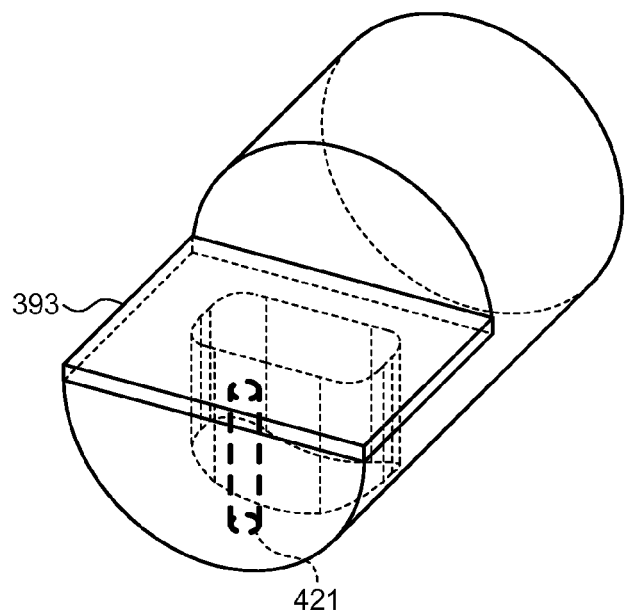
Figures 2, 42:
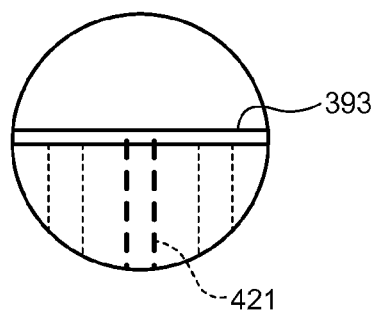
Figures 3, 42:
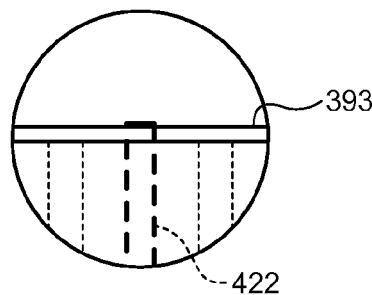

FIGS. 42-1, 42-2, and 42-3 are diagrams for explaining states in which a machining shape of the simple hole drill is deformed. FIG. 42-1 is a perspective view for explaining the machining shape before deformation. FIG. 42-2 is a sectional view for explaining the machining shape before deformation. FIG. 42-3 is a sectional view for explaining the machining shape after deformation. As shown in FIGS. 42-1 and 42-2, a machining shape 421 of the simple hole drill (hereinafter, simple hole drill 421) comes into contact with the pocket bottom finish (first pocket) 393 on which the simple hole drill 421 depends. Therefore, according to the processing at step S4022, the bottom surface section of the pocket bottom finish (first pocket) 393 is swept to be extended in the tool direction to deform the machining shape. That is, the simple hole drill 421 is deformed like a machining shape 422 (hereinafter, simple hole drill 422) shown in FIG. 42-3.

At step S4023, the machining-process adjusting unit 5 checks whether the machining shape related to the designated machining process overlaps a machining shape related to a machining process on which the designated machining process depends. When the machining shape does not overlap (No at step S4023), the processing at step S1506 ends. When the machining shape overlaps (Yes at step S4023), the machining-process adjusting unit 5 proceeds to processing at step S4024.

Figure 43:
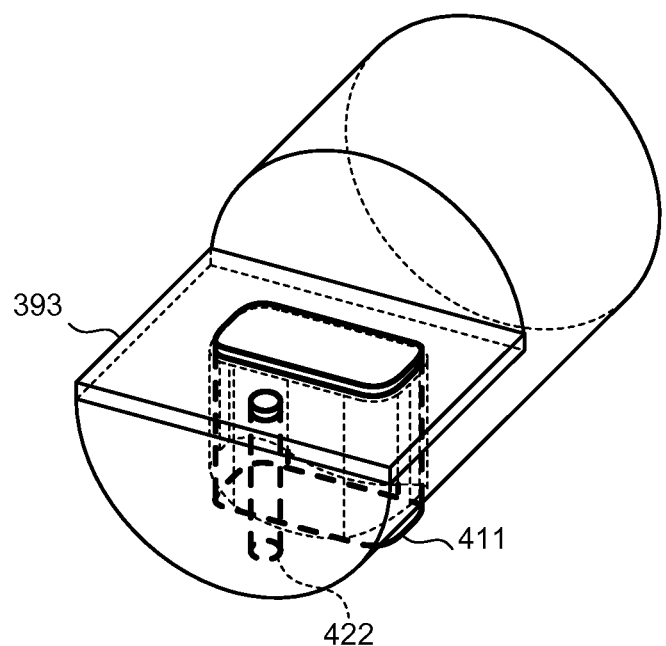
FIG. 43 is a diagram indicating that pocket bottom finish (first pocket) and the simple hole drill and pocket rough (second pocket) overlap.

FIG. 43 is a diagram indicating that the pocket bottom finish (first pocket) 393 and the simple hole drill 422 and pocket rough (second pocket) 411 overlap.

At step S4024, the machining-process adjusting unit 5 generates a sectional shape obtained by slicing the machining shape related to the designated machining process along a plane perpendicular to the tool direction and calculates the area of the sectional shape. The machining-process adjusting unit 5 generates a sectional shape obtained by slicing an overlapping machining shape related to another machining process, in which a tool direction is different, along a plane perpendicular to the tool direction of the designated machining process and calculates the area of the sectional shape. The machining-process adjusting unit 5 determines whether a ratio of the area of an overlapping sectional shape related to the other machining process, in which the overlapping tool direction is different, to the area of the sectional shape related to the designated machining process exceeds a predetermined value. When the ratio exceeds the predetermined value (Yes at step S4024), the machining-process adjusting unit 5 deletes a region of the overlap from the machining shape related to the designated machining shape (step S4025). The processing at step S1506 ends. When the ratio does not exceed the predetermined value (No at step S4024), the processing at step S4025 is skipped.

Figures 1, 44:
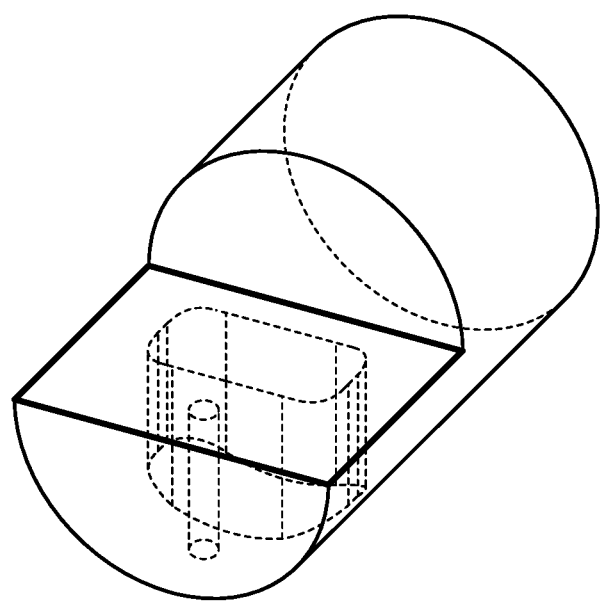
Figures 2, 44:
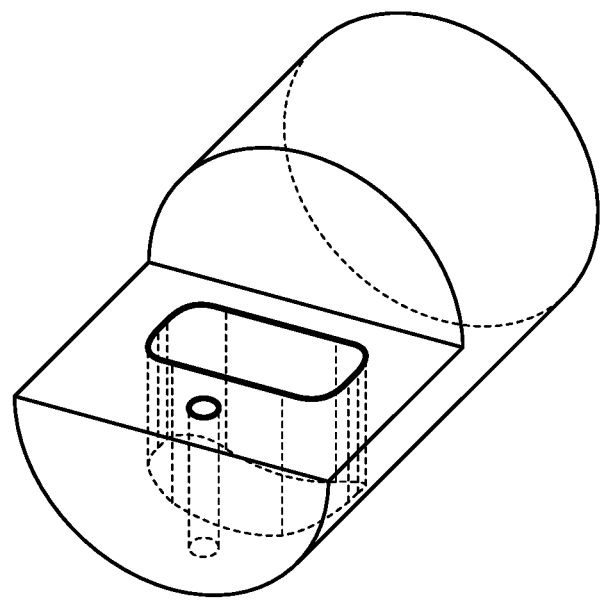
Figures 3, 44:
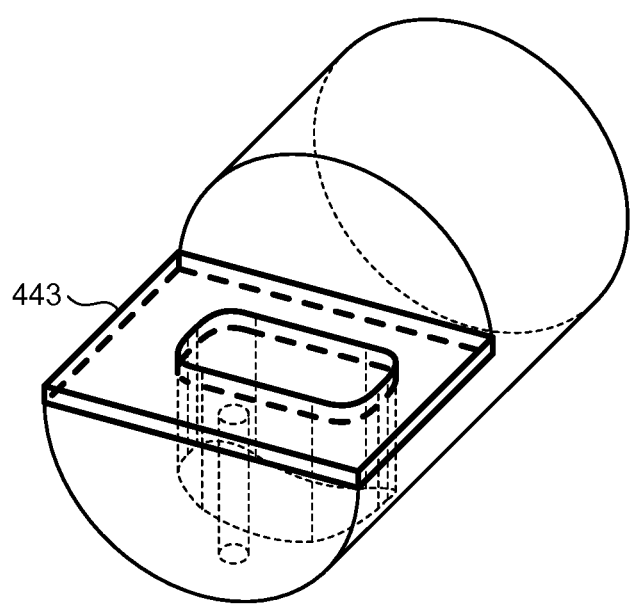

FIG. 44-1 is a diagram of a sectional shape of the pocket bottom finish (first pocket) 393 serving as the designated machining process in the processing at step S4024. FIG. 44-2 is a diagram of sectional shapes of the pocket rough (second pocket) 411 overlapping the pocket bottom finish (first pocket) 393, the wall finish (second pocket) 395 after deformation, and the simple hole drill 422. In the respective figures, the sectional shapes are indicated by thick lines. FIG. 44-3 is a diagram of a machining shape after deformation (pocket bottom finish (first pocket) 443) of the pocket bottom finish (first pocket) 393. The predetermined value used for the comparison in the determination processing at step S4024 is set to 10%. As shown in the figure, the pocket bottom finish (first pocket) 443 has a shape obtained by removing a portion overlapping the pocket rough (second pocket) 411.

Figures 1, 45:
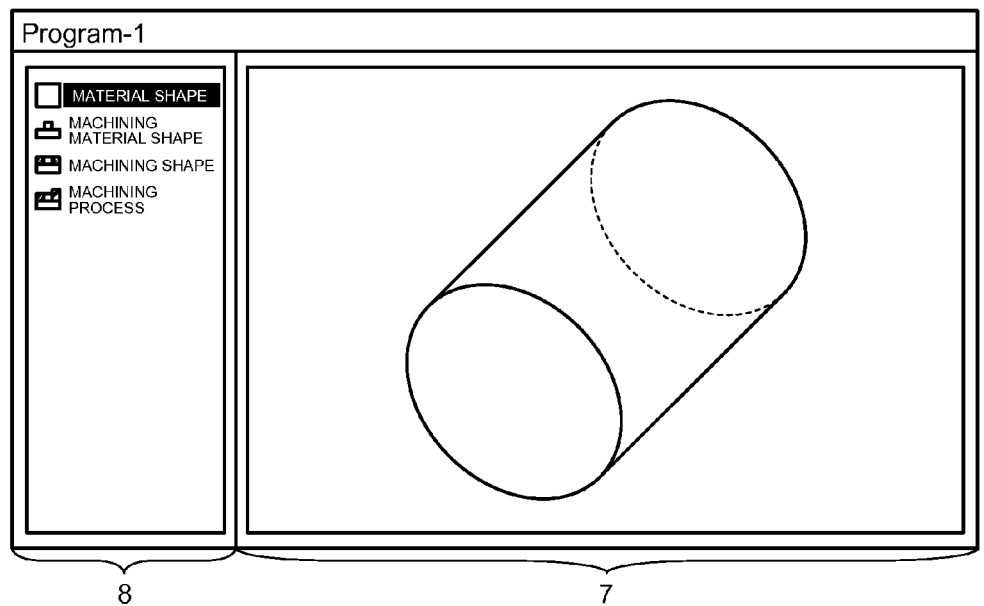
Figures 2, 45:
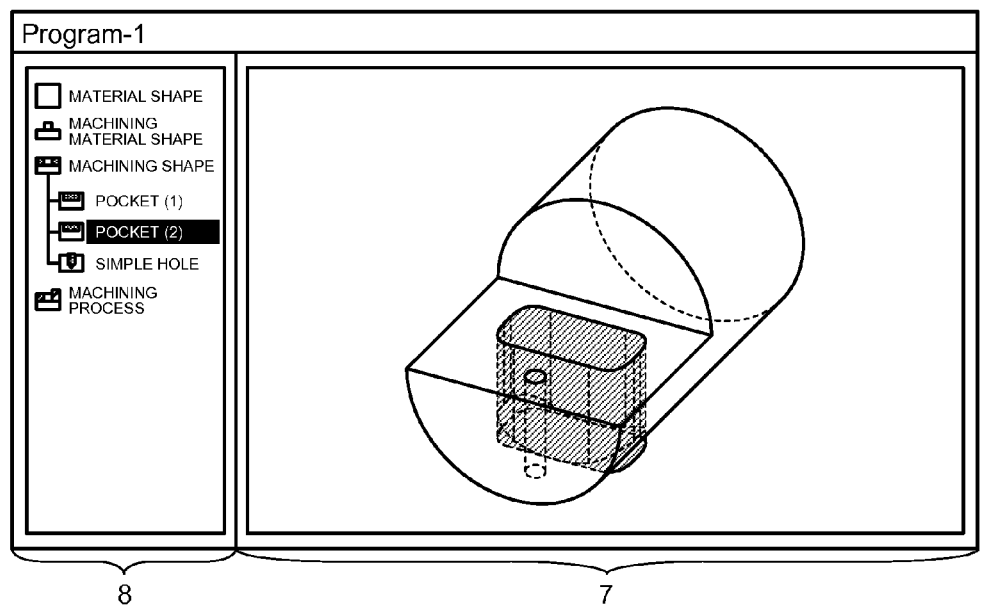

FIGS. 45-1, 45-2, 46-1, 46-2, 47-1, 47-2, 47-3, 48-1, 48-2, 48-3, 48-4, 48-5, 48-6, 48-7, 48-8, 49-1, 49-2, 49-3, 49-4, 49-5, 49-6, 49-7, and 49-8 are diagrams of examples of a display screen displayed on the output device 1005 of the automatic programming apparatus 1000 in the second embodiment. As shown in FIG. 45-1, the display screen includes the program-component-list display unit 8 and the shape display unit 7. A shape corresponding to the elements (the material shape, the machining material shape, the machining shape, and the machining process) selectable in the program-component-list display unit 8 is three-dimensionally displayed on the shape display unit 7.

After the processing at step S303, as shown in FIG. 45-1, the program-component-list display unit 8 changes "material shape" to a selected state and highlights the "material shape". The shape display unit 7 displays a material shape corresponding to the "material shape".

After the processing at step S305, as shown in FIG. 45-2, the program-component-list display unit 8 changes "pocket (2)" belonging to the input and set machining shape to a selected state and highlights the "pocket (2)". The shape display unit 7 displays the machining shape together with the machining material shape. The pocket (2) indicates the second pocket. In the following explanation, concerning a machining shape output for display by the program-component-list display unit 8, "(1)" is affixed to the end of a machining shape related to the first pocket and "(2)" is affixed to the end of a machining shape related to the second pocket to distinguish the machining shapes. Because the shape display unit 7 displays the machining shape together with the machining material shape, it is easy to check a positional relation of the machining shape with the machining material shape. A burden on the operator for inputting and setting a sure machining shape is reduced. When the operator desires to check only the machining material shape, as shown in FIG. 46-1, the operator can cause the shape display unit 7 to display a desired machining material shape by selecting "machining material shape" in the program-component-list display unit 8.

Figures 1, 46:
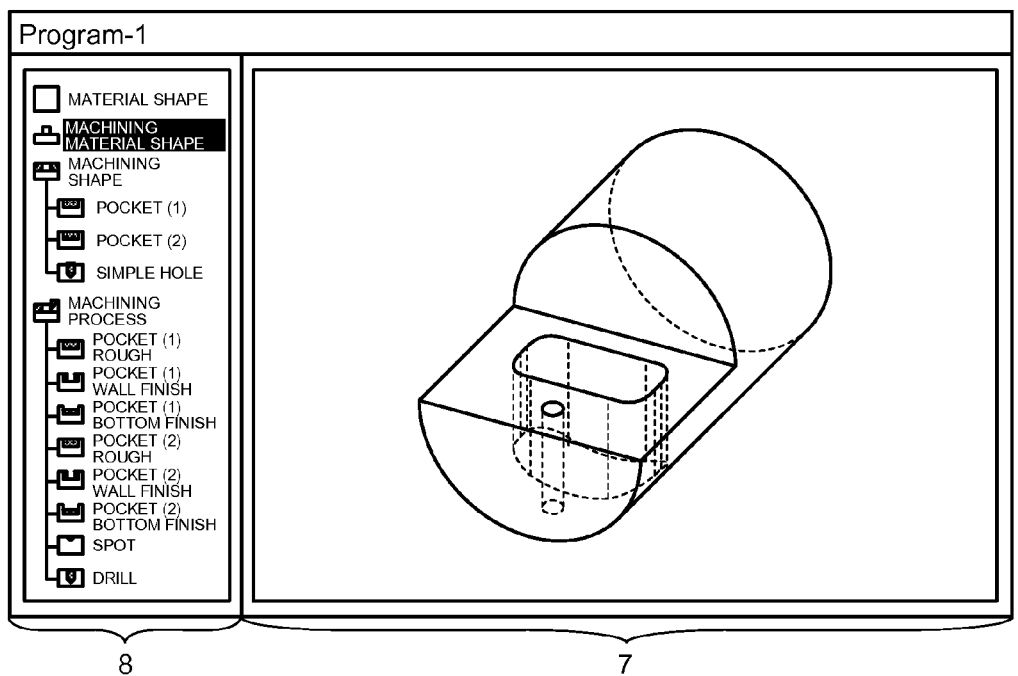
Figures 2, 46:
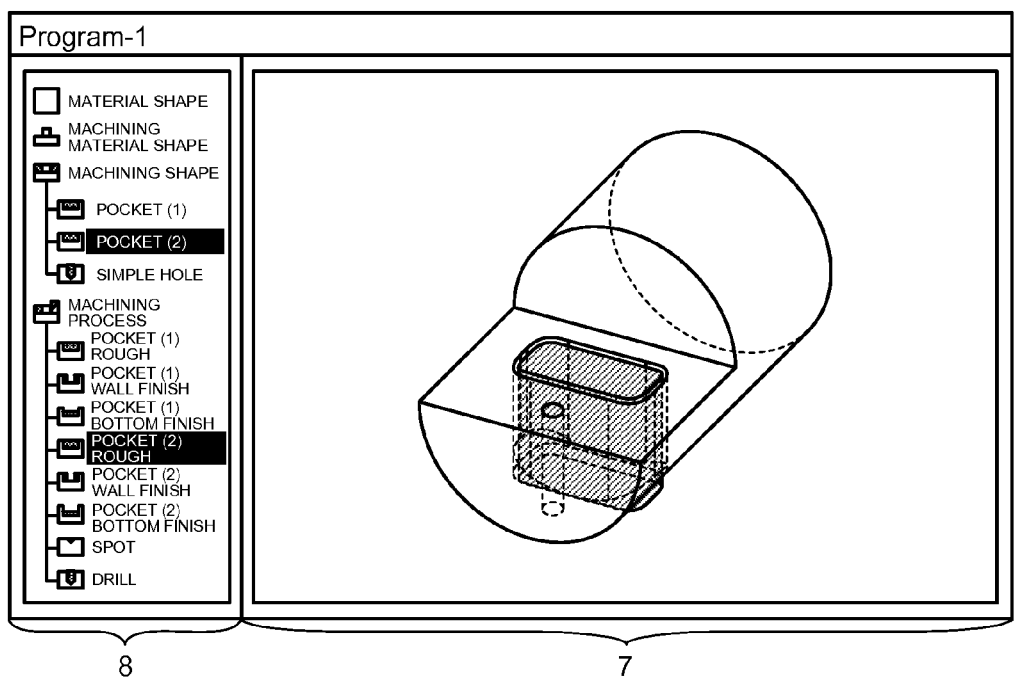
Figures 1, 47:
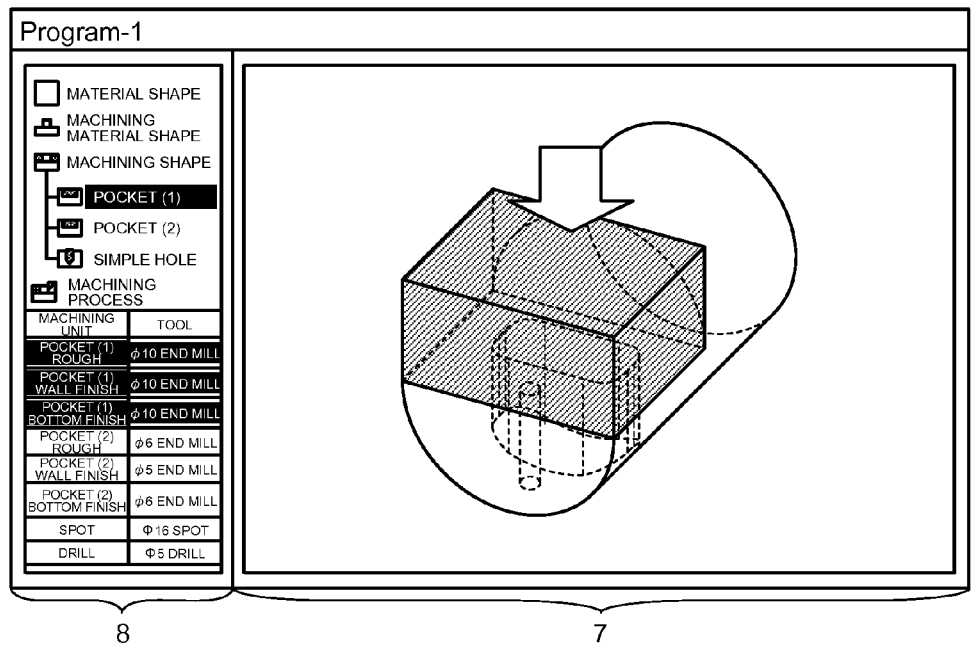
Figures 2, 47:
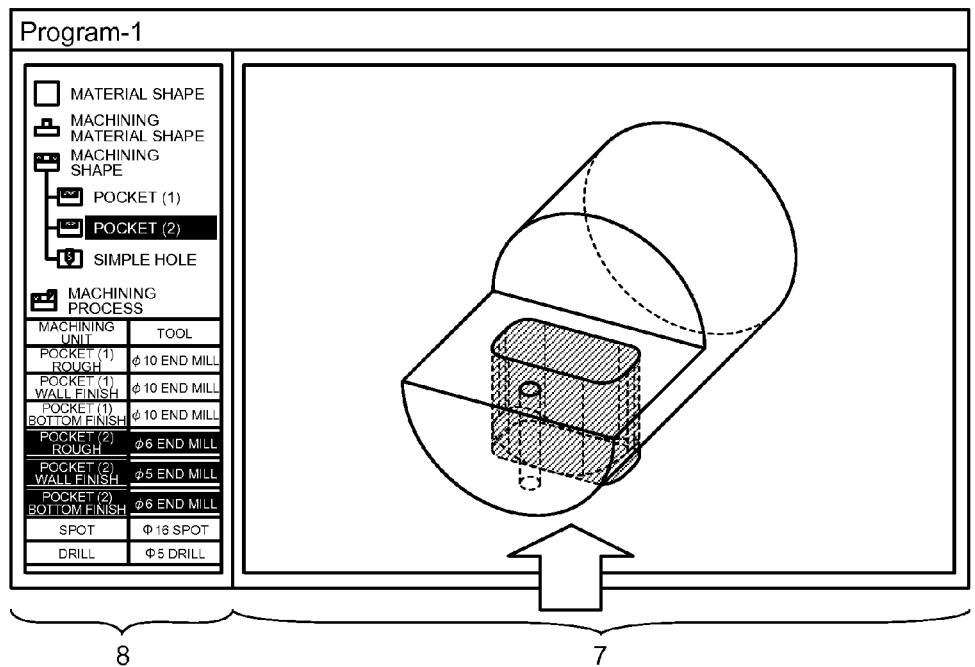
Figures 3, 47:
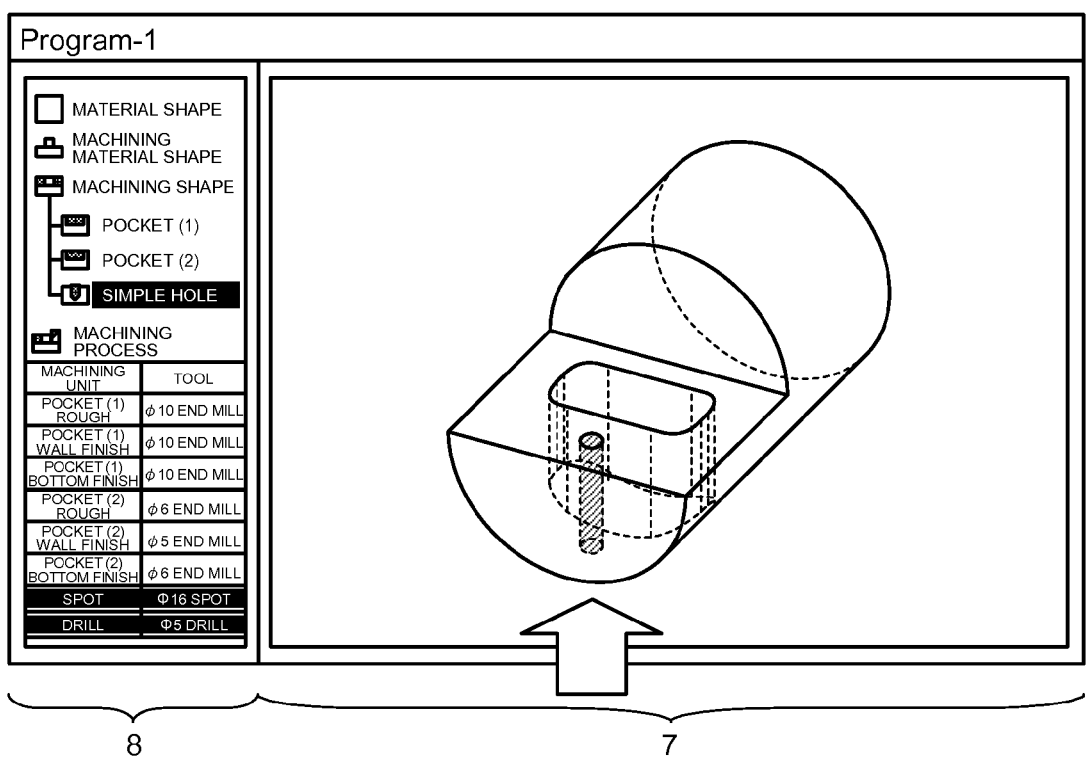

After the processing at step S307, as shown in FIG. 46-2, the program-component-list display unit 8 changes a machining shape related to the input and set machining process to a selected state and highlights the machining shape. The shape display unit 7 displays the related machining shape together with the machining material shape.

Before the processing at step S309, (0.0, 0.0, −1.0) is set as an initial value of a tool direction of the pocket rough (first pocket) 391, the pocket wall finish (first pocket) 392, and the pocket bottom finish (first pocket) 393. According to an input from the operator, the tool direction has been changed to (1.0, 0.0, 0.0) and set as indicated by a white arrow in FIG.

47-1. Similarly, as a tool direction of the pocket rough (second pocket) 394, the wall finish (second pocket) 395, and the second pocket bottom finish, (−1.0, 0.0, 0.0) set as an initial value is changed to (1.0, 0.0, 0.0) and set as indicated by a white arrow in FIG. 47-2. Similarly, as a tool direction of the simple hole spot and the simple hole drill, (−1.0, 0.0, 0.0) set as an initial value has been changed to (1.0, 0.0, 0.0) and set as indicated by a white arrow in FIG. 47-3.

FIGS. 48-1 to 48-8 and FIGS. 49-1 to 49-8 are diagrams for explaining the difference in display related to a machining shape before and after the processing at step S311 (i.e., the adjustment of the machining processes). FIGS. 48-1 to 48-8 show screen display before the processing at step S311. FIGS. 49-1 to 49-8 show screen display after the processing at step S311. As shown in the figures, according to the processing at step S311, the respective machining shapes of the pocket rough (second pocket) 394, the wall finish (second pocket) 395, and the simple hole drill are extended upward on the paper surface. Among portions of the machining shape of the pocket bottom finish (first pocket) 393, where useless machining occurs because the deformation for extending the machining shapes upward on the paper surface, overlapping the respective machining shapes of the pocket rough (second pocket) 394, the wall finish (second pocket) 395, and the simple hole drill, portions, where useless machining equal to or higher than a predetermined ratio occurs, respectively overlapping the pocket rough (second pocket) 394 and the wall finish (second pocket) 395 are deleted from the machining shape of the pocket bottom finish (first pocket) 393. That is, it is seen that setting for reducing the useless machining is adopted.

As explained above, according to the second embodiment of the present invention, the machining-process adjusting unit 5 is configured to extend, concerning two machining shapes having tool directions different from each other among the second machining shapes, when the bottom surface section of one machining shape of the two machining shapes is in contact with the other machining shape, the bottom surface section of the one machining shape in the tool direction of the one machining shape, delete, from the other machining shape that overlaps the one machining shape because of the deformation of the one machining shape, a portion of the overlap, and generate a third machining shape. Therefore, it is possible to eliminate a shaving remain of the bottom surface section of the one machining shape and reduce useless machining caused by the deformation.

The second machining shapes are configured to include a machining shape machined by rough machining, a machining shape machined by wall finish machining, and a machining shape machined by bottom finish machining.

The machining-process adjusting unit 5 is configured to delete, when a ratio of a portion where the one machining shape and the other machining shape overlap on the plane of the one machining shape perpendicular to the tool direction to the other machining shape is larger than a predetermined value, the overlapping portion from the other machining shape and not to delete the overlapping portion when the ratio is smaller than the predetermined value. Therefore, it is possible to reduce useless machining according to a degree.

REFERENCE SIGNS LIST

1 Material-shape-data input unit
2 Machining-shape-data input unit
3 Machining-process-data generating/editing unit
4 Tool/machining order/tool direction editing unit
5 Machining-process adjusting unit
6 Machining-material-shape generating unit
7 Shape display unit
8 Program-component-list display unit
9 Control-command generating unit
10 Material-shape-data storing unit
11 Machining-material-shape-data storing unit
12 Machining-shape-data storing unit
13 Machining-process-data storing unit
81 Machining region
161 Pocket rough (first stage pocket)
162 Opening section
163 Pocket wall finish (first stage pocket)
164, 201 Pocket bottom finish (first stage pocket)
165, 181 Pocket rough (second stage pocket)
166 Opening section
167, 191 Pocket wall finish (second stage pocket)
168 Pocket bottom finish (second stage pocket)
291 Machining region
301 Machining shape
321 Machining region
331 Machining shape
351 Machining region
361 Machining shape
391 Pocket rough (first pocket)
392 Pocket wall finish (first pocket)
393 Pocket bottom finish (first pocket)
394 Pocket rough (second pocket)
395 Pocket wall finish (second pocket)
411 Machining shape
421, 422 Simple hole drill
1000 Automatic programming apparatus
1001 CPU
1002 RAM
1003 ROM
1004 Input device
1005 Output device
1006 Control command generating program

The invention claimed is:

1. An automatic programming apparatus comprising:
a machining-shape generating unit configured to generate second machining shapes for each of machining processes from each of a plurality of first machining shapes input from outside;
a machining-order editing unit configured to receive an input of execution order of the machining processes;
a machining-shape adjusting unit configured to extend, among a plurality of the second machining shapes having a same tool direction, which is a direction that a tool is fed during machining, one of the second machining shapes in a direction opposite to the tool direction to pierce through, another machining shape being set after the one second machining shape in execution order of the machining processes and located in a direction opposite to the tool direction viewed from the one second machining shape, delete, from the other machining shape that overlaps the one second machining shape because of the extension of the one second machining shape, a portion of the overlap, and generate a third machining shape; and
a control-command generating unit configured to generate, based on the third machining shape and the input execution order, a control command for causing a machine tool to operate.

2. The automatic programming apparatus according to claim 1, wherein the second machining shapes for each of the machining processes generated by the machining-shape generating unit include a machining shape machined by rough machining, a machining shape machined by wall finish machining, and a machining shape machined by bottom finish machining.

3. An automatic programming apparatus comprising:
a machining-process-data generating unit configured to generate second machining shapes for each of machining processes from each of an externally-input plurality of first machining shapes;
a machining-shape adjusting unit configured to extend, among two of the second machining shapes having tool directions different from each other, the tool directions being directions that a tool is fed during machining, among the second machining shapes, when a bottom surface section of one machining shape of the two machining shapes is in contact with the other machining shape, the bottom surface section of the one machining shape in the tool direction of the one machining shape, delete, from the other machining shape that overlaps the one machining shape because of the extension of the one machining shape, a portion of the overlap, and generate a third machining shape; and
a control-command generating unit configured to generate, based on the third machining shape, a control command for causing a machine tool to operate.

4. The automatic programming apparatus according to claim 3, wherein the second machining shapes for each of the machining processes generated by the machining-shape generating unit include a machining shape machined by rough machining, a machining shape machined by wall finish machining, and a machining shape machined by bottom finish machining.

5. The automatic programming apparatus according to claim 3, wherein the machining-shape adjusting unit deletes, when a ratio of a portion where the one machining shape and the other machining shape overlap on a plane of the one machining shape perpendicular to the tool direction to the other machining shape is larger than a predetermined value, the overlapping portion from the other machining shape and does not delete the overlapping portion when the ratio is smaller than the predetermined value.

6. A control command generating method comprising:
a machining-shape generating step of generating second machining shapes for each of machining processes from each of a plurality of first machining shapes input from an outside;
a machining-order editing step of receiving an input of execution order of the machining processes;
a machining-shape adjusting step of extending, among a plurality of the second machining shapes having a same tool direction, which is a direction that a tool is fed during machining, one of the second machining shapes in a direction opposite to the tool direction to pierce through, another machining shape being set after the one second machining shape in execution order of the machining processes and located in a direction opposite to the tool direction viewed from the one second machining shape, deleting, from the other machining shape that overlaps the one second machining shape because of the extending of the one second machining shape, a portion of the overlap, and generating a third machining shape; and
a control command step of generating, based on the third machining shape and the input execution order, a control command for causing a machine tool to operate.

7. The control command generating method according to claim 6, wherein the second machining shapes for each of the machining processes generated in the machining-shape generating step include a machining shape machined by rough machining, a machining shape machined by wall finish machining, and a machining shape machined by bottom finish machining.

* * * * *